Jan. 16, 1923.
H. D. COLMAN.
MACHINE FOR OPERATING UPON WARPS.
FILED MAY 19, 1904.
1,442,776.
20 SHEETS—SHEET 16.
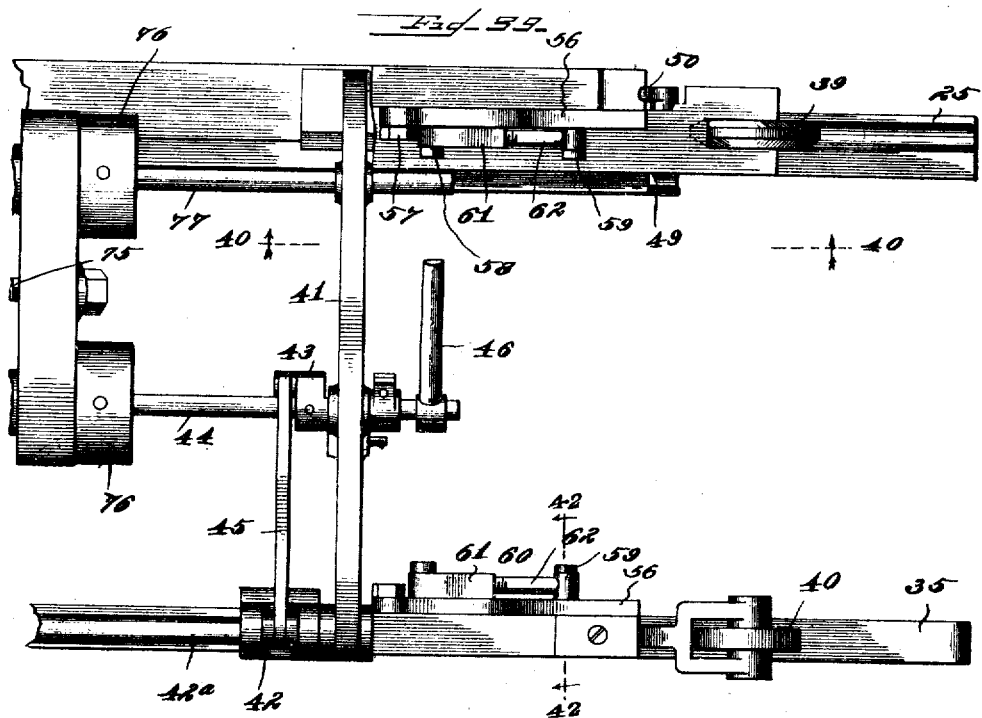
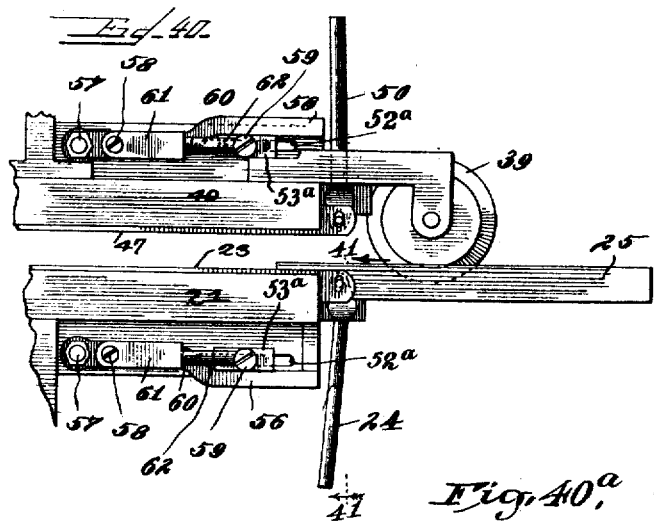
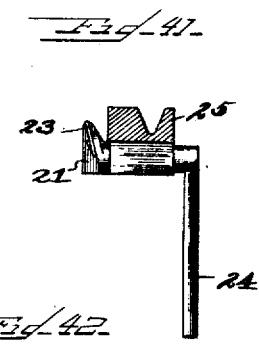

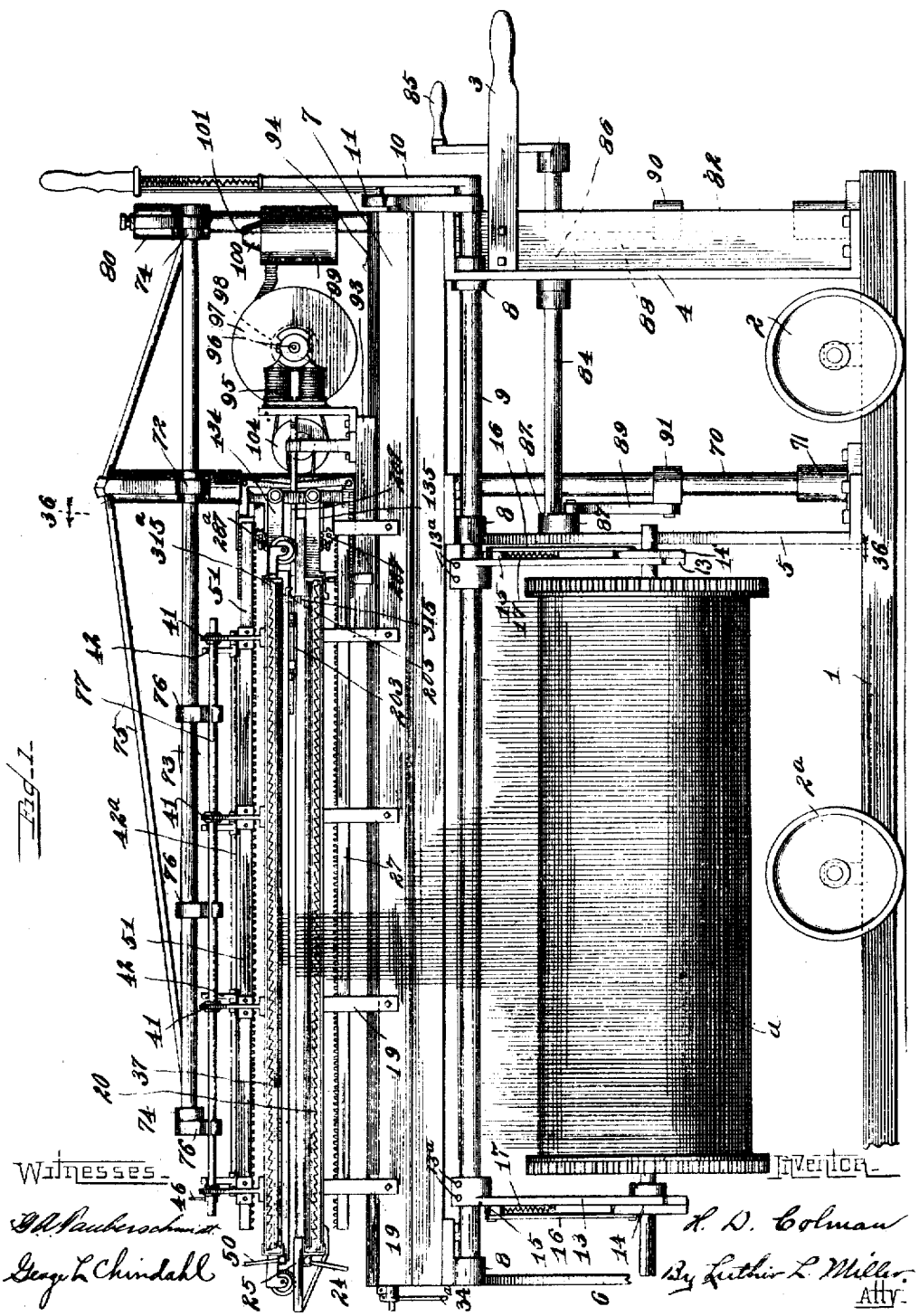

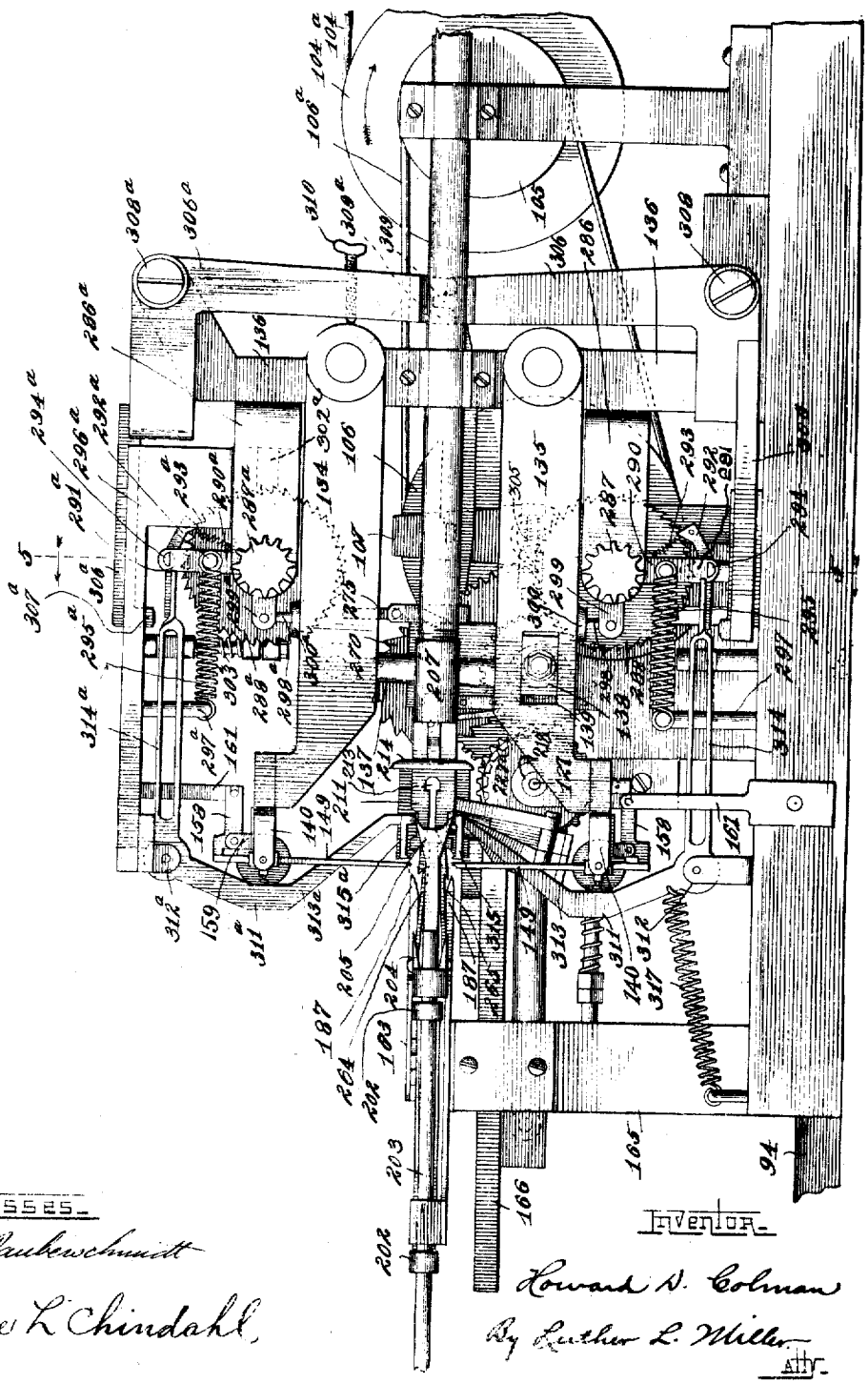

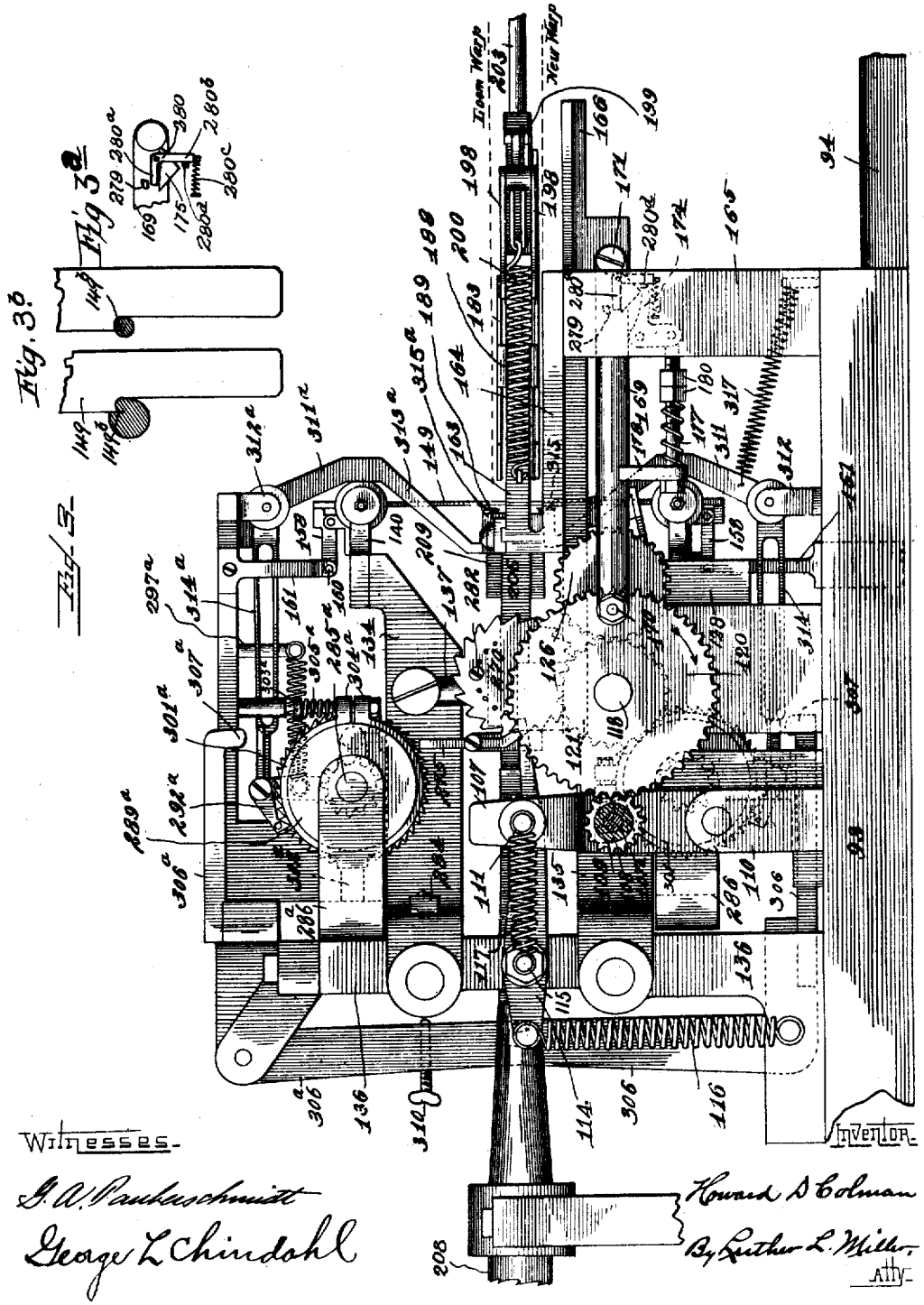

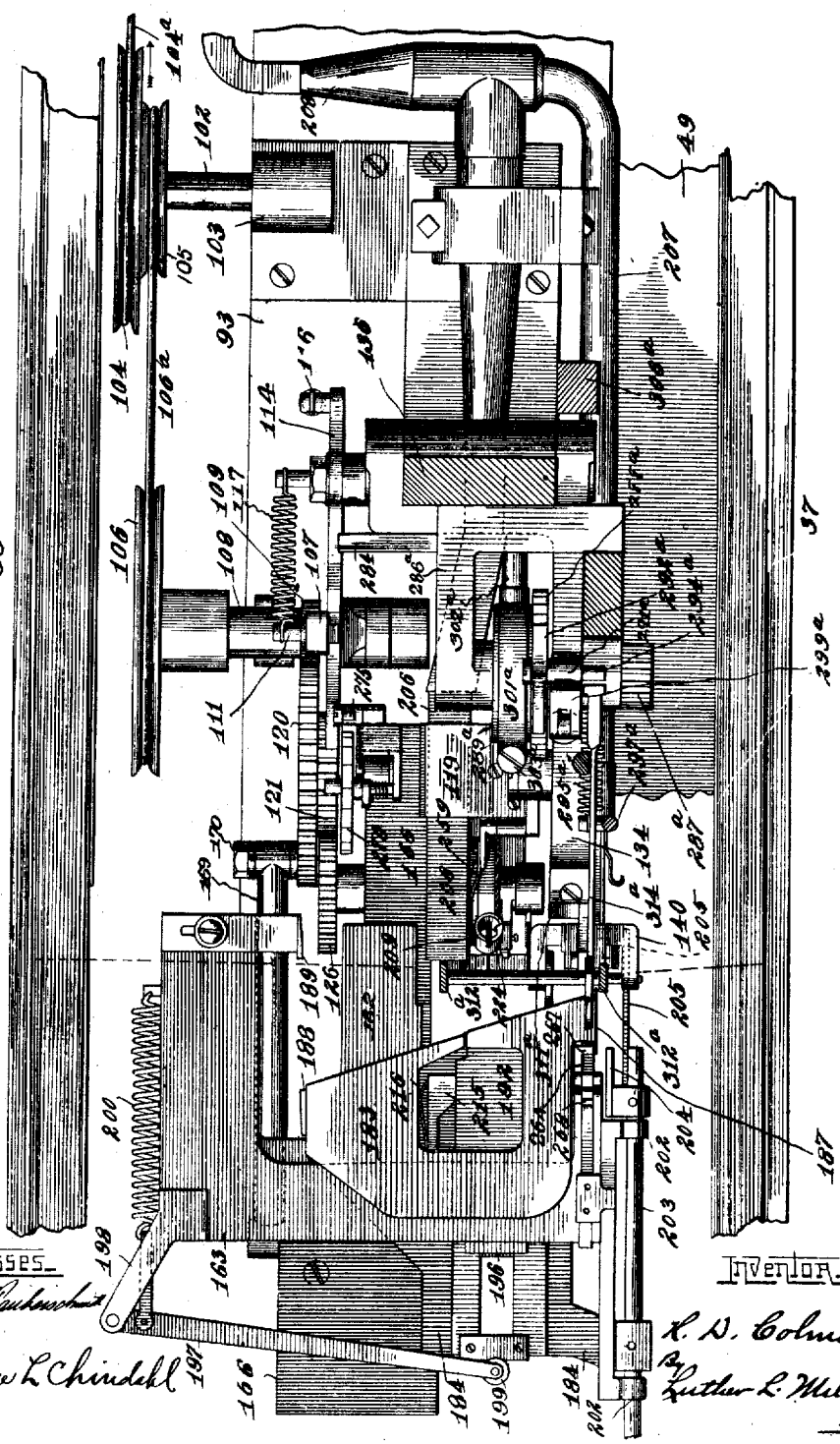

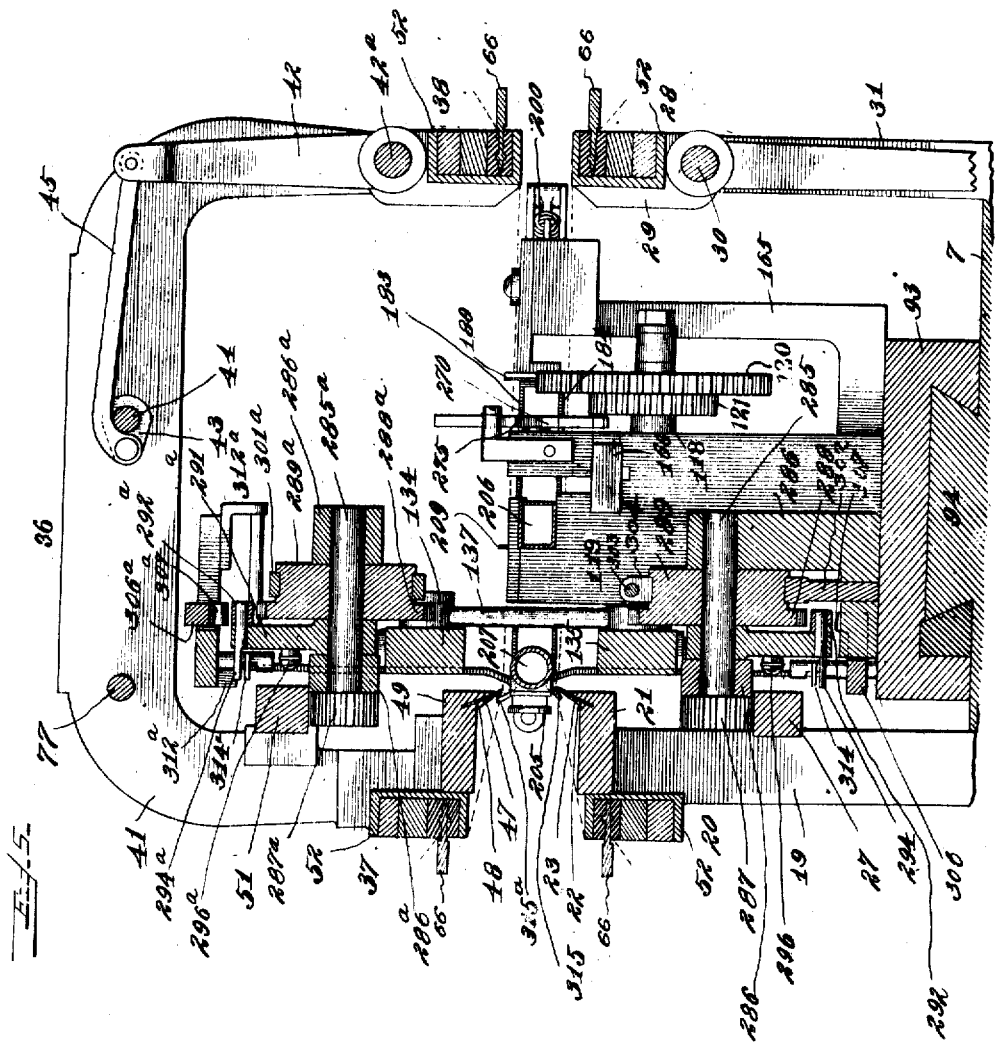

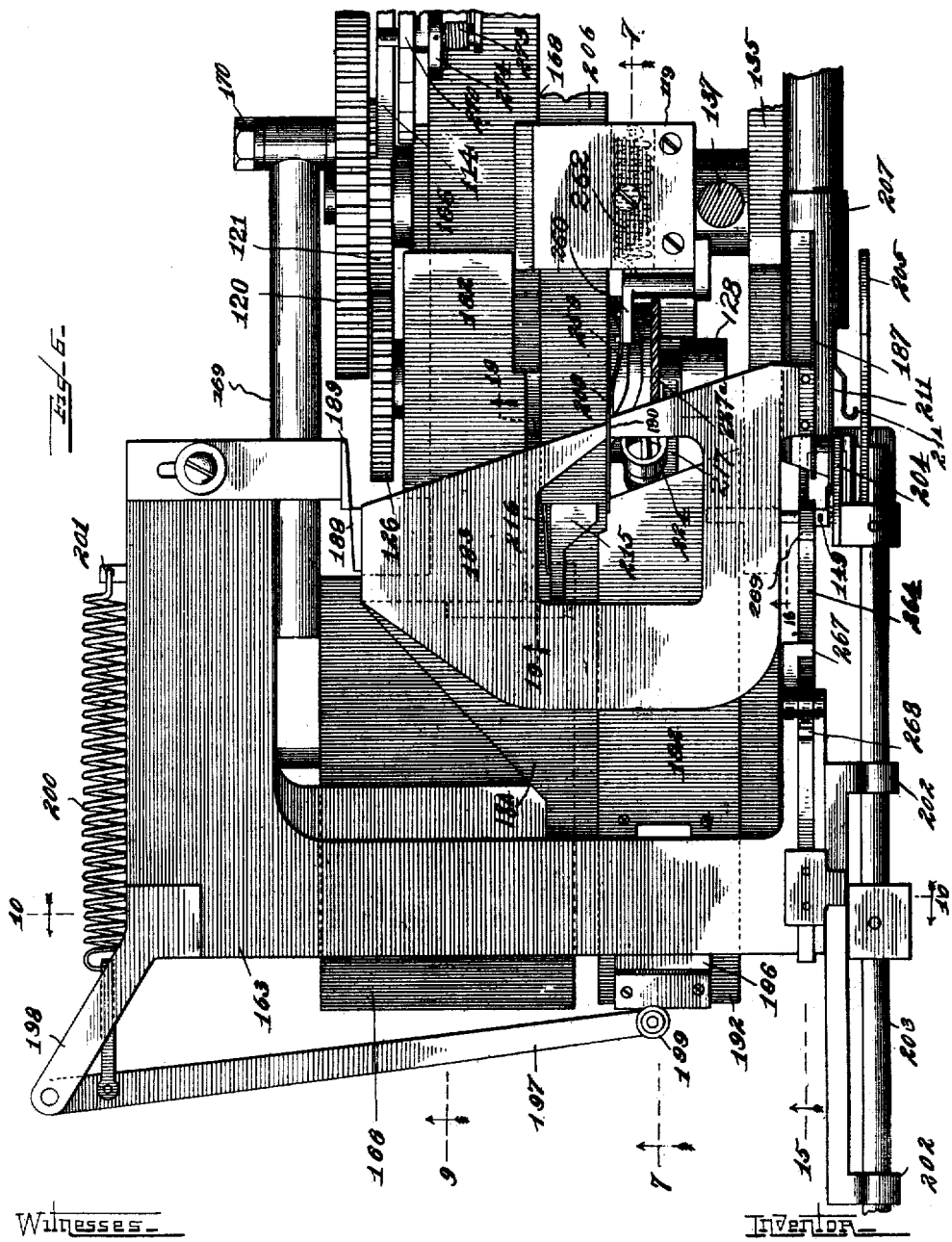

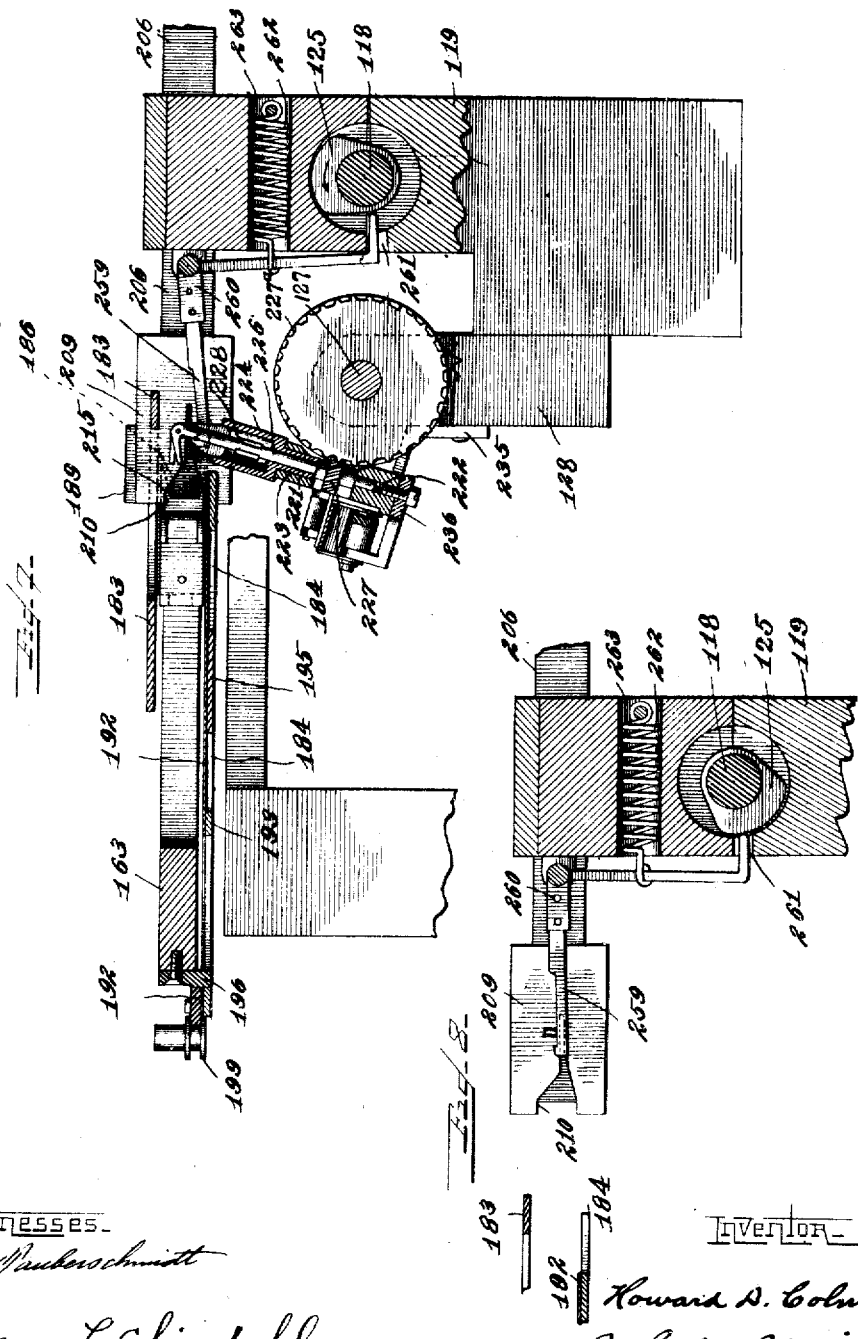

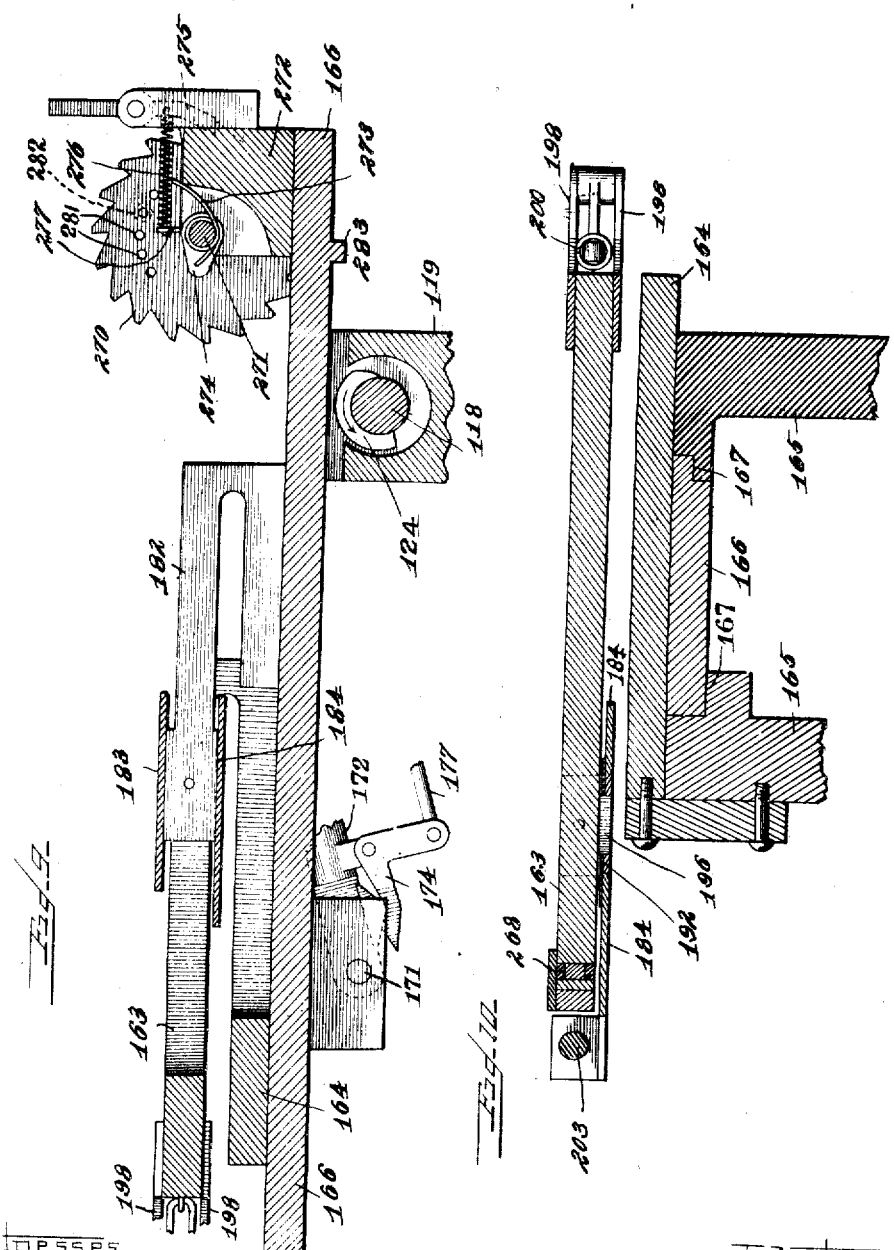

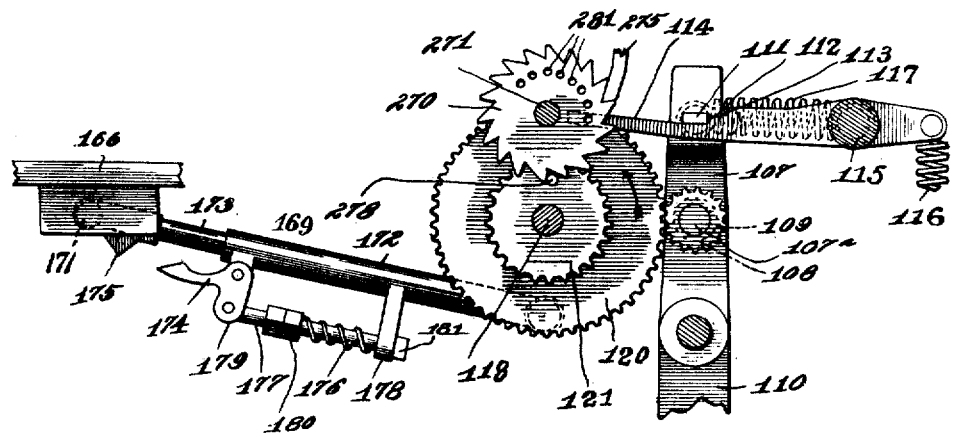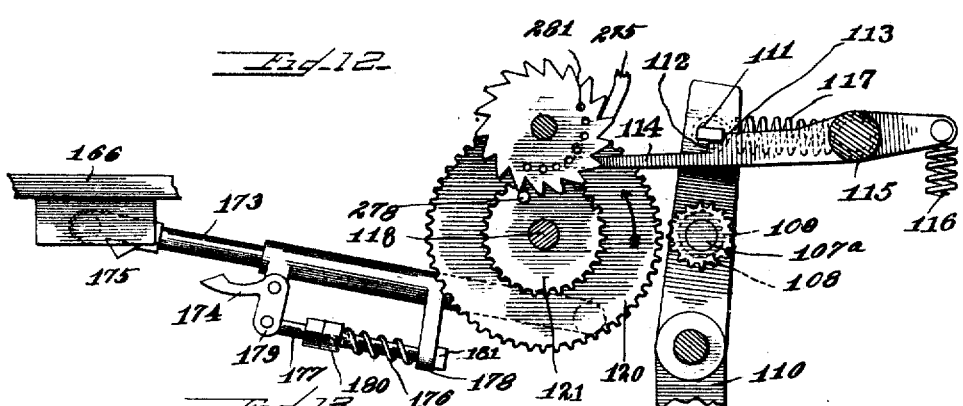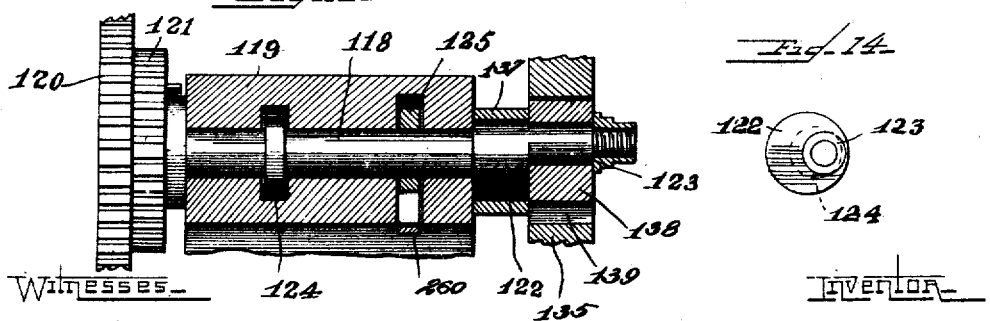

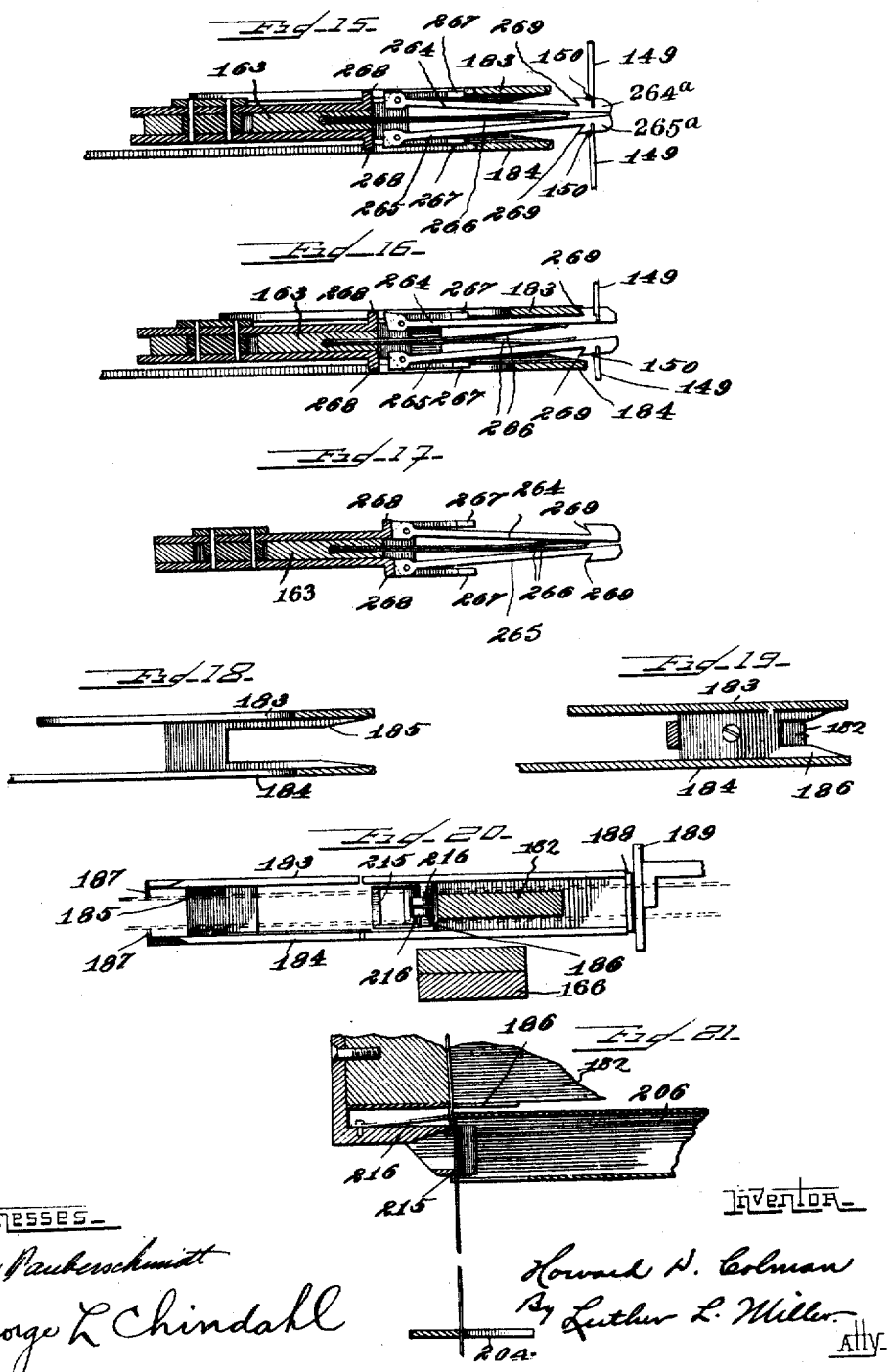

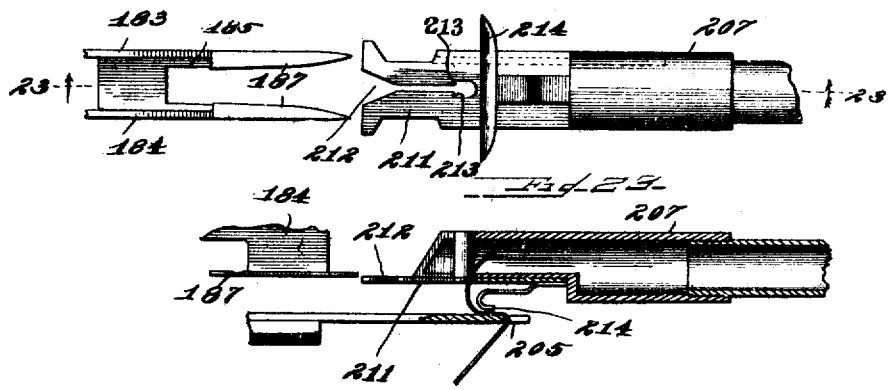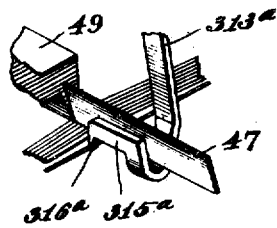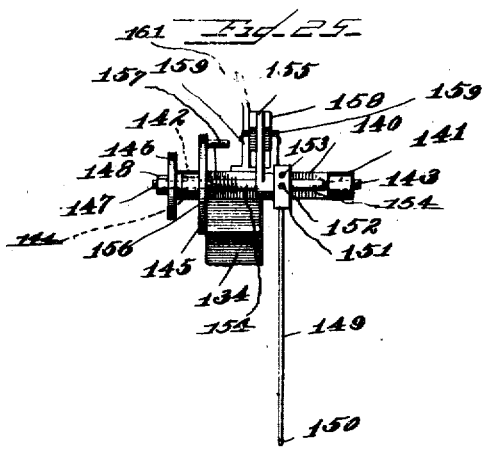

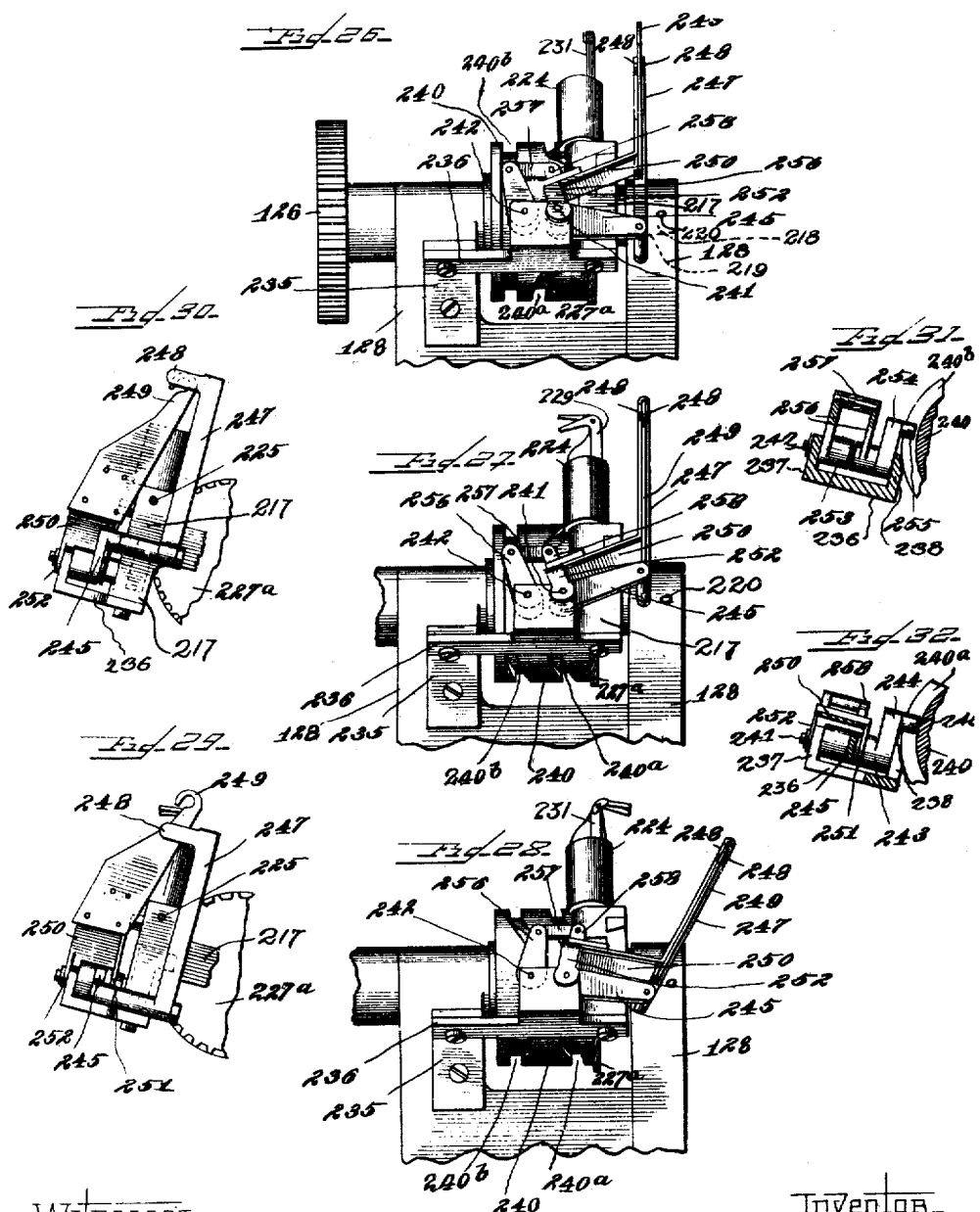

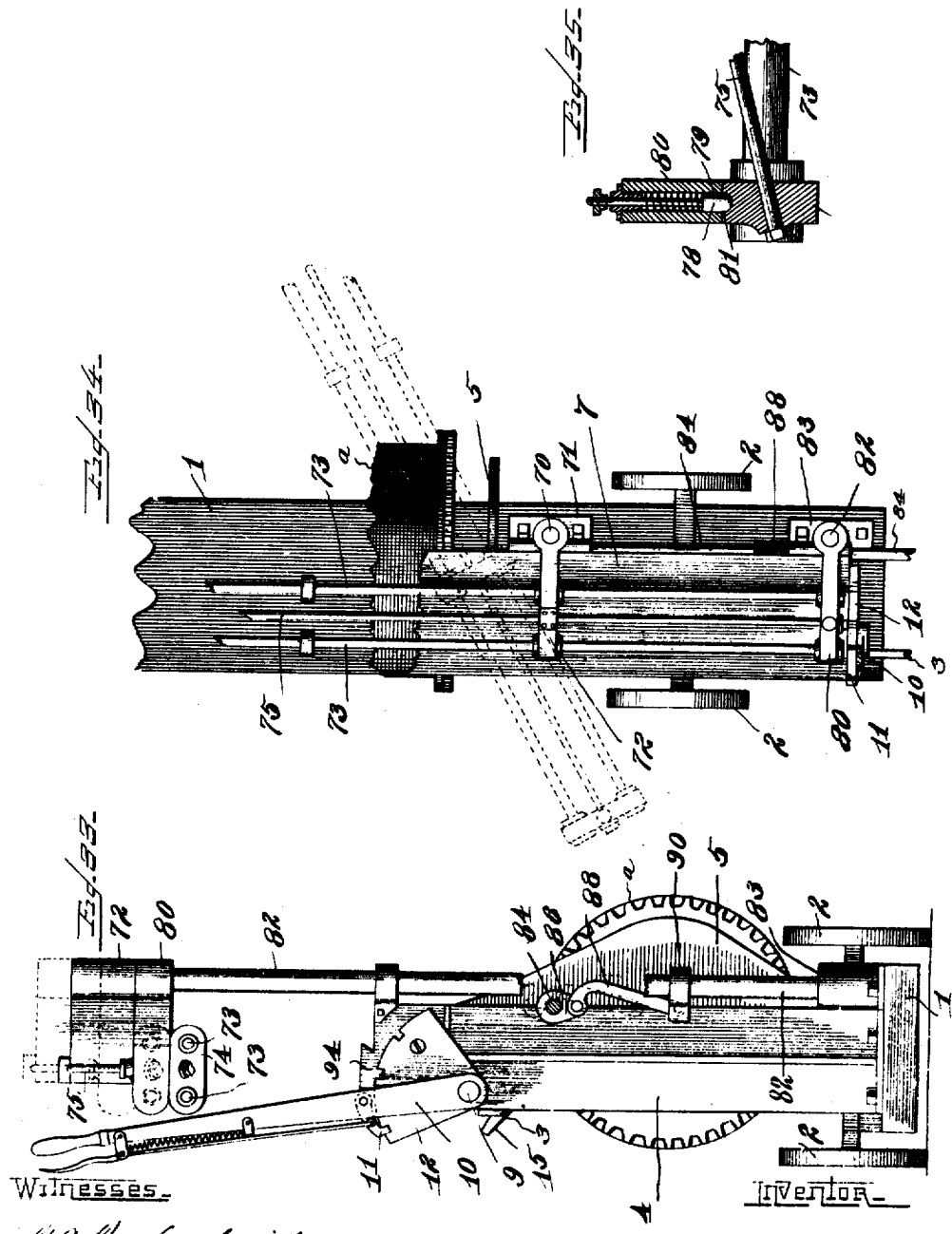

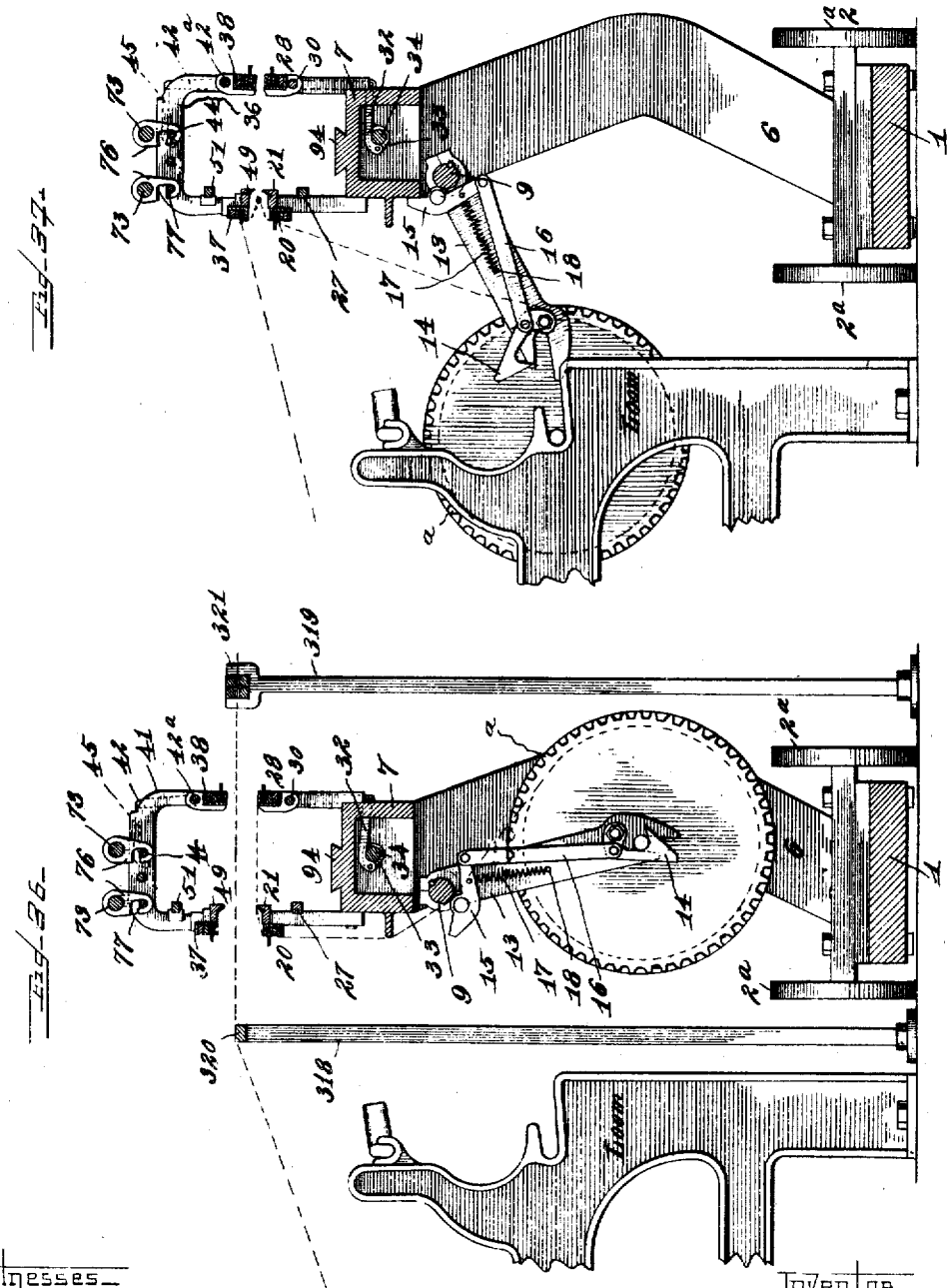

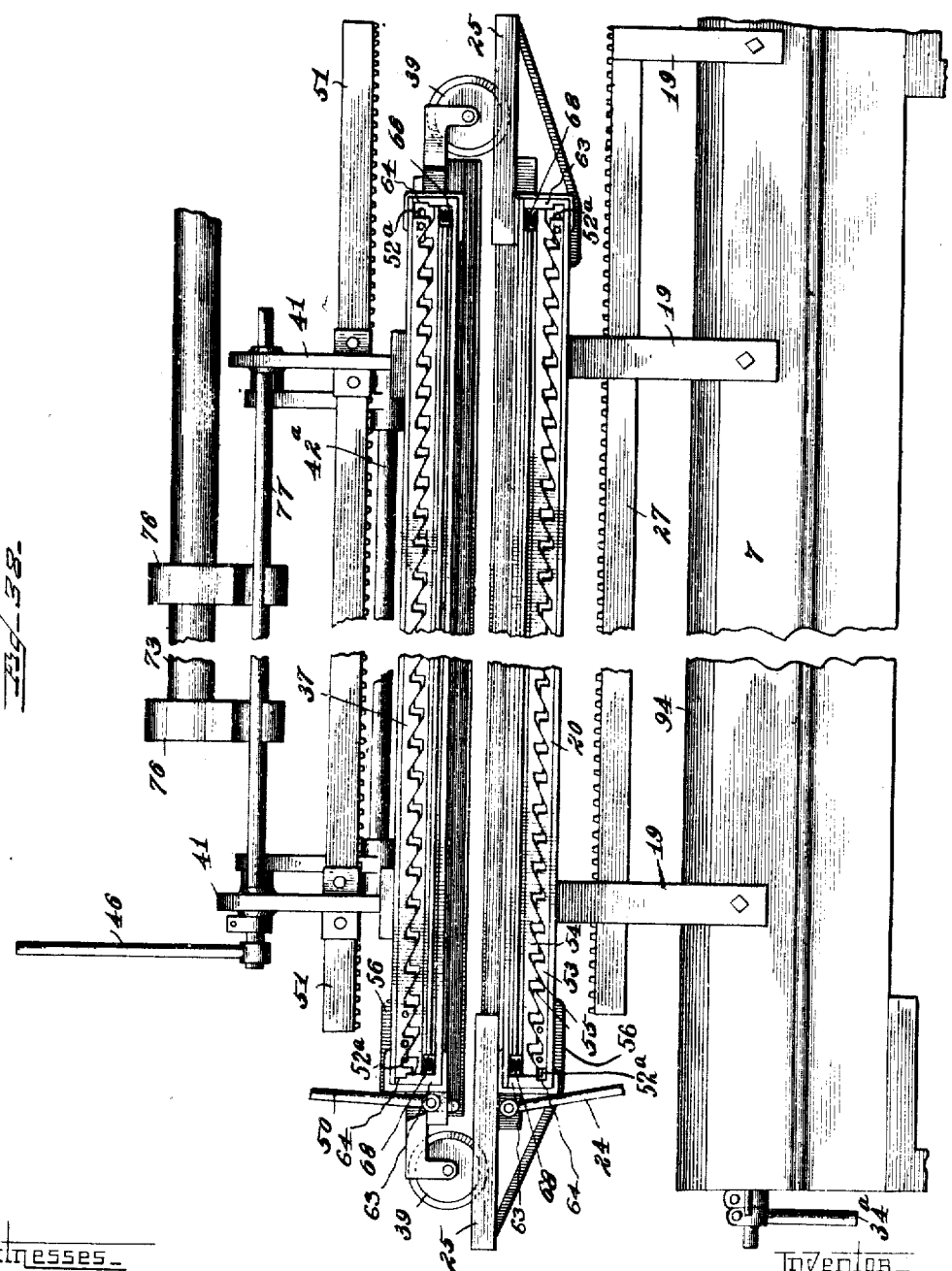

Jan. 16, 1923.
H. D. COLMAN.
MACHINE FOR OPERATING UPON WARPS.
FILED MAY 19, 1904.
1,442,776.
20 SHEETS—SHEET 17.
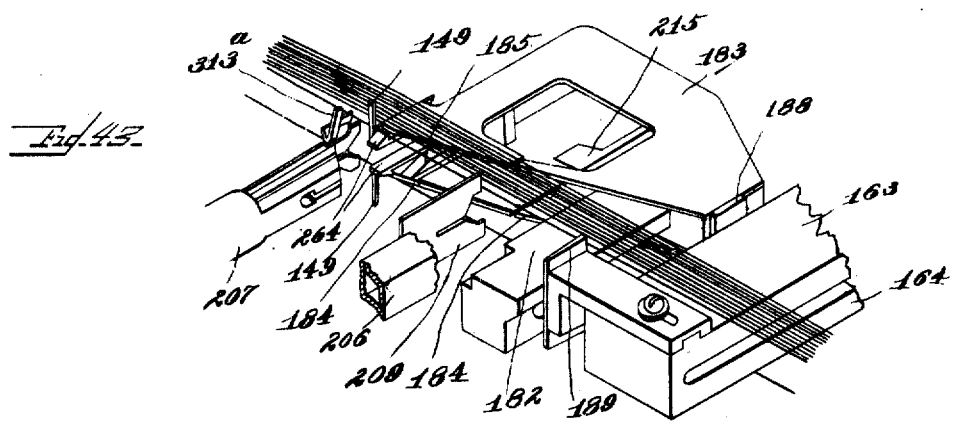
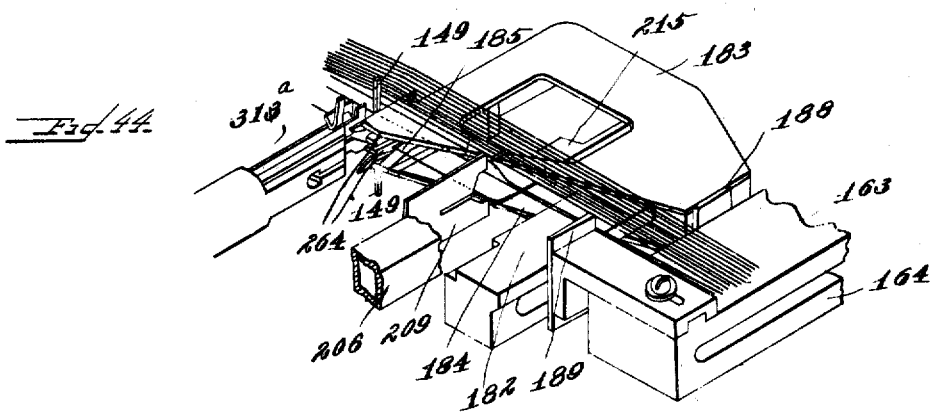
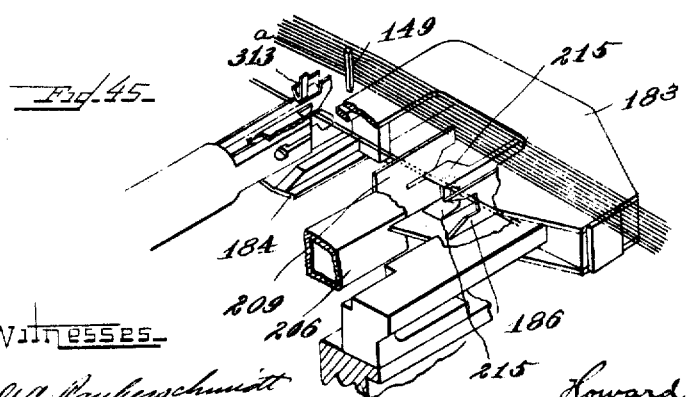

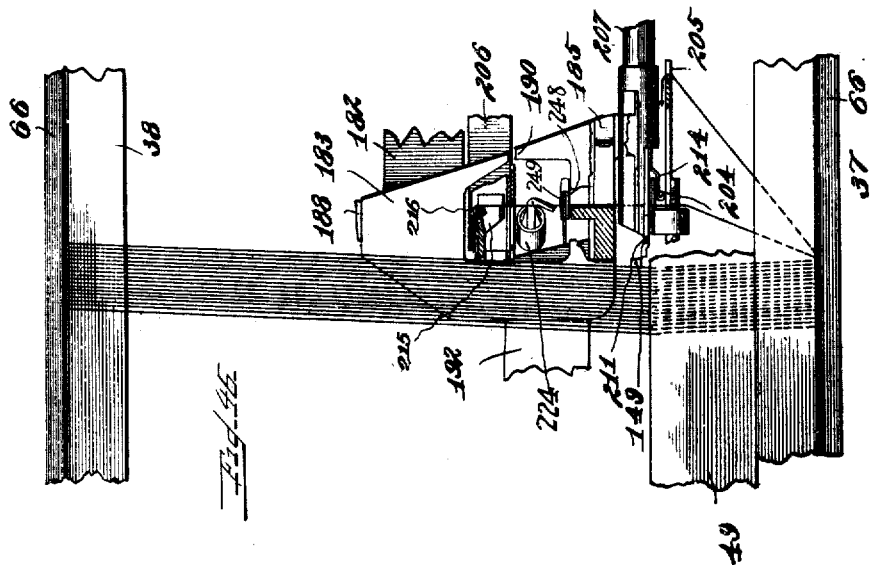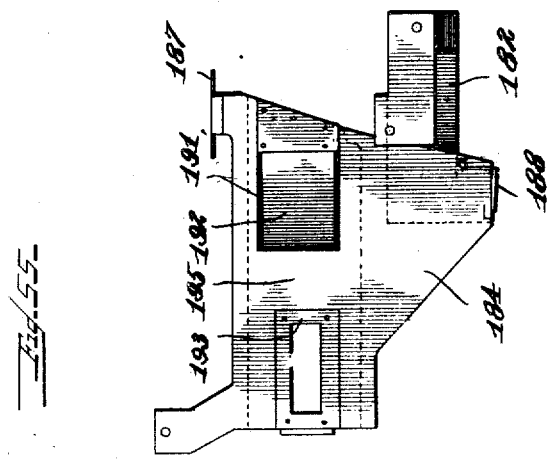

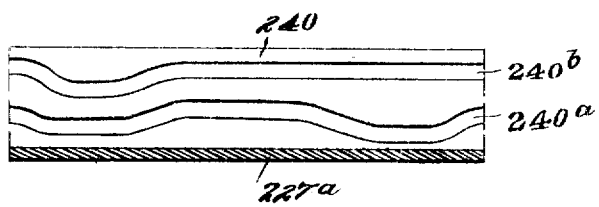
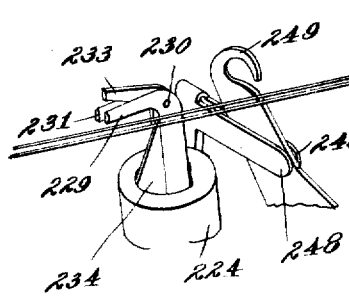
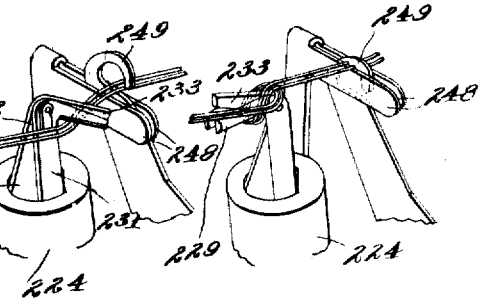
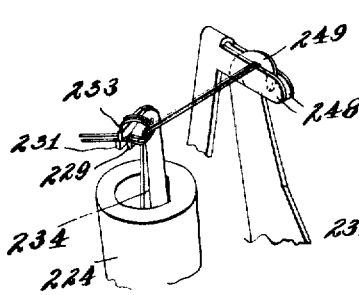
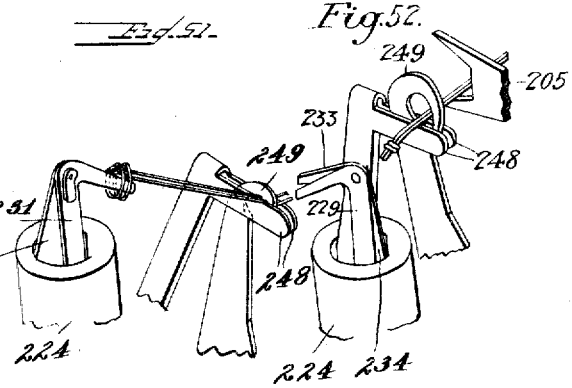
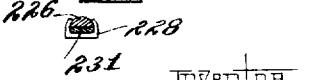

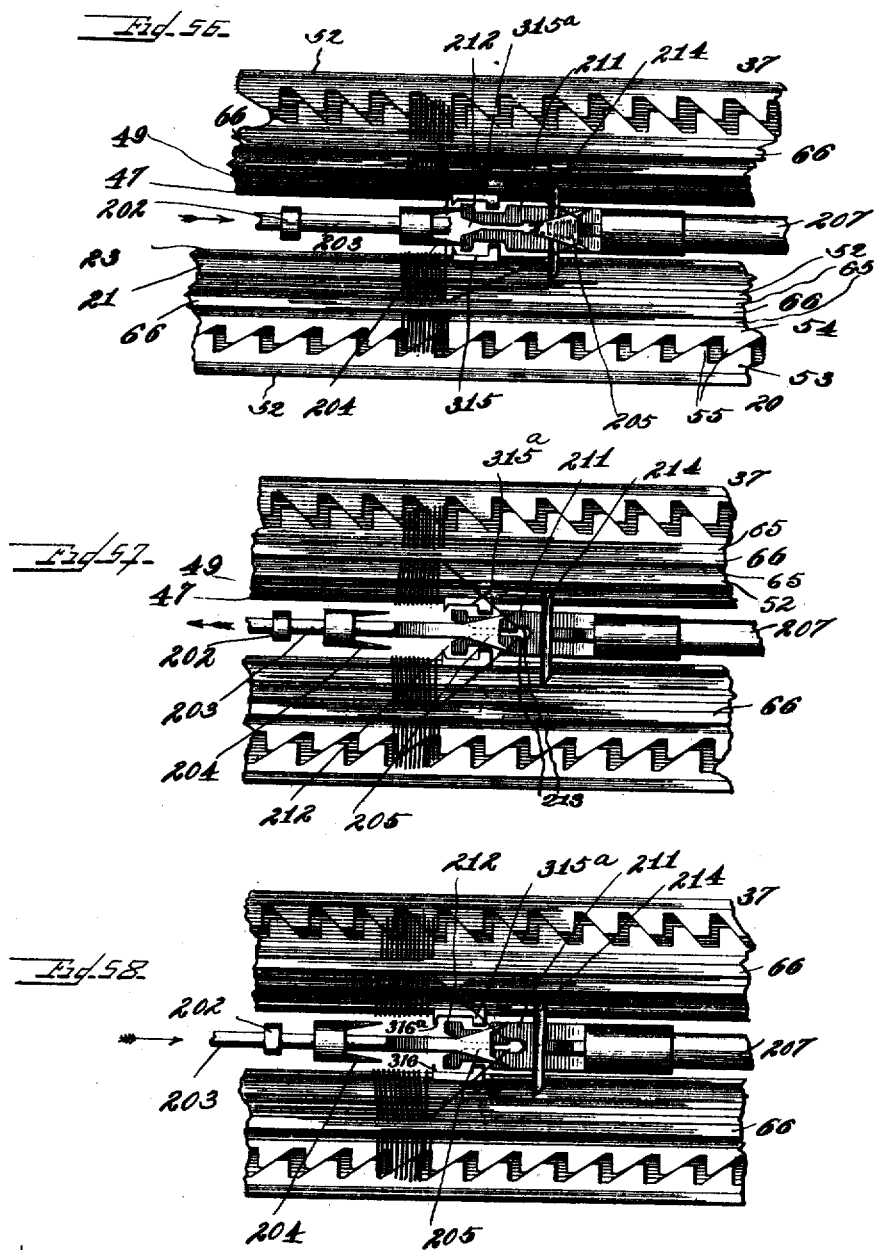

Patented Jan. 16, 1923.

1,442,776

UNITED STATES PATENT OFFICE.

HOWARD D. COLMAN, OF ROCKFORD, ILLINOIS, ASSIGNOR, BY MESNE ASSIGNMENTS, TO BARBER-COLMAN COMPANY, OF ROCKFORD, ILLINOIS, A CORPORATION OF ILLINOIS.

MACHINE FOR OPERATING UPON WARPS.

Application filed May 19, 1904. Serial No. 208,779.

*To all whom it may concern:*

Be it known that I, HOWARD D. COLMAN, a citizen of the United States, residing at Rockford, in the county of Winnebago and State of Illinois, have invented certain new and useful Improvements in Machines for Operating Upon Warps, of which the following is a specification.

While certain features of this invention are useful in connection with various types of machines for operating upon warps, the invention relates especially to an automatic machine for uniting two warps.

Among the ancillary objects of the invention is the provision of improved means for separating a selected warp thread from an adhering or following thread.

The invention further refers to means for supporting two warps in proximity to each other, selecting a single thread from each warp, and separating said selected threads from other threads of the respective warps.

The invention further relates to a means for uniting two threads so selected and separated from separate warps, and for shearing said threads to provide loose ends for the uniting operation.

A further object of the invention is the production of an improved means for automatically and mechanically tying together the ends of threads so selected and separated from two different warps.

The invention further refers to a pneumatic suction means for holding threads and for removing the waste ends thereof.

It also refers to an automatic throw-out mechanism for stopping the machine when the selector mechanism fails to select a thread.

The invention further refers to a mechanism for permitting the selector mechanism to make a predetermined number of trials before the automatic throw-out mechanism acts, also to a means for changing said number at the will of the operator.

The invention also refers to an automatic sensitively controlled feed mechanism for advancing the thread-uniting mechanism with relation to the threads of one of the warps This invention also refers to an automatic sensitively-controlled feed mechanism for advancing one of the warps with relation to the thread-uniting mechanism.

In the accompanying drawings, Figure 1 is a side elevation of a warp-tying machine embodying the features of my invention. Fig. 2 is a side elevation of the warp-tying mechanism proper and its supporting carriage. Fig. 3 is a view of the other side of said mechanism and carriage. Fig. 3$^a$ is a detail view showing the stop for preventing rebound of the separator slide when movement of the slide is arrested through the failure of either or both of the selectors to select a thread. Fig. 3$^b$ is a detail view of the lower ends of two selectors, illustrating the spearing action of the selectors upon the threads. Fig. 4 is a top plan view of the warp-tying mechanism proper. Fig. 5 is a transverse vertical section through the warp-tying mechanism, taken in the plane of dotted line 5—5 of Fig. 2. In Fig. 5 the position of the two warps is indicated by dotted lines. Fig. 6 is a fragmental top plan view of the warp-tying mechanism. Fig. 7 is a longitudinal sectional view on dotted line 7 7 of Fig. 6. Fig. 8 is a detail sectional view taken on the same plane as the last preceding figure, showing the finger for clamping the free ends of the threads and raising them into the plane of the open shearing and clamping jaws. Fig. 9 is a longitudinal sectional view on dotted line 9 of Fig. 6, showing the separator slide, the throw out mechanism and a portion of the separable connecting-rod for reciprocating said slide. Fig. 10 is a transverse sectional view through the separator slide and a portion of its supporting bracket on dotted line 10 10 of Fig. 6. Fig. 11 is a detail view showing the separable connecting rod and the throw-out mechanism. Fig. 12 is a view similar to the last preceding figure, illustrating the operation of the throw-out mechanism. Fig. 13 is a horizontal sectional view taken through the bearing block of the mechanism carriage, showing the eccentric shaft with its gears, cams and eccentrics. Fig. 14 is a detail view of the eccentrics upon said eccentric shaft. Fig. 15 is a detail longitudinal sectional view taken through the forward end of the separator slide on dotted line 15 of Fig. 6. Fig. 16 is a view similar to the last preceding figure, showing one selector as having missed its thread and the hook of one of the automatic stop latches engaging the forward end of its adjacent separator blade to stop the forward movement of the separator slide. Fig. 17 is a similar view showing the means for temporarily holding the automatic stop latches inwardly out of the path of the separator blades. This holding means is necessary to permit the operation of the mechanism when there are no warps in the machine. Fig. 18 is a longitudinal section through the separator blades on dotted line 18 of Fig. 6, showing the fork hereinafter designated as 185, in elevation. Fig 19 is a transverse section through the separator blades on dotted line 19 19 of Fig. 6, showing the fork hereinafter designated as 186, in side elevation. Fig. 20 is a front elevation of the separator mechanism and related parts. Fig. 21 is a horizontal section taken through the forward end of the waste tube, showing the embracer fork in the operation of placing the selected threads in the open forward end of said tube and its clamping spring about to clamp said threads against the inner side of said tube, drawing the near ends of said threads taut to place tension upon them immediately after the shearing operation. Fig. 22 is a detail view showing in side elevation the forward end of the holding suction tube and the separator wings. Fig. 23 is a horizontal sectional view through said holding tube taken on dotted line 23—23 of Fig. 22. This view also shows the stripper fork in section. Fig. 24 is a detail perspective view of one of the sensitive feed-controlling levers, showing a warp thread on its forwardly extending finger. A thread is thus placed by its outwardly reciprocating selector when no thread was taken by the other selector upon its last preceding inward movement. Fig. 25 is a front view of the selector mechanism for the old or loom warp. Fig. 26 is a front elevation of the knot-tying mechanism, showing the tying bill and the other parts of this mechanism in the initial position. Fig. 27 is a view similar to the last preceding figure, showing the parts of the tying mechanism after three-fourths of a revolution of the bill shaft. Fig. 28 is a similar view showing the parts in the position they assume upon one and one-quarter revolutions of the bill shaft. Fig. 29 is a side elevation of the knot-tying mechanism, showing the parts in the initial position. Fig. 30 is a view similar to the last preceding figure, showing the knot-tightener and stripper in position to clamp the threads. Fig. 31 is a detail sectional view showing the bell-crank arm for operating the clamp arm. Fig. 32 is a detail sectional view showing the crank arm for operating the thread hook. Fig. 33 is an elevation of the head end of the truck upon which the warp-tying mechanism proper is mounted, showing in dotted lines the carrying rods for the warp carriage in their raised position. Fig. 34 is a partial top plan view of the machine, the bed being broken away to show the new warp beam. Fig. 35 is a detail sectional view showing the locking plunger for the swinging carrying rods. Fig. 36 is a transverse vertical section taken through the truck on dotted line 36—36 of Fig. 1, the warp-tying mechanism proper being omitted. In this figure the truck is shown at the rear end of a loom in position to receive in the clamps of the warp carriage the end of the old warp. In this figure the warps are indicated in dotted lines. The new warp is represented as clamped in the truck, while the old warp coming from the loom is held upon suitable supports and at a proper height to enter between the clamps for the new warp and the clamps for the old warp as the truck is pushed toward said old warp. Fig. 37 is a similar view showing the two warps as having been united by the operation of the mechanism and the beam containing the new warp as having been discharged into the loom by the upward movement of the beam-supporting arms. Fig. 38 is an enlarged side elevation of the clamping means for the new warp and the carriage for the old warp, the middle portion of said parts being broken away. Fig. 39 is an enlarged top plan view of the foot end of the warp carriage. Fig. 40 is a longitudinal sectional view through the foot end of the warp carriage, taken on dotted line 40—40 of Fig. 39. Fig. 40$^a$ is a fragmental view of one of the thread-deflecting ribbons. Fig. 41 is a transverse sectional view taken on dotted line 41—41 of Fig. 40, showing the lever for longitudinally moving the lower ribbon by means of which the stretched warp threads are deflected slightly between their points of support. Fig. 42 is an enlarged sectional view through one of the clamp bars, taken on dotted line 42—42 of Fig. 39. Fig. 43 illustrates the action of the selectors, the view showing a thread from each warp pressed inwardly by the selector fingers, the locking latches having been oscillated inwardly by said selected threads, and the points of the separator wings entering between the selected threads and the remainder of the warp threads to separate the selected threads from adhering or following threads. Fig. 44 is a view similar to the last preceding figure, showing the separating action of the separator blades upon the threads set off by the selector fingers. Fig. 45 is similar to the last two preceding figures, and shows the selected threads side by side, ready to be presented to the knot-tying mechanism. Fig. 46 is a top plan view of the tying mechanism, some of the surrounding parts being broken away. This view shows the selected threads as presented to the tying mechanism; the previously-tied threads are represented as being removed by the stripper fork. Figs. 47, 48, 49, 50, 51 and 52 are views in a series showing the successive steps in the operation of the knot-tying mechanism, Fig. 47 representing the tying bill in the position it occupies when the threads are first presented to it. Fig. 48 shows the tying bill after about one-third of a revolution, the threads in this figure being shown as lying within the thread hook. Fig. 49 shows the tying bill after a complete revolution, the threads being wound about it and held by the thread hook and clamping fingers. Fig. 50 shows the shearing and clamping jaw of the tying bill in position to sever the waste ends of the threads and clamp them. Fig. 51 shows the formed knot being tightened and stripped off the end of the tying bill by the outward movement of the thread hook. Fig. 52 shows the knot stripped from the tying bill and released by the thread hook. Said threads are about to be engaged by the stripper fork. Fig. 53 represents the form of knot tied by the knot-tying mechanism. Fig. 53ª is a transverse section through the knotter shaft, illustrating the sleeve for holding the bill spring in place. Fig. 54 illustrates diagrammatically the surface of the cam cylinder, showing the cam grooves and skew-gear upon the periphery of said cylinder. Fig. 55 is an under side view of the separator blades. Figs. 56, 57 and 58 show in side elevation the action of the pusher fork and the stripper fork upon the threads. In Fig. 56 the selected threads are shown as being carried forwardly by the pusher fork and brought together by the fingers of said fork so as to enter the throatway of the air tube, the threads last united by the knot-tying mechanism being withdrawn from the air tube by the action of the stripper fork. Fig. 57 shows how, by means of a rearward movement, the stripper fork is placed in engagement with the united threads, and Fig. 58 illustrates the forward movement of said fork during which the united threads are grasped and drawn from the air tube.

If desired, the invention may be embodied in a portable apparatus capable of being placed behind a loom requiring warp replenishment. Herein, the warp-tying mechanism is shown as mounted upon a truck comprising a bottom plate 1 (Fig. 1) provided with two pairs of supporting wheels 2 and 2ª. A handle 3 extending from the head end of the machine provides a convenient means for lifting that end of the machine and balancing it upon the wheels 2ª. The bottom plate 1 supports standards 4, 5 and 6. At their upper ends said standards carry a bed 7, said bottom plate, standards and bed being secured rigidly together by bolts or other suitable means. Bearings 8 in said standards receive a beam-supporting shaft 9, which shaft at the head end of the machine is provided with a lever 10 fixed to said shaft and having a hand-operated locking latch 11. A notched sector 12 is secured to the end of the bed 7, the notches of which sector are adapted to be engaged by the locking latch 11. That portion of the shaft 9 lying between the two standards 5 and 6 carries two beam-supporting arms 13, the outer ends of which are provided with pivotal shaft-holding latches 14 adapted to cooperate with the arms 13 to hold the ends of the shaft of the beam $a$ containing the new warp. The beam-supporting arms 13 are made adjustable lengthwise of the shaft 9 in order to accommodate their position to beams of different lengths, and are adapted to be fixed upon said shaft by means of the clamping screws 13ª (Fig. 1). The latches 14 are arranged to be automatically opened to release the beam when the arms 13 are raised into position to discharge said beam into the loom (Fig. 37) by a tripping lever 15 pivoted to each of said arms 13 upon the outer faces thereof, said tripping levers being connected with said latches by means of pivotal connecting links 16. The latches are held normally closed by springs 17 (Fig. 36), one of which springs is secured to each of said tripping levers 15 and a fixed stud 18 on the arm 13. One end of each of the tripping levers is adapted to engage the forward side of the bed 7 when the beam-supporting arms 13 are swung upwardly into position to discharge the beam.

The end portion of the warp wound upon the beam $a$ may be supported in any suitable manner for the operation thereon of the warp-tying mechanism. In the present embodiment the end portion of the warp is tightly held under tension in two clamps 20 and 28 (as shown in Fig. 36) to facilitate the selection of successive threads, the selected threads being successively severed between the clamps to provide loose ends for the tying operation. It will be understood, however, that the warp may be otherwise supported.

Posts 19 rigidly secured to one side of the bed 7 and extending upwardly therefrom carry at their upper ends the clamp 20 and a bar 21, said bar having a longitudinal groove 22 within which a metallic ribbon 23 having a finely serrated or roughened edge is mounted and in which groove said ribbon is adapted to have a slight longitudinal movement. (See Figs. 5, 38, 40, 40ª and 41.) A lever 24 pivotally connected with the ribbon and pivotally mounted upon the bar 21 is provided to impart the necessary longitudinal movement to said ribbon. The threads stretched between the clamps 20 and 28 extend across the roughened edge of the ribbon 23. At each of its ends the clamp 20 has a short guide rail 25 with a V-groove in its upper face for receiving two of the supporting wheels of a warp carriage to be later herein described, and at a little distance below the clamp bar the posts 19 carry upon their inner faces a fixed rack bar 27,— a part of the feed mechanism for advancing the warp-tying mechanism along the bed 7.

The clamp 28 (Figs. 5 and 36) is secured to the upper ends of the arms 29, which arms are pivotally mounted upon a rod 30 extending longitudinally of the bed 7 and supported above the bed in the upper ends of posts 31 fixed in any suitable manner to the bed. The lower ends of the arms 29 are pivotally connected by means of links 32 with toggle arms 33 fixed upon a rock shaft 34. Said rock shaft may be oscillated by means of a hand lever 34ª (Fig. 1) fixed thereon at the foot end of said bed. The ends of the links 32 adjacent to the toggle arms 33 are bent downwardly to permit said toggle arms to be thrown "over center" with relation to said rock shaft and the point of pivotal connection between the links 32 and the arms 29. Upon opposite ends of the clamp 28 are secured short, flat bearing rails 35 (Fig. 39) corresponding with the guide rails 25 supported by the posts 19 at the opposite side of the bed 7.

The old or loom warp is herein shown as supported in the same general manner as the new warp, but the clamps 37 and 38 for the old warp are attached to or form part of a carriage 36 (Fig. 5) which is arranged to be supported upon the bearing rails 25 and 35 by means of the rollers 39 and 40 (Fig. 39). The clamp 37 is fixed upon the yokes 41 of the warp carriage 36, while the clamp 38 is mounted at the opposite side of said carriage on the lower ends of arms 42 pivotally supported upon a rod 42ª carried by the yokes 41. The upper ends of the arms 42 are connected with toggle arms 43 fixed upon a rock shaft 44 by means of links 45. The inner ends of the links 45 are bent downwardly in order to permit the point of pivotal connection between the links and the toggle arms to be thrown over center with relation to the rock shaft 44 and the pivotal connection between the opposite ends of the links and the upper ends of the arms 42. The rock shaft 44 may be oscillated by means of a lever 46 (Fig. 38) at the end of the warp carriage 36. A ribbon 47 similar in form and construction to the ribbon 23 is supported within a longitudinal groove 48 in a bar 49 adjacent to the clamp 37. This ribbon is adapted to receive a slight longitudinal movement by means of the lever 50 pivotally mounted on said bar 49 and having a pivotal connection with the ribbon 47 (Figs. 39 and 40). A rack bar 51 forming part of the compensating feed for the warp carriage is fixed upon the inner sides of the yokes 41.

The warp clamps 20, 28, 37 and 38 are identical in construction. (Figs. 5, 38 and 42.) Each comprises a longitudinal frame 70 52, U-shape in cross-section, and its clamping means comprises two wedge bars 53 and 54, the adjacent faces of which are provided with oppositely inclined teeth 55. The wedge bar 53 is slidably connected at its ends to the frame 52 and is longitudinally movable with relation to the bar 54 by means of a toggle lever connection with the frame 52. This toggle lever connection comprises a clamping lever 56 (Figs. 39 and 40) pivotally mounted on the frame 52 by means of a stud 57. A stud 58 upon said clamping lever is connected by a link 60 with a stud 59 on a slide 53ª (Figs. 40 and 42), said slide fitting in a slot 52ª in the frame 52 and being rigidly attached to the wedge bar 53. As will be evident from Fig. 42, the slide 53ª serves to hold one end of the wedge bar 53 in the frame 52. The other end of the wedge bar is held in the frame by a similar slide (not shown) mounted in a slot 52ª (Fig. 38). The link 60 is of two parts in order to make it adjustable in length, one part being an internally screw-threaded socket 61 and the other part a threaded rod 62 engaging said socket. The wedge bar 54 is held within the frame 52 by means of the facing piece 63 at each end of the clamp bar, said facing piece having a notch 64 for the withdrawal of said wedge bar after the wedge bar 53 has been withdrawn and said wedge bar 54 moved into the place of the withdrawn bar. The upper face of the wedge bar 54 and the corresponding inner side of the frame 52 are provided with a facing 65 of rubber or other suitable yielding material. An insertion bar 66 provided with longitudinal ribs 67 to indent the facings 65 is adapted to be placed between said facings. Warp threads are inserted into the clamp by placing them over the insertion bar and pushing said insertion bar between the facings 65. When the hand lever 56 is swung into the position shown in Fig. 38, the bar 53 is slid lengthwise, the teeth of said bar wedging or camming the bar 54 sidewise so as to clamp the insertion bar and the warp. The clamp is normally held open to receive the insertion bar and warp threads by means of coiled springs 68 (Fig. 38) placed between the wedge bar 54 and the adjacent inner side of the U-frame 52 at opposite ends of said frame. The links 60 are made adjustable in length in order to take up wear upon the rubber facings 65.

To raise the warp carriage from its place over the bed 7 and to permit its being swung sidewise when it is desirable to place a new warp within the warp clamps I provide the following-described mechanism. (See Figs. 1, 33 and 34.) A shaft 70 extends upwardly beside the bed 7 from a socket 71 on the bottom plate 1. At its upper end the shaft 70 carries a saddle block 72 through which carrying rods 73 extend. The carrying rods 73 are provided with end blocks 74 through which and over the saddle block 72 a truss rod 75 extends. Rigidly mounted on the carrying rods 73 are hooks 76 (Figs. 1 and 36) for engaging the rock shaft 44 of the warp carriage 36 and a rod 77 extending longitudinally of and fixed with relation to the warp carriage and passing through suitable openings in the yokes 41 of the frame of said carriage. The carrying rods may be locked in position over the bed 7 by means of a locking plunger 78 (Fig. 35) extending through an opening 79 in a head block 80, said locking plunger being adapted to enter an opening 81 in the adjacent end block 74 of said carrying rods. The head block 80 is supported from the bottom plate 1 by means of a shaft 82 (Fig. 33) extending upwardly beside said bed from a socket 83 fixed to the upper face of said bottom plate. The carrying rods 73 and the saddle block 72 are susceptible of a vertical movement for lifting the warp carriage 36, which vertical movement is imparted to them by means of a shaft 84 (Figs 1 and 33) rotatably mounted in suitable bearings in the standards 4 and 5. This shaft is provided with a crank 85 for oscillating it, also with crank or toggle arms 86 and 87 and with pivoted toggle links 88 and 89 connecting the toggle arms 86 and 87 with collars 90 and 91 on the shafts 82 and 70, respectively. The links 88 and 89 are bent sidewise at their upper ends in order to permit the toggle arms 86 and 87 to throw over center when the carrying rods are raised and thus to permit said rods to rest in their elevated position.

The upper movable warp-carriage moves laterally with respect to the lower stationary warp support and crosswise of the warp threads on such stationary support. In this lateral movement the carriage moves in the plane of the warp threads carried by it, so that the substantially parallel relation between the two sets of warp threads is not affected by such lateral movement. Because of this lateral movement, it becomes possible to maintain the leading or foremost thread of the upper warp directly above the corresponding thread of the lower warp although the spread or width of the two warps may be different, and the spacing of the threads in the two warps may be different and irregular.

As will hereinafter appear, the thread uniter acts upon the two sets of warp threads between the clamps 20, 37, on one side (Figs. 5, and 46) and the clamps 28, 38, on the other side. The clamps 20, 37, are between the uniter and the warp beam and loom harnesses so that they clamp the useful ends of the warp threads which are joined together, while the clamps 28, 38, hold the free or loose ends of the respective warps which become waste after the union has been effected.

The warp-uniting mechanism (which in the illustrated embodiment of the invention acts to tie the threads of the two warps together) is mounted upon a mechanism carriage 93 (Figs. 1 to 5, inclusive), which is adapted to travel upon the longitudinal gib 94 of the bed 7. At its rear end the carriage 93 carries an electric motor 95, upon the shaft 96 of which is mounted a suction fan 97 and a drive sheave 98. Rearwardly of the fan 97 and supported from the carriage 93 through the fan casing is a centrifugal waste-thread collector 99 comprising a cylindrical receptacle into which the blast from the fan is directed tangentially, the upper end of which receptacle is provided with a closure 100 having an opening 101 in its center. The motor, the fan and the thread collector are of common construction. A countershaft 102 (Fig. 4) is rotatably mounted in a bracket 103 extending upwardly from the carriage 93, and said countershaft has fixed thereon a sheave 104 alined with the sheave 98 on the motor shaft; it also has a sheave 105. A sheave 106 rotatably mounted upon a tilting arm 107 is alined with the sheave 105 and is adapted to receive power from the motor by means of the belts 104ª and 106ª. The sheave 106 is fixed upon one end of a sleeve 108, the opposite end of which carries a spur pinion 109. The sleeve 108 is rotatably supported upon a stud 107ª projecting from one side of the tilting arm 107. (Fig. 3). The arm 107 is pivotally mounted upon a bracket 110 supported by the carriage 93, and said arm is provided near its upper end with a stud 111 extending through and projecting from both faces of said arm, being squared on one side of said arm to engage the locking and stop shoulders 112 and 113, respectively, of a locking and shipping lever 114, as shown in Figs. 11 and 12. This shipper 114 is pivoted at 115, as also shown in Fig. 3. A spring 116 normally holds the shipper in the position shown in Fig. 11, against the stud 111 of arm 107; and a spring 117 holds the stud against the locking shoulder 112 of the shipper. In this position the pinion 109 on arm 107 engages the gear 120, and thereby drives the machine. This shipper is part of the stop-motion or the throw-out mechanism. On depressing the free end of the shipper, the locking shoulder 112 is disengaged from the stud 111, and thereupon the spring 117 moves the arm 107 until the stud encounters the shoulder 113 of the shipper as shown in Fig. 12. This movement of the arm 107 disengages the pinion 109 from the gear 120, thereby stopping the machine. To start the machine, the attendant grasps the upper end of the arm 107, and moves it toward the gear 120, thereby moving the stud 111 forward of the shoulder 112, whereupon the spring 116 moves the shipper 114 upwardly until the shoulder 112 again locks the stud 111.

A shaft 118 (Fig. 13) is rotatably mounted in a bearing block 119 secured upon the carriage 93, said shaft having the spur gear 120 adapted to mesh with the teeth of the spur pinion 109. The shaft 118 also carries a spur gear 121, two diametrically opposite eccentrics 122 and 123, and two cams 124 and 125. The spur gear 121 is adapted to mesh with a similar gear 126 (Figs. 3 and 26) fixed upon the knotter shaft 127 (Fig. 7) which latter shaft is rotatably mounted in suitable bearings in a bracket 128 rigidly secured upon the side of the bearing block 119.

Of the warp-tying mechanism proper, the thread-selecting mechanism (Figs. 2, 3 and 25) will be first described. Two selector levers 134 and 135 are pivotally mounted upon a standard 136 fixed to and rising above the carriage 93. Said levers are given an oscillatory movement by means of the eccentrics 122 and 123 on the shaft 118, the lever 134 being connected with the eccentric 122 by means of a connecting rod 137 and the lever 135 being connected with the eccentric 123 by means of a block 138 adapted to receive said eccentric and to slide within an opening 139 formed in said lever. As the throws of the eccentrics are diametrically opposite the levers 134 and 135 approach and recede from each other synchronously. At their outer ends the selector levers are provided with horizontally extending forks 140 secured in any suitable manner to said levers. The outer ends of the arms of said forks are provided with alined openings 141 and 142 (Fig. 25), the former being screw-threaded to receive a cone bearing screw 143. The opening 142 is somewhat larger than the opening 141 and receives the shank 144 of a tension-adjusting disk 145, said shank being externally screw-threaded at its end and provided with a knurled thumb nut 146 for clamping said disk upon said arm. The shank 144 is axially perforated and internally screw-threaded to receive a cone bearing screw 147 similar to the screw 143, which screw 147 has a lock nut 148. Selectors 149 with hooks 150 formed in their outer faces of a size just sufficient to take a single small warp thread are supported between the arms of the forks 140 by means of sockets 151 in which said selectors are held by screws 152. The outer ends of the sockets 151 are closed against the passage of the selectors by means of the stop pins 153. Each of the sockets 151 is provided with a two-part supporting shaft 154 cupped at its ends to receive the points of the cone screws 143 and 147. At one side of the socket 151 the shaft 154 carries a fixed stop arm 155 to limit the movement in one direction of the selector, a spring 156 coiled about said shaft, one end engaging said arm and the other end engaging a pin 157 on the tension-adjusting disk 145, supplying the outward forward tension for the selector. The stop arm 155 is adapted to engage the point of an oscillatory stop finger 158 pivotally mounted between ears 159 secured to the fork 140, the rear end of said stop finger being bifurcated to receive a pin 160 extending transversely from a post 161 fixed with relation to the carriage 93.

Threads in any warp vary considerably in size. If the hook 150 of the selectors 149 were made large enough to embrace (surround) the largest threads, it frequently would take two very small threads. Furthermore, bunches occurring in the threads are sometimes as large as three or four thread-diameters. In order, therefore, to insure, as far as possible, the taking of a thread and only one thread, I make the point 149$^b$ of said hook 150 sharp or pointed, thus adapting the hook to spear large threads or bunches on the threads. This spearing action of the selector is illustrated in Fig. 3$^b$, wherein two selectors having the same size of hook are shown as taking threads of different sizes.

The threads of a warp are irregularly spaced. If, therefore, the thread-selecting device shall be capable of efficient operation without being watched by the operator, it is necessary that there be a yield between the selecting device and the warp so that the point of engagement of the selecting device with the warp shall be variable. In the present embodiment of my invention, the warp threads are unyieldingly supported and the selector is yieldingly pressed toward the warp, but it will be understood that the identity of the yielding and unyielding elements is, in a broad sense, immaterial.

In the embodiment herein illustrated of the invention, the tension of the threads is such that if the selector operated close to one of the clamps it could not take or displace a thread from the plane of the warp. The selector is therefore arranged to operate at a substantial distance from either clamp. In order to prevent the threads from being pushed together or bunched through the pressure of the selector due to the spring 156, the warp is bowed over the ribbon 23 or 47, as best shown in Fig. 5. Each of the selectors is reciprocated substantially at a right angle with the plane of its warp, the hook of each selector being adapted to engage the foremost warp thread of its warp and move said selected warp threads toward each other. This inward movement frees each warp thread from its roughened ribbon (23, 47) and permits it to spring into (or toward) a plane passing through its points of support in the warp clamps, thus causing the selected threads to move away from the unselected threads. At the instant that this occurs in the operation of the mechanism, and as the selectors continue to push the threads toward each other, the separator wings and blades move forward, one wing and blade passing between each of the selected warp threads and the body of warp threads, thus fully freeing said selected threads from their warps. Means thus to supplement the action of the selectors in displacing threads from the warps is not essential in connection with all kinds of warps, being of greatest value with warps wherein the threads are apt to be found adhering to one another by reason of sizing material or interengaged fibers. The separators herein shown continue up to the shear the separation initiated by the selectors; the selectors, separators and shear thus providing a pair of threads properly separated from the warps for union by the knotter. These separators will be next described. (Figs. 2, 4, 6 and 55.)

At its forward end the carriage 93 is provided with a bracket comprising two horizontal plates 163 and 164 slightly separated and mounted upon the supporting arms 165 (Fig. 10). A slide plate 166 adapted to be reciprocated longitudinally of said carriage and in line with its movement along the bed 7 is supported in ways 167 between the arms 165 and just beneath the plate 164, also at its narrow forward end in ways 168 on the bearing block 119. (See Figs. 6 and 10.) The slide 166 is given a reciprocatory movement in said ways by means of a connecting rod 169 pivotally connected at one end with a crank pin 170 extending from the face of the spur gear 120, and at its other end with said slide by means of a stud 171. (Figs. 3, 9, 11 and 12.) The connecting rod 169 is not simply a solid rod, but comprises a tubular portion 172 pivotally connected with the crank pin 170 and a solid rod portion 173 pivotally connected with the slide 166, which solid rod portion fits within said tubular portion and is adapted to telescope therewith. The two members 172 and 173 of said connecting rod are normally held together as a solid rod by means of a latch 174 pivotally mounted on the tubular portion 172 and adapted to engage an inclined tooth 175 formed on the solid rod member 173. The latch 174 is held in engagement with said inclined tooth by means of a coiled spring 176 surrounding the longitudinally movable latch rod 177, which latch rod is screw-threaded and extends loosely through a suitable opening in an ear 178 depending from and fixed with relation to said tubular portion 172, and is pivotally connected with the bell-crank arm 179 of said latch. A nut 180 on said latch rod regulates the pressure of said spring upon the latch rod and therefore governs the tenacity of the engagement between the latch 174 and the tooth 175, while a nut 181 limits the endwise movement of said rod in one direction with relation to the ear 178.

The separator slide 166 (Figs. 6, 7, 9 and 10) has fixed to it a horizontally extending plate 182 raised a little distance above the slide 166, and to this plate are fixed two separator blades 183 and 184, which reciprocate between the warps, as shown in Fig. 3. The thread-engaging edges of the blades 183 and 184 are inclined from a right angle with the line of their reciprocatory movement, making them somewhat pointed at the side adjacent to the selectors 149. Between said blades and fixed with relation thereto are two forks 185 and 186 (Figs. 18, 19 and 20) which serve to cam or crowd the two selected threads toward each other and carry them to the knotter, the fork 185 being located at the points of the blades, the fork 186 near their longitudinal middle portions. The back or closed ends of said forks are on a line at right angles with the line of reciprocation of said blades. Adjacent to the points of the blades but extending forwardly therefrom are wings 187. These wings are fixed one upon each of the side edges of the blades, and the path of reciprocation of the wings extends close to the place of action of the selectors 149. The separating action of the wings 187 follows in the operation of the machine immediately after that of the selectors, the advancing points of the wings intervening between the selected threads and the body of warp threads as soon as said selectors have pushed said threads far enough out of the plane of the body of warp threads to permit the insertion of said points. The wings 187 follow the selectors so closely that the selected thread barely passes inwardly of the point of the advancing wing. A thread adhering to or following the selected thread will thus be separated from said selected thread by the wing and held outwardly of the blades. The separation of the remainder of the length of the selected threads in the region between the selectors and the shear is accomplished by means of the separator blades 183 and 184. Opposite the wings 187 the plate 182 is provided with a vertical shear member 188 (Figs. 6 and 20) adapted to coact with a similar shear member 189 secured to the relatively stationary plate 163, the latter being adjustable toward and away from the path of reciprocation of the shear blade 188. As indicated in the plan view, Fig. 6, the shearing edge of the blade 189 is approximately directly opposite the selectors 149. As shown in Fig. 20, the height of the shear blade 189 is materially greater than the distance between the warps, hence the selected threads cannot escape past the shear blade 189. The thread-separating edge of the upper blade 183 has a slot 190 therein, the edge of the blade upon opposite sides of said slot lying in different vertical planes for a purpose to be hereinafter mentioned. The slot 190 accommodates the plate 209, hereinafter described. The lower blade 184 is also provided with an opening 191 (Fig. 55) dividing said lower blade into two portions, the edges of which portions are in the same vertical plane as the corresponding portions of the upper blade. The opening in the lower blade is provided with a slide 192 (Figs. 7, 10 and 55) made necessary by the fact that the knot-tying mechanism lies in the path of movement of said lower blade. The movement of the slide 192 in one direction with reference to the blade 184 is limited by a stop portion 193 on the under face of said slide and engaging an integral web portion 195 of the blade. During the larger part of the working stroke of the separator blades 183 and 184, the slide 192 is held with the stop portion 193 in contact with the web 195 by means of an arm 197 pivotally mounted between two ears 198 extending from the corner of the plate 163. A roller 199 mounted on said arm is held in contact with said slide 192 by means of the coiled spring 200. One end of the spring 200 is connected with the arm 197 between its pivotal support and its bearing roller 199, and the other end is connected with an eye 201 upon said upper plate 163. When the separator blades 183 and 184 during each reciprocation approach the knot-tying mechanism, the travel of the sliding portion 192 is arrested by a stop 196 fixed on the plate 163, in order to provide an opening in the forward edge of the lower separator blade 184 for the reception of the knot-tying mechanism when said lower separator blade passes beyond said mechanism. (See Figs. 6 and 7).

Upon one of its side edges adjacent to the separator wings 187 the upper plate 163 carries the fixed perforated guide ears 202 (Figs. 2, 4, 6 and 10) in which guide ears is mounted a rod 203 secured to and movable with the slide 166 and therefore reciprocating with the separator blades 183 and 184. Near its forward end this rod carries a pusher fork 204 (Figs. 56, 57 and 58), the closed end of which fork is alined with the closed end of the fork 185 (Fig. 46). Extending forwardly from the rod 203 is a stripper fork 205, the purpose of which will appear hereinafter.

Two suction tubes 206 and 207 (Figs. 4, 5, 6, 7, 8, 21, 22 and 23) are provided, the first for yieldingly holding the severed ends of the two selected threads after they have been cut and for carrying away the waste ends clipped from the knot, and the second suction tube for withdrawing the tied ends from the tying mechanism after the tying process is completed, and for holding said ends until they are removed from said tube by the stripper fork 205. To distinguish the two suction tubes I have designated the tube 206 as the waste tube, and the tube 207 as the holding tube. Both of the suction tubes are connected with the exhaust fan 97 by means of the suction main 208. The waste tube 206 is of rectangular form, one side being removed and its place supplied by a plate 209 (Fig. 8) somewhat wider than the height of the tube, and in said plate is formed a throatway 210, the inclined walls of which are so arranged that the narrow portion of said throatway is below the horizontal center of the tube to place the threads to be tied across the knot-tying mechanism in position to be drawn under the point of the tying bill. As shown in Fig. 6, the front end of the plate 209 is substantially alined with the selectors 149 and the shearing edge of the blade 189. As shown in Fig. 3, the height of the plate 209 is greater than the distance between the warps. The forward end of the plate 209 therefore provides an abutment for the selected warp threads, preventing said threads from being pushed by the separator blades over (rearward, of) the open end of the waste tube 206 and out of reach of the mechanism.

The holding suction tube 207 (Figs. 22 and 23) is provided at its mouth with a vertical side plate 211 having a flaring throatway 212, the forward end of said plate being approximately alined with the forward end of the plate 209 and the shearing edge of the blade 189. Rearwardly of its flaring end the throatway 212 becomes narrow and straight, extending transversely through the tube. The inner end of the throatway is enlarged to form two shoulders 213 into which the selected threads spring after being pushed through the narrow portion of the throatway by the fork 204, as shown in Fig. 57. Upon the side plate 211 and just rearwardly of the shoulders 213 is mounted a T-shape guard 214 (Figs. 22 and 23), the transverse portion of which is offset somewhat from the side of said plate 211.

The threads set off by the selectors 149, separated by the separator wings 187, received in the open ends of the pusher or conveyor fork 204 and the forks 185 and 186 between the blades 183 and 184 are first drawn together by the convergence of the inner faces of the arms of said forks until said threads will enter the throatway 212 of the tube 207, and are then pushed into said throatway by the forward movement of said forks. By reason of the inclination of the walls of said throatway and the forward movement of the threads therein, said threads are brought still closer together. As the threads are passed into the throatway 212 they are also placed by the advance movement of the slide 166 and the inclination of the sides of the fork 186 between the vertically placed fingers of an embracer fork 215 (Fig. 20), which embracer fork is intended to insure the entrance of the threads into the mouth of the waste suction tube 206. The embracer fork 215 is fixed to the plate 182 (Fig. 21) and lies between the separator blades 183 and 184 in position to enter the waste tube 206 (Fig. 46). At one side and slightly rearward of the points of its fingers said embracer fork carries a bifurcated spring clamp 216 having two blades, one for grasping each of the selected threads and for holding said threads against the inner face of the far wall of the waste suction tube 206. This wall constitutes one clamping jaw, and the clamp 216 the opposed clamping jaw. At the instant that the clamp 216 engages the threads to clamp them as just described, the forward movement of the slide 166 causes the shear members 188 and 189 (Fig. 6) to sever said threads, leaving two free ends held within the suction tube 206 by the air current therein and by the clamping engagement of said clamp 216. At this time in the operation of the mechanism the closed ends of the forks 185 and 215 carry the threads under the point of the rotating tying-bill, which at this moment is in its initial position.

The slide 166, with the parts carried by it constitutes a conveyor which transfers or delivers the selected threads into position to be acted upon by the thread uniter which will now be described.

The specific uniter illustrated consists of the knot-tying mechanism best shown in Figs. 7 and 26 to 32. This mechanism is supported on the bracket 128 of the mechanism carriage. The knotter framework comprises an arm 217, having an integral tubular stud 218 (Fig. 26) extending transversely from the lower end of its stem. The stud 218 lies within an opening 219 formed in the upper end of one arm of the bracket 128, and the arm 217 is fixed in position with relation to said bracket by means of a pin 220 passing through suitable openings in said stud and said arm. The tubular stud 218 provides a bearing for one end of the knotter shaft 127. The transverse portion of the arm 217 has two alined openings 221 and 222 (Fig. 7), the upper one of which is adapted to receive the stem 223 of a cam barrel 224, which stem is tubular and is adapted to be held in the opening 221 by means of a screw 225. The cam barrel is eccentric with relation to its stem, and has an interior cam conformation substantially of heart-shape in cross-section. A bill-shaft 226, having a skew pinion 227 meshing with a skew gear 227ª on the shaft 127, finds a bearing at its lower end in the opening 222, and near its upper end in the tubular stem 223 of the cam barrel 224. Within the cam barrel and toward its upper end said shaft is flattened, and upon its flattened side is provided with a sleeve 228, Fig. 53ª, fixed upon said shaft. At its upper end the shaft 226 is bent in the plane of its flattened surface at an angle somewhat greater than a right angle to form a tying bill 229, and at its bend and upon its flattened side is provided with a pivot pin 230. The sleeve 228 is adapted to receive and hold the shank of a bill spring 231, the point of which is bent to correspond with the shape of the tying bill 229. The bill spring 231 is perforated to receive the outer end of the pivot pin 230. A shearing and clamping jaw 232 pivotally mounted upon the pin 230 has a point 233 corresponding in form with the tying-bill 229 and a cam-wing 234 lying within the cam barrel 224. When the bill-shaft 226 is rotated the shearing and clamping jaw 232 is moved upon its pivot 230 by reason of the interior conformation of the cam barrel 224. The edge of the shearing and clamping jaw adjacent to the bill spring 231 is sharpened to form a thread shear with said bill spring, while the other side of the point of said jaw forms a thread clamp with the flattened side of the tying-bill 229.

The knotter framework also comprises a bracket 235 (Fig. 26) secured to the forward side of one arm of the bracket 128, and extending between the outer end of said bracket 235 and the lower extremity of the transverse portion of the arm 217 is a plate 236 having two upwardly extending ears 237 and 238 (Figs. 31 and 32). These ears are provided with alined openings, those in the rear ear 237 being screw-threaded to receive the pivot pins 241 and 242, respectively. A bell-crank lever 243 (Fig. 32) having arms 244 and 245 is pivotally mounted upon the pin 241. The arm 244 of this bell-crank lever carries a roller 246 lying within the groove 240ª of a cam-cylinder 240 fixed on the shaft 127. Upon its other arm 245 is pivotally mounted a clamp arm 247, the forward end of which has two upwardly-extending clamping fingers 248. A thread-hook 249 is adapted to lie between the clamping fingers 248 and to have a sliding movement between said fingers. This thread hook extends at an angle with its body portion 250, said body portion having two ears 251 and 252, the former adapted to have a bearing upon a portion of the bell-crank lever 243, the latter to bear upon the forward end of the pivot pin 241. It will therefore be seen that the thread clamp and the thread hook are mounted to oscillate upon the same pivotal center. The thread hook is swung upon its pivotal support by means of an oscillatory bracket 253 (Fig. 31) pivotally mounted upon the pin 242. This bracket has three arms all lying in the same plane, the lower one 254 of which has a roller 255 lying within the cam-groove 240⁵ of the cam cylinder 240. Between the remaining arms 256 a link 257 (Fig. 27) is pivoted, the opposite end of said link being pivotally connected with ears 258 fixed upon the body portion 250 of the thread hook 249. The conformation of the cam 240ᵃ causes a reciprocatory movement of the clamping arm 247, while the conformation of the cam 240ᵇ produces a rocking movement of the clamping arm 247 and the thread hook 249 about their pivotal center, to wit, the axis of the pin 241.

From the foregoing description it will be seen that a rotation of the cam cylinder 240 and the gear 227ᵃ will rotate the bill-shaft 226, the latter turning two revolutions to a single revolution of said cam cylinder. In the initial position of the tying mechanism the tying-bill 229 extends forwardly from the bill-shaft, as shown in Figs. 7 and 26, while the end of the thread hook 249 projects upwardly from the clamping fingers 248. After about one-half of a revolution of the bill-shaft the conformation of the cam 240ᵃ causes the clamping fingers 248 to be moved upwardly until they cover the thread hook 249 and clamp the threads therein. (Fig. 30.) After one revolution of the bill-shaft both cams 240ᵃ and 240ᵇ diverge from their rotative plane to one side equally, and thence through half a revolution of the bill-shaft the clamping arm 247 and the thread hook 249 are swung outwardly upon their common pivot 241. (Fig. 28.) Upon the passing of this diverging portion of the cams 240ᵃ and 240ᵇ the thread hook and the clamping arm are returned to their vertical position, the clamping arm being moved downwardly sufficiently to unclamp the threads, but not sufficiently to expose the point of the thread hook. During the remainder of the second revolution of the tying bill the conformation of the cam 240ᵃ causes the clamping arm 247 to descend into its initial position, uncovering the point of the thread hook.

In the operation of the tying mechanism the first three-quarters of a revolution winds the threads about the bill-shaft. At this point the shearing and clamping jaw 232 is opened by reason of the interior conformation of the cam barrel 224, grasps the two threads, and shears and clamps them. The waste ends of the threads are drawn into the waste suction tube 206 and removed. From one revolution to one and one-third revolutions the knot is tightened by the outward movement of the clamping arm 247, and is stripped from the tying bill. Upon the completion of the second revolution of the tying bill the thread clamp is opened. After the tying bill has been rotated through about two-thirds of a revolution from its initial position, winding the threads about said bill to form the knot and drawing said threads from said waste suction tube 206, it is desirable to clamp the ends of said threads in said tube and raise said threads so they will enter between the open shearing and clamping jaw 232 and the bill spring 231 and the tying bill 229, and for this purpose I provide a spring finger 259 (Figs 6, 7 and 8) that bears against the plate 209 of said waste tube. This finger is turned upwardly at its forward end to prevent the threads from being stripped from the end of said finger. It is fixed upon one arm of a bell-crank lever 260, the other arm of which lever near its lower end is bent at a right angle to enter an opening 261 (Fig. 7) within the bearing block 119 and there to engage the cam 125 on the shaft 118. A coiled spring 262 lying within another opening 263 in said bearing block is secured at one of its ends with relation to the bearing block and at its other end to the lower arm of the bell-crank lever 260 and holds the end of said arm in contact with said cam. The cam 125 is so timed that at each revolution of the shaft 118 it moves the finger 259 upwardly to clamp the threads that lie within the straight portion of the throatway 212 of the plate 209 and to raise said threads into the rotative plane of the open tying bill.

I will next describe the mechanism for automatically holding the slide 166 from action when either one of the selectors fails to grasp a thread. (See Figs. 6, 15, 16 and 17.) Two stop motion and thread-conveyor controllers or stop latches 264 and 265 pivotally mounted upon the edge of the plate 163 are held outwardly by flat springs 266, their outward movement being limited by stops 267. The pivoted ends of said stop latches are inwardly inclined, and a hand-operated slide 268 adapted to abut against said inclined ends moves the free ends of said latches inwardly against the tension of their springs 266 and holds said latches out of action when it is desirable to operate the machine to observe its action when no warp threads are present. The free ends of the latches 264 and 265 are provided with the outwardly extending hooks 269, and said latches normally lie parallel with and adjacent to the upper and lower warps, respectively, with the hooks 269 in the plane of movement of the separator blades 183 and 184. The free ends of the latches are adjacent to the inner ends of the selectors 149, and when said selectors grasp threads and press them inwardly said threads lie across the free ends of the latches 264 and 265, and as said threads are moved the latches are swung inwardly upon their pivots against the action of the springs 266. Should either one of the selectors fail to grasp a thread, the adjacent latch would not be depressed, and the point of the forwardly moving blade 183 184 would engage the hook 269 of the undepressed latch, stopping the forward movement of the slide 166 and preventing it from carrying the single selected thread to the knot-tying mechanism. Such stopping of the slide causes the two parts of the extensible connecting rod 169 to separate against the spring engagement of the latch 174 with the tooth 175 of said rod. The remainder of the mechanism continues in its regular movement, and at the rearward movement of the crank pin 170 the parts of the connecting rod 169 are reunited. Should the "stumbling" selector succeed in grasping a thread upon any subsequent forward movement of the slide the latch 264 265 will be pressed inwardly by the selected thread out of the path of the slide, and the machine will proceed in its regular way.

In the return stroke of the separator blades the stop latches are moved out of the path of the blades through contact of said blades with the beveled surfaces 264ᵃ and 265ᵃ of the stop latches.

In order to limit the number of trials or stumbles and to stop the whole mechanism when a certain prescribed number of unsuccessful attempts to grasp a thread has been made, I provide a stop motion actuator consisting of a counter ratchet wheel 270 (Figs. 4, 9, 11 and 12) fixed upon a shaft 271, which shaft is rotatably mounted in a bracket 272 secured upon the narrow forward end of the slide 166. A spring 273 coilded about the shaft 271, one end of the spring engaging an arm 274 fixed on said shaft and the other end the supporting bracket 272, tends to restore said wheel to its initial position. A pawl 275 is held in engagement with the ratchet wheel 270 by a spring 276 attached at one end to said pawl and at its other end to an eye 277 rising from the bracket 272. The ratchet wheel is mounted upon the slide in such position that a pin 278 extending from the gear 121 will engage the teeth of said ratchet wheel and rotate said wheel through the distance of one tooth when the slide 166 is held from movement by either one of the stop latches 264 265.

To prevent the slide 166 from rebounding when either of the blades 183, 184 strikes against the hook 269 of the corresponding latch, and thus to insure that the counter ratchet wheel 270 is in a position to be engaged by the pin 278, I provide a pin 279 (Fig. 3) upon the solid portion 173 of the connecting rod 169, which pin is fixed to one side of said rod near its pivotal connection with the slide 166. An L-shape detent lever 280, comprising a horizontal arm 280ᵃ and a vertical arm 280ᵇ, is pivotally mounted upon the adjacent supporting arm 165. A coiled spring 280ᶜ holds the L-shape lever 280 in its normal position, a stop pin 280ᵈ limiting the movement of said lever in the direction of the pull of said spring. When the connecting rod is in the position in which it is caused to separate, the pin 279 on the connecting rod lies directly in front of the forward end of the horizontal arm 280ᵃ of the lever 280, said lever preventing backward movement of the slide. Later in the rotation of the crank pin 170 the connecting rod assumes a different angle, withdrawing the pin 279 from alinement with the arm 280ᵃ. Should the slide 166 for any reason be accidentally rearward of its most forward position (as by the intrusion of any substance between either of the blades 183 and 184 and the stop latches 264 265) the pin 279 will descend upon the forward end of the horizontal arm 280ᵃ instead of directly in front of it. If the detent were rigid this would cause breakage, but being pivotally mounted and thus made yielding such breakage is avoided.

At each stumble of either selector and the consequent stopping of the slide the ratchet wheel 270 is rotated through the distance of one tooth, and therefore by providing a series of openings 281 in said ratchet wheel and placing a screw 282 (Fig. 3) in any one of said openings said screw will depress the forward end of the locking lever or shipper 114 of the throw-out mechanism hereinbefore described, disconnecting the motor from the warp tying mechanism.

When one selector catches a thread and the other selector stumbles, the selected thread is separated from its warp by its separator wing 187. To place this selected thread in a position to be engaged by the selector at its next inward movement it is necessary to move it outwardly from its separator wing, and as said wing will normally not be moved rearwardly to withdraw it from said thread until the crank pin 170 moves the slide 166 to its rearward position and not until after the selectors have again been moved inwardly, it is necessary to move said slide rearwardly to withdraw said separator wing from the selected thread by a special means. This means comprises the cam 124 (Fig. 9) upon the shaft 118, which cam is adapted to engage a fixed stud 283 upon the under side of the slide 166. When the separator slide is stopped in its forward movement by the stumbling of a selector, the stud 283 is in a position to be engaged by the cam 124, which pushes said stud and its slide rearwardly at the proper moment to withdraw the separator wing from engagement with the selected thread, permitting said thread of its own elasticity to spring outwardly against its ribbon 23, 47 rearwardly of the point of the sensitive feed arm to be hereinafter described, where it is held to be taken upon the next inward movement of the selector. (See Fig. 24). At the time when the cam 124 acts on the stud 283, the connecting rod 169 is in such a position that the pin 279 (Fig. 3) will not strike the end of the arm 280ª.

When the stumbling selector succeeds in grasping a thread before its possible number of trials is exhausted, the counter ratchet wheel 270 is released to the action of its spring 273 to restore it to its initial position by withdrawing the pawl 275, and this is accomplished automatically by placing a clearing finger 284 (Fig. 3) on the standard 136 or, as in this case, for convenience, on the lever 134, in position to be engaged by the rear end of the pawl 275 at the extremity of each forward or working stroke of the slide 166. When the slide makes a complete movement the pawl 275 is lifted from the teeth of the counter ratchet wheel by contact with the finger 284. This engagement occurs normally at every forward movement of the slide 166.

If either selector fails to take a thread the action of the separator blades and of the thread conveyor is suspended, and the knot-tying function of the knotter is likewise suspended although it goes idly through its movements. This suspension continues until both selectors take threads whereupon the normal action is resumed unless the suspension is prolonged throughout the predetermined number of ineffective thread taking strokes of the selectors in which event the machine automatically stops. During the suspension of the action of the uniting action the feed of the mechanism carriage is stopped by the action of other co-operating thread-controlled instrumentalities so that the selectors are maintained in proper position to take the foremost warp-threads.

The sensitively-controlled feed for advancing the mechanism carriage 93 across the bed 7 will next be described, and inasmuch as the compensating feed for the warp carriage 36 is substantially identical in construction and operation with said mechanism carriage feed both of said feeds will be described together. In the description of this feed the reference numerals with exponents refer to the compensating feed for the warp carriage.

Two shafts 285 285ª (Figs. 2, 3 and 5), the former for the mechanism carriage feed, the latter for the warp-carriage feed, are rotatably mounted in suitable bearings in the forward ends of the arms of the U-shape brackets 286 286ª supported upon the standard 136. Pinions 287 287ª, fixed upon said shafts outside of said brackets, mesh with the feed racks 27 and 51, respectively. Between the arms of the brackets 286 286ª each of the shafts 285 285ª carries a ratchet wheel 288 288ª having a brake hub 289 289ª. A bell-crank lever 290 290ª is loosely mounted on each shaft and carries upon one of its arms 291 291ª a pawl 292 292ª pivotally mounted on said arm and held in engagement with the teeth of the ratchet wheel 288 288ª by means of a coiled spring 293 293ª. A semi-cylindrical stud 294 294ª projects from the face of the arm 291 291ª of each bell-crank lever 290 290ª, and a coiled spring 295 295ª connected at one of its ends to a stud 296 296ª projecting from the face of said arm and at its other end secured to a pin 297 297ª fixed with relation to the carriage 93, tends to move said bell-crank lever in one direction. A push pin 298 298ª pivotally connected with the other arm 299 299ª of the bell-crank lever 290 290ª lies within a socket 300 300ª formed in the outer edge of each of the selector levers 134 and 135. By this connection the bell-crank levers are oscillated upon their shafts 285 285ª by the outward movement of said selector levers. Accidental or momentum movement of the ratchet wheels is prevented by the brake bands 301 301ª fixed with relation to the carriage 93 by means of the pins 302 302ª and encircling the brake hubs 289 289ª. Adjusting screws 303 303ª extend through perforated ears 304 304ª on said brake bands and have a screw-thread connection with one of said ears. A coiled spring 305 305ª lying between the head of each screw and the adjacent ear 304 304ª places tension upon said brake bands.

To throw out the two feeds just described, the tension of the brake bands upon the brake hubs is removed by loosening the screws 303 303ª, and the pawls 292 292ª are withdrawn from engagement with the teeth of the ratchet wheels 288 288ª by oscillating the bell-cranks 306 306ª, the forward arms of which bell-cranks are provided with the inturned points 307 307ª adapted to engage the rear ends of the pawls 292 292ª. The bell-cranks 306 306ª are pivotally mounted by means of the screws 308 308ª upon the standard 136, and the inner arms of said bell-cranks are connected by the teeth 309 309ª to cause said arms to operate synchronously. The pawls 292 292ª are withdrawn from their ratchet wheels by pressing rearwardly upon the rear arm of either of the bell-cranks 306 306ª, as by means of the thumb screw 310.

It is desirable that the pawl 292 292ª engage a tooth of the ratchet wheel 288 288ª to rotate said ratchet wheel and its pinion 287 287ª of either the upper or the lower feed when there is no thread at the normal point of reciprocation of the selectors 149. To thus automatically regulate the upper and lower feeds, I provide sensitive feelers or sensitive feed arms 311 311ª in bell-crank form pivotally mounted between ears 312 312ª on the carriage 93. One arm 313 313ª of said lever is adapted to engage the foremost warp thread, the other arm 314 314ª to engage the semicylindrical stud 294 294ª upon the arm 291 291ª of the bell-crank lever 290 290ª. The end of the sensitive feed arm 313 313ª (Fig. 24) is turned to one side, thence outwardly and forwardly to pass around the selector and engage the foremost warp thread of the warp outside of the ribbon 23, 47 in order not to deflect said thread at the point where it is engaged by said selector. At its forward end the arm 313 313ª terminates in a finger 315 315ª having an inwardly extending tooth 316 316ª, (Figs. 24 and 58) the end of said finger being adapted to lie in contact with the foremost thread of its warp. The lower sensitive feed arm 311 is held in engagement with the foremost thread of the lower warp by means of the coiled spring 317, the upper feed arm with the foremost thread of the upper warp by gravity.

When the foremost thread is in position to be engaged by its selector it holds the end of the horizontally-extending arm 314 314ª of the sensitive feed arm 311 311ª in the path of the semicylindrical stud 294 494ª when the arm 291, 291ª is moved forwardly by its spring 295, 295ª. When the sensitive feed lever thus engages said semicylindrical stud, the forward movement of the bell-crank lever 290 290ª and its pawl 292 292ª is limited so that said pawl does not engage a tooth of its ratchet wheel 288 288ª, so that the feed of the mechanism carriage, or the movable warp carriage, as the case may be, is temporarily suspended. When the forward end of the finger 315 315ª does not engage a warp thread the end of the arm 314 314ª of the sensitive feed lever is not in the path of said semicylindrical stud 294 294ª, and as a consequence the spring 295 295ª draws the arm 291 291ª of the bell-crank lever 290 290ª forward sufficiently to cause the pawl 292 292ª to engage a tooth of its ratchet wheel, and at the next outward movement of the selector lever 134 135 the bell-crank lever 290 290ª is oscillated by the push pin 298 298ª and the ratchet wheel 288 288ª and pinion 287 287ª rotated and the feed resumed.

The sensitively controlled feed mechanisms just described thus advance the carriage 93 across the bed 7 at such rate that threads in the new warp will be constantly presented to the lower selector, and cause relative movement between the warp carriage and the operating mechanism at such rate that threads in the old warp will be constantly presented to the upper selector.

The thread-controlled feed for the movable warp frame or carriage constitutes a differential feeding means therefor enabling it to be moved relatively to the other warp support thereby compensating for variations between the two warps.

The old warp is supported in a horizontal plane above the floor at the rear of the loom at a proper height to pass under the elevated warp carriage when the machine is pushed toward it by means of the standards 318 and 319 (Fig. 36). The former support a bar 320, the latter a clamp 321.

In operation, the mechanism carriage 93 is drawn by the operator to the extreme head end of the machine, the bell-cranks 306 306ª being first oscillated to withdraw the pawls 292 292ª from engagement with the teeth of their ratchet wheels 288 288ª. A beam containing a new warp is suspended upon the truck, the shaft of said warp beam being grasped by the latches 14 of the beam-carrying arms 13. To place these arms in a convenient position to receive the warp beam the lever 10 is moved rearwardly until the locking latch 11 of said lever engages the middle notch of the sector 12. The warp carriage 36 is then elevated by giving the crank handle 85 one-half a revolution, raising the shafts 70 and 82 in their sockets 71 and 83, respectively. When thus elevated the spring plunger 78 is raised and the carrying rods 73 swung rearwardly. The levers 56 are then moved to open the warp clamps 20 and 28, and the ribbon lever 24 is moved to throw the ribbon 23 into its normal position. The rock shaft 34 is moved by its hand lever 34ª to throw the clamp 28 toward the clamp 20. The ends of the new warp, held in a clamp (not shown), are laid over the clamps 20 and 28, and the threads are pushed into the clamp 20 by means of an insertion bar 66. The clamping lever 56 is then operated to lock the threads and the insertion bar in the clamp. The same operation is repeated upon the other side of the machine, and the threads clamped in the clamp 28. The clamp 28 is then moved away from the clamp 20 to stretch the warp threads held in said clamps by oscillating the rock shaft 34. The ribbon 23 is then moved by its lever 24 longitudinally to deflect or bow the threads away from the mechanism carriage. The warp carriage 36 is then swung forward into its position over the bed 7, but said carriage is not yet lowered upon its guide tracks. The ends of the old or loom warp, held in the clamp 321, are then laid over the supporting bar 320, and said clamp held elevated upon its standards 319. The truck is now pushed between said standards 318 and 319. The clamps 37 and 38 on the warp carriage are opened, the ribbon 47 placed in its normal position, the clamp 38 moved toward the clamp 37 by oscillating the rock shaft 44, and the old warp pushed into the clamps by means of the insertion bars 66 and clamped therein by operating the clamping lever 56. The warp is then drawn taut by moving the lever 46 and oscillating the rock shaft 44. Said threads are then deflected by moving the ribbon 47 by means of its lever 50. The principal reason for deflecting the warps is partially to convert the pressure of the selectors and the sensitive feed levers into a longitudinal pull upon the threads. The threads are deflected so far by the ribbons that the selectors and feed levers cannot push them any farther. The warp carriage with the loom warp thus clamped within it is now lowered into position relative to the new warp by turning the crank handle 85, and with its supporting rollers 39 and 40 resting upon the track sections 25 and 35. The warp carriage is then shifted until the edge of the old warp at the head end of the machine is in the vertical plane of the corresponding edge of the new warp, and the mechanism carriage 93 is pushed along the bed 7 by the operator until the selectors are brought into a position to engage the foremost thread of each warp. The bell-cranks 290 290ª are then released to permit the pawls 292 292ª to engage the teeth of the feed ratchet wheels 288 288ª. The brake bands 301 301ª are given proper frictional tension upon the brake hubs 289 289ª by turning the screws 303 303ª, and current turned upon the motor 95. Motion is communicated from the motor shaft 96 to the countershaft 102 by the belt 104ª and from the countershaft to the rotatable sleeve 108 upon the tilting arm 107 by means of the belt 106ª. From the sleeve it is communicated by means of the pinion 109 to the shaft 118, and from said shaft to the knotter-shaft 127. By means of the skew-gears 227 and 227ª the knotter-shaft rotates the bill-shaft 226 in the ratio of two to one, and by the cam-cylinder 240 the thread hook 249 and the clamping arm 247 are given their proper movements. The eccentrics 122 and 123 upon the shaft 118 reciprocate the selectors 149 across the planes of the warps, and the slide 166 is given a reciprocatory movement by reason of its crank connection with the gear 120. The fan 97 being mounted upon the motor shaft 96 is rotated, creating an air current within the suction tubes 206 and 207. The selectors are held yieldingly by their springs 156 forwardly against the warp threads, and upon their inward movement engage the foremost thread of each warp, catching said warp threads by their hooks 150. The warp threads thus caught by the hooks of the selectors are pressed by said selectors inwardly, freeing said threads from engagement with the roughened edges of the ribbons 23 and 47. Upon being freed from said ribbons the threads having been deflected by said ribbons from a straight line tend by their elasticity to resume said straight line, and therefore spring away from their next adjacent warp threads. The selectors being yieldingly mounted permit of this movement of the threads. Immediately after the threads have been pushed inwardly from the bodies of warp threads the points of the wings 187 are inserted between the selected threads and the remaining threads of the warps in order to set off said threads and to prevent their slipping from the selectors and returning to the plane of their warps. Indeed, so closely do the points of the separator wings follow the inward movement of the selected threads that a second thread closely adhering to the selected thread or being drawn after it will be intercepted by said wings, the point of the wing being thrust between the selected thread and the adhering or following thread. Sometimes when the selected thread is large or "bunchy" the point of the wing will push it with its selector against the forward end of the suction tube 207 before it depresses said thread. This, however, makes no difference in the action of the machine, it being mentioned merely to show how closely the points of the separator wings follow the inward movement of the threads by the selectors. By the advancing movement of the slide 166 the separator blades 183 184 follow the separator wings 187 in setting off the selected threads from the body of warp threads, the inclined forward edges of said blades sliding between the selected threads and the bodies of warps, separating the selected thread from adjacent threads. The forward portions of the blades are in a plane slightly in advance of the rearward portions of said blades, the heels of said forward portions being rounded to prevent shearing the threads against the side plate 209 of the tube 206, the remaining portion of each blade being placed rearwardly of said forward portion so that the selected thread will be set off from its warp by the thickness of the forward portion of the blade before the point of the rear portion enters between said selected thread and its warp. As the slide continues to move forwardly with relation to the selected threads the pusher fork 204 engages said threads, and between the separator blades the threads are engaged by the forks 185 and 186, the inclined arms of all of which forks tend to draw the selected threads together. The degree of inclination of the inner sides of the arms of the pusher fork 204 is sufficient to place the threads within the open throatway 212 of the holding tube 207, and the inclination of the inner sides of the arms of the fork 186 is sufficient to bring the threads within the fingers of the embracer fork 215. The embracer fork 215 carries the threads into the forward end of the waste tube 206. The selected threads are carried by the forks 204 and 185 into the straight portion of the throatway 212 and then spring behind the shoulders 213 in the opposite side walls of the holding tube 207, and in this forward movement the threads are placed across the bill shaft 226 just beneath the tying bill 229, the point of said tying bill at this moment extending toward the waste-end tube 206. Just previous to this movement the threads were severed by the shear members 188 and 189 and the loose ends thus formed held by the two-part spring 216. The loose ends thus formed are held in the waste tube by the action of said spring and by the air current in said tube. As the tying bill is rotated it draws slack from said waste tube, the spring fingers 216 permitting the threads to slip past them. As shown in Fig. 46, the spring clamp 216 is carried some little distance into the tube 206, and therefore continues to clamp the threads for a time sufficient to insure proper position of the threads with relation to the knotter. After about one-half revolution of the tying bill the finger 259 is raised by the cam 125 to grasp the threads between said finger and the side plate 209 and to raise the threads into the path of the open tying bill. As the bill continues to rotate the threads so elevated by said finger are grasped and severed by the shearing and clamping jaw of the tying bill, the waste ends being drawn into the waste suction tube 206.

When the threads were first placed under the tying bill by the slide 166 they were also put within the thread hook 249. During the first half revolution of the tying bill the clamping arm 247 was pushed upwardly by the cam 240ª and the clamping fingers 248 pushed over said hook, closing the hook and clamping the threads therein. As the tying bill nears the completion of its first revolution the clamping arm and the hook are swung outwardly upon their pivotal bearing 241, tightening the knot and stripping said knot from the tying bill, after which the clamping arm 247 is drawn backward a sufficient distance from said thread hook to release said threads and to permit them to be drawn out of said hook by the air current in the holding tube 207. The point of the hook 249, however, is not uncovered by the clamping fingers until the knotter nears its initial position. The hook is thus covered in order to prevent the loop formed by the tied ends from accidentally catching upon the point of the hook and being broken when said thread is positively withdrawn by the stripper fork 205. At the next rearward movement of the slide the stripper fork 205 is drawn rearwardly of the tied threads at a point outside of the holding tube 207, and upon the next forward movement of the slide said threads are grasped by said fork, drawn over the transverse portion of the T-shape guard 214, and pulled out of the tube 207. The stripper fork pulls the tied ends over the forward end of the T-shape guard, said guard by its position cooperating with the fork to draw said ends outwardly at substantially a right angle with the length of said tube, and preventing said ends from being drawn back into said tube by the air current therein. During that part of the operation just described the selectors are in engagement with and are carried forwardly with the selected threads until said threads are moved together sufficiently to slip over the inner ends of said selectors. This usually occurs after the threads have passed into the throatway 212 of the tube 207. As hereinbefore stated, the selectors are held forwardly with reference to the mechanism carriage 93 by the springs 156 wound about their shafts 154. When the selector levers 134 and 135 are at the innermost extremities of their movements, the points of the fingers 158 are moved forward sufficiently to limit the rearward movement of the arms 155 fixed upon the selector shafts 154, stopping said selectors in their forward movement before they strike against the warp threads. Upon the outward movement of the selector levers the points of said stop fingers are moved rearwardly with reference to the mechanism carriage, permitting the inner ends of said selectors to swing outwardly under the tension of their springs 156, and thus to permit their hooks to engage the foremost thread of each of the warps. The tension of the spring 156 is regulated by the disk 145 which may be turned with relation to the shaft 154 of the selector, and may be locked in any rotative position by means of the knurled nut 146. Selectors having hooks of different sizes may be supplied for warps of different counts. As successive warp threads are taken by the selectors and united by the tying mechanism, the mechanism carriage is moved forwardly by its sensitively-controlled feed, the frequency of its feed movements depending upon the position and frequency of the threads of the new warp. The ends of the fingers 315 315ª of the sensitive feed levers 311 311ª engage the foremost thread of each warp. When the inner ends of said levers are pressed rearwardly of the carriage by the warp threads, the free ends of the other arms 314 314ª of said levers are held in such position as to limit the restoring movement of the pawls 292 292ª, that is to say, when said arms are pressed outwardly the bell-crank levers 290 290ª are not oscillated sufficiently to permit the pawls to grasp a tooth in the ratchet wheels 288 288ª, and therefore at the next outward movement of the selector levers 134, 135 the pawls will merely slide a little distance upon the back of the tooth next to be taken, and as a consequence the feeds will not be actuated. When the ends of the fingers 315 315ª of the sensitive feed levers do not press against warp threads the free ends of the arms 314, 314ª of said levers are moved inwardly and do not engage the studs 294 294ª upon the arms 291 291ª of the bellcrank levers 290 290ª. When the movement of said bell-crank levers is not limited by said arms 314, 314ª, they are moved upon their restoring movement by their springs 295 295ª sufficiently to permit the pawls to engage the next adjacent tooth of the ratchet wheels, and therefore upon the next outward movement of the selector levers said bell-cranks will be oscillated and the ratchet wheels rotated.

The friction brake band 301 upon the hub of the ratchet wheel 288 for the mechanism carriage 93 prevents the feed movement of said carriage being continued through its momentum or through the momentum or other accidental movement of the warp carriage.

The friction brake band 301ª for the feed ratchet 288ª prevents accidental or momentum movement of the warp carriage, and frictionally locks the warp carriage and the main carriage together, the frictional engagement of said brake band being overcome, however, when said ratchet is rotated by its pawl 292ª.

Owing to the deflection of the threads by the ribbons 23 47, the pressure of the selectors and the feed levers is not exerted in a direction at right angles with the length of the threads, but at an acute angle thereto. A portion of the pressure of the selectors and the feed levers is thereby converted from a side pressure upon the threads to an endwise pull upon the threads, reducing to a minimum the amount of deflection caused to the threads by said selectors and feed levers.

The automatic controllers or stop latches 264 265 lie with their hooks 269 in the path of the points of the separator blades of the thread-conveyor. They are withdrawn from the path of these blades by being pressed inwardly by the selected threads, as said threads are engaged and pressed inwardly by the selectors. When a selector fails to catch a thread the adjacent stop latch remains in the path of the separator blade, and its hook 269 engages said blade upon its advance movement and stops the separator slide. This action does not stop the remainder of the mechanism, but separates the two-part connecting rod 169, but at the next rearward movement of the crank carrying the forward end of said connecting rod the latch 174 upon the tubular portion of the rod engages the inclined tooth 175 upon the other member of said connecting rod and re-unites said rod. If each of the selectors catches a thread upon their next inward movement both stop latches are pressed inwardly by the selected threads, and the mechanism proceeds in its regular way. If the stumbling selector or either of the selectors fails in the next forward movement of the slide, the slide will be stopped and the two-part connecting rod will be separated as before. When the slide is stopped by either of its automatic stop latches the counter ratchet wheel or stop motion actuator 270 remains in position to be engaged by the pin 278 of the gear wheel 121, and at each rotation of said gear wheel (and therefore at each stumble of the selector) said ratchet wheel is rotated the distance of one tooth. As hereinbefore described, the screw 282 may be placed at any desired position with relation to the shipper 114 of the throw-out mechanism or stop motion so that after any predetermined number of stumbles by the selector the screw will be moved into engagement with said shipper to depress the latter and withdraw the locking shoulder 112 from engagement with the stud 111 projecting from the side of the tilting arm 107, releasing said tilting arm to the action of its spring 117, and permitting said spring to withdraw the pinion 109 from engagement with the teeth of the gear 120, thus stopping the machine. In the drawings the mechanism is shown as adjusted to permit five stumbles before the throw-out is operated. At each complete forward movement of the slide 166 the upper end of the pawl 275 of the counter ratchet wheel 270 engages the clearing finger 284. Thus whenever the slide is moved completely forward the record of all previous stumbles is cancelled, and the counter ratchet wheel restored to its initial position.

When one of the selectors stumbles and the other engages a thread the selected thread is separated by its adjacent wing 187 from its warp. To allow the selector (or, more accurately, the tension of the thread) to restore it to the plane of the other threads of its warp the slide 166 must be pushed rearwardly to withdraw said wing from between the selected thread and its warp. This is accomplished by means of the cam 124 on the shaft 118 engaging the stud 283 upon the lower side of the slide 166. While the crank pin 170 is still moving forwardly relatively to said slide but after the connecting rod has assumed such a position that the stop 280ª will not be engaged by the stop 279, the cam pushes the slide rearwardly, withdrawing the engaging wing from said thread. The selectors at this time have moved outwardly, and the thread is returned by its elasticity nearly into contact with its ribbon, said thread springing rearwardly with reference to the mechanism carriage and lodging rearwardly of the tooth 315 315ᵃ upon the sensitive feed lever. Upon the next inward movement of the selector which previously carried said thread said selector again engages said previously-selected thread and pushes it inwardly. This action is repeated until both selectors grasp threads or until the automatic throw-out mechanism operates.

When every thread of the new warp has been tied to a corresponding thread in the loom warp the lever 10 is grasped by the operator and pushed toward the far side of the machine, oscillating the beam-supporting shaft 9 and raising the new beam into the loom frame. When the beam reaches its position in the loom frame the latches 14 free the shaft of the new warp beam by being automatically opened through the engagement of the tripping levers 15 at the upper ends of the beam-supporting arms 13 with the forward side of the bed 7. The united warps are then released from the clamps 20 and 37. This completes the warp-tying operation. The truck is then removed from the loom, the waste thread ends removed from the clamps 28 and 38, a new warp beam placed in the latches 14 of the beam-supporting arms 13, and the ends of said warp secured in the clamp bars 20 and 28 above the bed. The machine is now ready to be moved to another loom in which it is desired to place a new warp.

While I have described the machine as adapted to be moved from one loom to another, it is clear that in many instances it will be desirable to have the machine stationary and to take the harnesses and the reed from each loom to the machine for the tying operation.

The foregoing detailed description has been given for the sake of clearness and is not to be construed as a definition or undue limitation of the invention. I believe myself to be the first to produce a practically operative machine for uniting warps, and desire the claims to be construed broadly.

It will be understood that certain features of the invention are susceptible of use in various types of machines for operating upon warps.

I claim as my invention:

1. A warp-uniting machine having, in combination, a bed, two clamps above the bed for supporting a warp, one of said clamps being movable toward and away from the other clamp, a thread-deflecting bar extending longitudinally of and adjacent to the fixed clamp, two clamps for supporting another warp, one of the last-mentioned clamps being movable toward and away from the other clamp, said movable clamp being supported above the first-mentioned movable clamp and the relatively fixed clamp for the second warp being located above the fixed clamp for the first-mentioned warp, a thread-deflecting bar extending above and near and parallel with the first-mentioned thread-deflecting bar, a carriage arranged to travel upon the bed, and warp-uniting mechanism on said carriage, said mechanism including thread selectors arranged to operate upon the threads of the two warps adjacent to said thread-deflecting bars, thread-severing means located between the selectors and the movable clamps, uniting means located between the selectors and the severing means, and means operating between the fixed clamps and the thread-deflecting bars for removing the united threads.

2. A warp-uniting machine having, in combination, two clamps for supporting a warp, one of said clamps being movable toward and away from the other clamp, a thread-deflecting bar extending longitudinally of and adjacent to the fixed clamp, two clamps for supporting another warp, one of the last-mentioned clamps being movable toward and away from the other clamp, said movable clamp being supported above the first-mentioned movable clamp and the relatively fixed clamp for the second warp being located above the fixed clamp for the first-mentioned warp, a thread-deflecting bar extending above and near and parallel with the first-mentioned thread-deflecting bar, and warp-uniting mechanism including thread selectors arranged to operate upon the threads of the two warps adjacent to said thread-deflecting bars, thread-severing means located between the selectors and the movable clamps, and uniting means located between the selectors and the severing means.

3. In a mechanism for joining together the ends of two warps, in combination, means for selecting a thread from each of said warps; means for separating said selected threads from their adjacent warp threads; means for uniting said selected threads by tying; and means for presenting the selected threads to said uniting means to be united.

4. In a mechanism for joining together the ends of two warps, in combination, means for selecting a thread from each of said warps; means for uniting said selected threads, and thread-controlled means for causing relative movement between the warps and the uniting means.

5. In a warp-uniting machine, warp-holding means consisting of two clamps for supporting a warp, one of said clamps being movable toward and away from the other clamp, a thread-deflecting bar extending longitudinally of and adjacent to the fixed clamp, two clamps for supporting another warp, one of the last-mentioned clamps being movable toward and away from the other clamp, said movable clamp being supported above the first-mentioned movable clamp and the relatively fixed clamp for the second warp being located above the fixed clamp for the first-mentioned warp, and a thread-deflecting bar extending above and near and parallel with the first-mentioned thread deflecting bar.

6. In a mechanism for joining together the ends of two warps, in combination, means for selecting a thread from each of said warps, means for uniting said selected threads; means for advancing the uniting means with relation to one of said warps; and means for moving the other warp with relation to said uniting means.

7. In a feeding device, in combination, a rack; a carriage; a pinion supported by said carriage, adapted to mesh with said rack; a ratchet wheel having a driving connection with said pinion; a pawl for said ratchet wheel; means for reciprocating said pawl; and a sensitive feed arm supported by the carriage, adapted to be engaged by the work and to lie in the path of said pawl to limit the movement of the latter.

8. In a textile machine, in combination, a warp carriage; a mechanism carriage; a pinion supported by said mechanism carriage for moving the warp carriage; a ratchet wheel having a driving connection with said pinion; a pawl for said ratchet wheel; means for reciprocating said pawl; means for driving said mechanism carriage; and a sensitive feed lever adapted to be engaged by warp threads and to lie in the path of said pawl to limit the movement of the latter.

9. In a textile machine, in combination, a warp carriage; a mechanism carriage; a step-by-step feed mechanism for advancing said mechanism carriage; a pinion supported upon said mechanism carriage for driving the warp carriage; a ratchet wheel having a driving connection with said pinion; a pawl for said ratchet wheel; means for reciprocating said pawl; and a sensitive feed lever adapted to be engaged by a warp thread and to lie in the path of the pawl to limit the movement of the latter.

10. In a textile machine, in combination, a warp carriage; a mechanism carriage; a step-by-step feed mechanism for advancing said mechanism carriage; a pinion supported upon said mechanism carriage for driving the warp carriage; a ratchet wheel having a driving connection with said pinion; a two-arm lever, one of the arms of which carries a pawl for said ratchet wheel; an oscillatory arm mounted upon said mechanism carriage; a pin extending between said arm and one of the arms of the two-arm lever for imparting a driving movement to said pawl; a spring to restore said two-arm lever; and a sensitive feed lever adapted to be engaged by a warp thread and to lie in the path of said two-arm lever upon its restoring movement to limit the extent of said movement.

11. In a warp-tying machine, in combination, means for supporting two warps; a carriage; thread selecting means and a tying mechanism mounted on said carriage; and means for imparting a feed movement to one of said warp-supporting means with relation to the thread selecting means.

12. In a warp-tying machine, in combination, means for supporting two warps; a carriage; thread-selecting means and a tying mechanism mounted on said carriage; means for advancing said carriage with relation to one of said warp-supporting means; and means for moving the other warp-supporting means with relation to the carriage.

13. In a warp-uniting machine, in combination, means for supporting two warps; a carriage; thread-selecting means and a uniting mechanism mounted on said carriage; means for advancing said carriage with relation to one of said warps; and means held from action by the presence of a thread of the other warp for moving said warp with relation to the carriage.

14. In a warp-tying machine, in combination, means for supporting two warps; thread-selecting means; a tying mechanism; means for actuating said selecting means and said tying mechanism, and for advancing them with relation to one of said warps; and means for moving the warp-supporting means for the other warp with relation to the thread-selecting means.

15. A warp-uniting machine having, in combination, supports for the full width of two warps, mechanism arranged to travel across the warps and unite corresponding threads of the warps, and means to move one of the warp supports to compensate for a difference between the widths of the warps.

16. In a warp-tying machine, in combination, means for supporting two warps; a warp-tying mechanism; means for advancing said warp-tying mechanism with relation to one of said warps; means for actuating the warp-tying mechanism; and means for moving the other of said warps with relation to the warp-tying mechanism.

17. A warp-tying machine having, in combination, a stationary support for one warp; a carriage for a second warp movable crosswise of the warp threads on the stationary support; a tying-carriage movable crosswise of both warps; a knotter, two thread-selectors, and a thread-conveyor on said tying-carriage, each selector taking successively the foremost thread of one of the warps, and the thread-conveyor transferring each pair of selected threads to the knotter; an automatic feed for the tying-carriage; an automatic differential feed mounted on the tying-carriage for moving the movable warp-carriage; and two sensitive movable feelers mounted on the tying-carriage, one of which by engagement with the foremost thread on the stationary warp-support automatically suspends the feed of the tying-carriage, and the other of which by engagement with the foremost thread on the movable warp-carriage automatically suspends the differential feed of the movable warp-carriage.

18. A warp-uniting mechanism having, in combination, a knotter, thread-selecting devices at one side of the knotter, shearing means at the opposite side of the knotter, and means reciprocating in a plane parallel with the planes of the warps for moving selected threads into the knotter.

19. In a warp-uniting machine, in combination, means for supporting a stationary warp; means for supporting a movable warp; a carriage; thread-selecting means and a uniting mechanism mounted on said carriage; means for actuating said selecting means and said uniting mechanism; means for advancing the carriage with relation to the stationary warp; and means for moving the movable warp.

20. In a warp-uniting machine, in combination, means for supporting two warps; a carriage movable with relation to one of said warps; thread-selectors, thread-separators and a uniting mechanism mounted on said carriage; and means for moving the other warp with relation to the carriage.

21. In a warp-uniting machine, in combination, means for supporting two warps; a carriage movable with relation to one of said warps; thread-selectors, thread-separators and a uniting mechanism mounted upon said carriage; means for actuating said selectors, separators and uniting mechanism; means for advancing said carriage with relation to one of said warps; and means for imparting a feed movement to the other warp with relation to the carriage.

22. A warp-tying machine having, in combination, a stationary support for one warp; a carriage for a second warp movable crosswise of the warp threads on the stationary support; a tying-carriage movable crosswise of both warps; a knotter and two thread selectors on said tying-carriage, each selector taking successively the foremost thread of one of the warps; an automatic feed for the tying-carriage; an automatic differential feed mounted on the tying-carriage for moving the movable warp-carriage; and two sensitive movable feelers mounted on the tying-carriage, one of which by engagement with the foremost thread on the stationary warp support automatically suspends the feed of the tying-carriage, and the other of which by engagement with the foremost thread on the movable warp-carriage automatically suspends the differential feed of the movable warp-carriage.

23. A warp-tying machine having, in combination, a stationary support for one warp; a carriage for a second warp movable cross-wise of the warp threads on the stationary support; a tying-carriage movable cross-wise of both warps; a knotter and thread selecting means on said tying-carriage; an automatic feed for the tying-carriage; an automatic differential feed mounted on the tying-carriage for moving the movable warp-carriage; and two sensitive movable feelers mounted on the tying-carriage, one of which by engagement with the foremost thread on the stationary warp support automatically suspends the feed of the tying-carriage, and the other of which by engagement with the foremost thread on the movable warp-carriage automatically suspends the differential feed of the movable warp-carriage.

24. In a warp-uniting machine, in combination, means for supporting two warps, one movable and the other stationary; a carriage; selectors for the threads of said warps upon said carriage; means for reciprocating said selectors; a uniting mechanism mounted on said carriage; means for operating said uniting mechanism; means for advancing said carriage with relation to the stationary warp-supporting means; and automatic means for imparting a feed movement to said movable warp-supporting means.

25. A warp-tying machine having, in combination, a stationary support for one warp; a carriage for a second warp movable crosswise of the warp threads on the stationary support; a tying-carriage movable crosswise of both warps; a knotter and thread selecting means on said tying-carriage; an automatic feed for the tying-carriage; an automatic differential feed for the movable warp carriage; and two sensitive movable feelers mounted on the tying-carriage, one of which by engagement with the foremost thread on the stationary warp support automatically suspends the feed of the tying-carriage, and the other of which by engagement with the foremost thread on the movable warp-carriage automatically suspends the differential feed of the movable warp-carriage.

26. In a warp-uniting machine, in combination, means for supporting two warps; a carriage; selectors mounted on said carriage; means for imparting a reciprocatory movement to said selectors across the plane of said warps; separators mounted on said carriage; means for imparting a reciprocatory movement to said separators parallel with the plane of said warps; a uniting mechanism also mounted on said carriage; means for actuating said uniting mechanism; and means for advancing said carriage with relation to one of said warps.

27. In a warp-uniting machine, in combination, means for supporting two warps; means for selecting a thread from each of said warps; means for uniting selected threads; and means adapted to be actuated by the absence of a warp thread at a point certain relative to said selecting means, for advancing said selecting and uniting means across one of said warps.

28. In a warp-uniting machine, in combination, means for supporting two warps; a thread-selecting means for each of said warps; means for uniting selected threads; and means adapted to be actuated by the absence of a warp thread at a point certain relative to the selector means for one of said warps for moving said warp.

29. A warp-uniting mechanism having, in combination, a uniter, thread-selecting devices at one side of the uniter, shearing means at the other side of the uniter, means for moving selected threads into the uniter, and means to withdraw the united threads from the vicinity of the selecting devices.

30. In a warp-uniting machine, in combination, means for supporting two warps; a thread-selecting means for each of said warps; means for uniting selected threads; and means adapted to be actuated by the absence of a warp thread of one of said warps from a point certain relative to the selector means for said warp, for advancing said uniting means with relation to the last mentioned warp.

31. In a warp-uniting machine, in combination, means for supporting two warps; a thread-selecting means for each of said warps; means for uniting selected threads; a feed mechanism for advancing said uniting means with relation to one of said warps; and means actuated by the absence of a thread of one of said warps from a point certain relative to the selector means for said warp, for moving said warp with reference to the last-mentioned selector means.

32. In a warp-uniting machine, in combination, means for supporting two warps; a thread-selecting means for each of said warps; means for uniting selected threads; means adapted to be actuated by the absence of a warp thread from a point certain relative to the selector means for one of said warps, for advancing said uniting means with relation to said warp; and means adapted to be actuated by the absence of a warp thread from a point certain relative to the selector means for the other warp, for moving said last mentioned warp with relation to the thread-uniting means.

33. In a warp-uniting machine, in combination, means for supporting two warps; means for selecting a thread from each of said warps; means for uniting selected threads; means for advancing said uniting and selecting means with relation to said warps; and means adapted to be actuated by the absence of a warp thread of one of said warps from a point certain relative to the selector means, for moving said warp relatively to said uniting and selecting means.

34. A warp-uniting machine having, in combination, means for supporting two warps; selectors for selecting a single thread from each warp and moving said threads toward one another; a reciprocatory separator blade for setting off each selected thread from its warp; and means for holding said selected threads.

35. A warp-uniting machine having, in combination, means for supporting two warps; selectors adapted to be reciprocated across the plane of said warps for selecting a single thread from each warp and moving said threads toward one another; a reciprocatory separator blade for setting off each selected thread from its warp; pneumatic means for holding said selected threads; two forks for placing said threads in said pneumatic holding means; a shear for severing said threads; and a spring for clamping the severed ends of said threads.

36. A warp-uniting machine having, in combination, means for supporting two warps; means for selecting a single warp thread from each warp and moving said threads toward one another; a separator blade for setting off each of said selected threads from adhering threads; a pusher fork for bringing said threads nearer together; an air tube having a converging throatway for receiving the threads from the pusher fork; and means for inducing an air current in said air tube.

37. A warp-uniting machine having, in combination, means for supporting two warps; means for selecting a single warp thread from each warp and moving said threads toward one another; a separator blade for setting off each of said selected threads from adhering threads; a shear for severing said threads; a pusher fork for bringing said threads nearer together; an air tube having a converging throatway for receiving the threads from the pusher fork; means for yieldingly holding the severed ends of said threads; and means for inducing an air current in said air tube.

38. A warp-uniting machine having, in combination, means for supporting two warps; selectors adapted to be reciprocated across the plane of said warps for selecting a single thread from each warp and moving said threads toward one another; a reciprocatory separator blade for setting off each thread from its warp; two air tubes having converging throatways for receiving said threads; two forks for pushing said threads into said throatways; a shear for severing said threads; a spring for holding the severed ends of said threads and means for inducing an air current in each of said air tubes.

39. In a textile mechanism, in combination, means for supporting a warp; means for selecting a thread and moving it away from the warp; a member for moving the selected thread to an operating mechanism; and a stop latch normally lying in the path of said member and adapted to be moved out of the path of said member by a selected thread.

40. In a textile mechanism, in combination, means for supporting a warp; means for selecting a thread and moving it away from the warp; a reciprocatory member for carrying the selected thread to an operating mechanism; and a pivoted stop latch normally adapted to engage said member to interfere with its reciprocation, which stop latch is adapted to be moved out of operative position by a selected thread.

41. In a textile mechanism, in combination, means for supporting a warp; means for selecting a thread from the warp; mechanism to operate upon the selected thread; a reciprocatory member for moving the selected thread to the operating mechanism; driving means for the selector, the operating mechanism and said reciprocatory member, means normally adapted to interfere with the reciprocation of said member, which said means is adapted to be actuated by a selected thread to permit such reciprocation; and means actuated by the stoppage of said reciprocatory member for disconnecting the driving means.

42. In a textile mechanism, in combination, means for supporting a warp; means for selecting a thread from the warp; an operating mechanism; a reciprocatory member for moving the selected thread to the operating mechanism; means normally adapted to interfere with the reciprocation of said member, which said means is adapted to be actuated by a selected thread to permit such reciprocation; a ratchet wheel carried by said reciprocatory member, adapted to be moved upon each interference with the reciprocation of said member; and means adapted to be operated by said ratchet wheel for controlling said operating mechanism.

43. In a throw-out mechanism, in combination, a reciprocatory member; a ratchet wheel carried by said member; means for rotating said wheel the distance of one tooth upon each reciprocation of said member; means for restoring said ratchet wheel upon each normal reciprocation of said member; means for interfering with the reciprocation of said member upon a failure of the mechanism; driving means; and means operated by the ratchet wheel for disconnecting the driving means after a predetermined number of partial rotations of said ratchet wheel.

44. In a throw-out mechanism, in combination, a reciprocatory member; means for reciprocating said member; means for arresting the movement of said member before it reaches one of the normal limits of its reciprocation; a counter ratchet wheel mounted on said member; a pin adapted to engage said ratchet wheel upon each reciprocation of said member to rotate said ratchet wheel the distance of one tooth; driving means; and means operated by the ratchet wheel for disconnecting the driving means after a predetermined number of advance movements of said ratchet wheel.

45. In a throw-out mechanism, in combination, a reciprocatory slide; a crank pin; a two-part separable connecting rod extending between the crank pin and the slide; a stop latch for engaging said slide; a counter ratchet wheel mounted on said slide; a pin adapted to engage said ratchet wheel at each rotation of the crank pin to rotate said counter ratchet wheel the distance of one tooth; a spring for restoring said counter ratchet wheel to its initial position; a pawl for preventing the rotation of said ratchet wheel by said spring; driving means; and means operated by the counter ratchet for disconnecting the driving means after a predetermined number of advance movements of the counter ratchet wheel.

46. In a mechanism for operating upon an unleased warp, in combination, means for supporting such a warp; means for taking a thread out of the plane of said warp; a separator blade for separating the thread so taken from adjacent threads; and means for actuating said blade.

47. In a mechanism for operating upon an unleased warp, in combination, means for supporting such a warp; means for taking a thread out of the plane of said warp; and a separating blade adapted to be interposed between said thread and its warp;

48. In a mechanism for operating upon an unleased warp, in combination, means for supporting such a warp; means for taking a thread out of the plane of said warp; a thread separating member having a separating edge inclined with relation to the line of threads; and means for actuating said member.

49. In a mechanism for operating upon an unleased warp, in combination, means for supporting such a warp, means for taking a thread out of the plane of said warp; a thread separating device comprising a separating wing; and means for actuating said separating device.

50. In a mechanism for operating upon an unleased warp, in combination, means for supporting such a warp; means for taking a thread out of the plane of said warp; a thread separating blade having a separating wing at its point; and means for actuating said blade.

51. In a mechanism for operating upon warp threads, in combination, means for supporting a warp; means for taking a thread from said warp; and a thread separating blade adapted to be reciprocated in a plane parallel with that of the warp.

52. In a mechanism for operating upon warp threads, in combination, means for supporting a warp; means for taking a thread from said warp; a thread separator blade having a separating wing at its point; and means for reciprocating said separator blade and wing in a plane parallel with that of said warp.

53. In a mechanism for operating upon a warp, in combination, means for supporting a warp; means for taking a thread from said warp; means for separating said thread from its warp; and means for arresting the action of said separating means while the thread-taking means continues to operate.

54. In a mechanism for operating upon a warp, in combination, means for supporting a warp; means for taking a thread from said warp; a reciprocatory device for separating said thread from its warp; and means for arresting the movement of said separating device while the thread-taking means continues to operate.

55. In a mechanism for operating upon an unleased warp, in combination, means for supporting such a warp; means for taking a thread from said warp; a reciprocatory separator blade for separating the thread so taken from adjacent threads; and thread-controlled means for arresting the movement of said separator blade.

56. A textile machine having, in combination, a main frame; a warp carriage movable longitudinally of the main frame; a mechanism carriage arranged to be fed along the main frame; mechanism on said mechanism carriage for moving the warp carriage; and an element movably mounted on the mechanism carriage and adapted to be engaged by threads on the warp carriage, said element controlling said warp-carriage-moving mechanism.

57. A machine for uniting two unleased warps having irregularly spaced threads having, in combination, supports for two such warps, another support, two thread selectors on said other support, one for each warp, said selectors being yieldingly mounted so as to engage irregularly positioned threads, a uniter stationarily mounted on said other support, a conveyor to carry a pair of selected threads to the uniter, and means to cause a relative feed movement between the warp supports and said other support.

58. In a mechanism for operating upon an unleased warp, in combination, means for supporting such a warp; means for taking a thread from said warp; a thread-separator device comprising a separator wing adapted to be interposed between a taken thread and the next adjacent thread; means for actuating said device; and means for arresting the movement of said separator device while the thread-taking means continues to operate.

59. A machine for uniting two unleased warps the threads of which are irregularly spaced, having, in combination, supports for two such warps, another support, two thread selectors on said other support, one for each warp, said selectors being yieldingly mounted so as to engage irregularly positioned threads, a uniter on said other support, and means to cause a relative feed movement between the warp supports and said other support.

60. In a mechanism for operating upon warp threads, in combination, means for supporting a warp; means for taking a thread from said warp; a thread separating blade adapted to be reciprocated in a plane parallel with that of the warp; and means for arresting the movement of said separating blade.

61. A warp-tying machine having, in combination, a stationary support for one warp; a carriage for a second warp movable crosswise of the warp threads on the stationary support; a tying-carriage movable crosswise of both warps; a knotter and thread selecting means on said tying-carriage; an automatic feed for the tying-carriage; an automatic differential feed for the movable warp-carriage; and two sensitive movable feelers mounted on the tying-carriage, one of which by engagement with the foremost warp thread of one warp automatically suspends the feed of the tying-carriage, and the other of which by engagement with the foremost thread of the other warp automatically suspends the differential feed of the movable warp-carriage.

62. A machine for uniting two unleased warps having irregularly spaced threads having, in combination, supports for two such warps, another support, two thread selectors on said other support, one for each warp, said selectors being yieldingly mounted so as to engage irregularly positioned threads, a uniter stationarily mounted on said other support to unite threads selected from the warps, and means to cause a relative feed movement between the warp supports and said other support.

63. In a mechanism for operating upon an unleased warp, in combination, means for supporting such a warp; means for taking a thread from said warp; a separator member for separating the thread so taken from adjacent threads; means for actuating said member; and a stop latch for arresting the movement of said member during a cycle of movement of the thread-taking means.

64. In a mechanism for operating upon an unleased warp, in combination, means for supporting such a warp; means for taking a thread from said warp; a reciprocatory separator blade adapted to be interposed between said taken thread and the warp; and a stop latch for arresting the movement of the blade during a cycle of movement of the thread-taking means.

65. A machine for uniting two unleased warps the threads of which are irregularly spaced having, in combination, a main frame, supports on said frame for holding two such warps, said supports including a clamp for the useful end of the old warp and a clamp for the useful end of the new warp, two yieldingly mounted selectors for taking threads from said warps, said selectors being pressed toward their respective warps into engagement with the variably-spaced threads thereof, separators to separate selected threads from adhering threads, a uniter to unite the separated threads, both of said clamps being at the same side of said selecting and uniting mechanism and at the same side of the main frame, and means to cause a relative feed movement between the thread selecting and uniting mechanism and the warp supports.

66. A machine for uniting two unleased warps the threads of which are irregularly spaced, having, in combination, devices to support two such warps, another support, two thread selectors, one for each warp, mounted on said other support, said selectors being yieldable to engage irregularly positioned threads, a severer on said support to sever selected threads, a uniter stationarily mounted on said other support, a device to move a pair of selected threads to the uniter, and means to cause a relative feed movement between the warp-supporting devices and said other support.

67. In a mechanism for operating upon warp threads, in combination, means for supporting a warp; means for taking a thread from said warp; a reciprocatory separator blade for separating the thread so taken from adjacent threads; and a stop latch adapted to be engaged by a taken thread for arresting the movement of the blade during a cycle of movement of the thread-taking means.

68. In a mechanism for operating upon warp threads, in combination, means for supporting a warp; means for taking a thread from said warp; a reciprocatory thread-separating member having a separating edge inclined with relation to the line of threads; and a stop latch adapted to be engaged by a taken thread for arresting the movement of said separating member during a cycle of movement of the thread-taking means.

69. In a mechanism for operating upon warp threads, in combination, means for supporting a warp; means for taking a thread from said warp; a reciprocatory thread-separating device comprising a separator wing; and a stop latch adapted to be engaged by a taken thread for arresting the movement of said separator device during a cycle of movement of the thread-taking means.

70. In a mechanism for operating upon warp threads, in combination, means for supporting a warp; means for taking a thread from said warp; a thread-separating blade adapted to be reciprocated in a plane parallel with that of the warp; and a stop latch adapted to be engaged by a taken thread for arresting the movement of said blade during a cycle of movement of the thread-taking means.

71. In a mechanism for operating upon warp threads, in combination, means for supporting a warp; means for taking a thread from said warp; a device adapted to be interposed between said thread and its warp for separating said thread from said warp; and a pivoted stop latch adapted to be normally within the path of the separator device, also in the path of a taken thread, to arrest the movement of said separator device during one cycle of the movement of the thread-taking means.

72. In a mechanism for operating upon warp threads, in combination, means for supporting a warp; means for taking a thread from said warp; a device adapted to be interposed between said threads and its warp for separating the thread from said warp; means for arresting the movement of said device, and means for preventing the rebound of said device when arrested.

73. In a mechanism for operating upon warp threads, in combination, means for supporting a warp; means for taking a thread from said warp; a device adapted to be interposed between said thread and its warp, for separating the thread from said warp; means for arresting the movement of said device; and laterally yielding means for preventing the rebound of said device when arrested.

74. A warp-uniting machine having, in combination, a stationary support for one warp; a carriage for a second warp movable crosswise of the warp threads on the stationary support; a uniter-carriage movable crosswise of both warps; thread selecting and uniting mechanism on said uniter-carriage; an automatic feed for the uniter-carriage; an automatic differential feed mounted on the uniter-carriage for moving the movable warp-carriage; and two sensitive movable feelers mounted on the uniter-carriage, one of which by engagement with the foremost thread on the stationary warp-support automatically suspends the feed of the uniter-carriage, and the other of which by engagement with the foremost thread on the movable warp-carriage automatically suspends the differential feed of the movable warp-carriage.

75. A warp-uniting machine having, in combination, a main frame, supports on said frame for two warps one of which is unleased and has irregularly spaced threads, mechanism for selecting and uniting the threads of said warps, the warp supports and the selecting mechanism being arranged to provide a yield between the selecting mechanism and the unselected threads, and means for causing a relative feed movement between the warp supports and said mechanisms.

76. A warp-uniting machine having, in combination, a stationary support for one warp; a carriage for a second warp movable crosswise of the warp threads on the stationary support; a uniter-carriage movable crosswise of both warps; thread selecting and uniting means on said uniter-carriage; an automatic feed for the tying-carriage; an automatic differential feed for the movable warp-carriage; and two sensitive movable feelers mounted on the uniter-carriage, one of which by engagement with the foremost thread of one warp automatically suspends the feed of the uniter-carriage, and the other of which by engagement with the foremost thread of the other warp automatically suspends the differential feed of the movable warp-carriage.

77. A warp-uniting machine having supports for two warps and a uniter-carriage, there being a relative movement between the uniter-carriage and one support, and a different relative movement between the uniter-carriage and the other warp-support; in combination with an automatic feed for producing the relative movement between the uniter-carriage and one of the warp-supports; an automatic differential feed for producing the differential relative movement between the uniter-carriage and the other warp-support; and two sensitive movable feelers mounted on the uniter-carriage, one of which by engagement with the foremost thread of one warp automatically suspends one feed, and the other of which by engagement with the foremost thread of the other warp automatically suspends the differential feed.

78. A machine for uniting two warps having irregularly spaced threads having, in combination, a main frame, supports on said frame for two such warps, said supports including a clamp for the useful end of the old warp and a clamp for the useful end of the new warp, mechanisms for selecting and uniting the threads of said warps, both of said clamps being at the same side of said mechanisms and at the same side of the main frame, the warp supports and the selecting mechanism being arranged to provide a yield between the selecting mechanism and the unselected threads, and means for causing a relative feed movement between the warp supports and said mechanisms.

79. A warp-uniting machine having, in combination, a main frame, supports on said frame to hold distended complete crosswise sections of two warps, said supports including a clamp for the useful end of the old warp and a clamp for the useful end of the new warp, mechanisms for selecting and uniting the threads of said warps, both of said clamps being at the same side of said mechanisms and at the same side of the main frame, guide means on said main frame extending transversely of the warps, and means to cause said mechanisms to travel on said guide means across the entire width of said warps through the space previously occupied by the distended warps.

80. In a mechanism for operating upon warp threads, in combination, means for supporting a series of threads, means for taking a thread from said series; a separating device adapted to be reciprocated in a plane parallel with that of the series, for separating the thread so taken from adjacent threads; and means for severing the thread.

81. In a mechanism for operating upon warp threads, in combination, means for supporting a series of threads; means for taking a thread from said series; a separator blade having a separating wing at its point, for separating the thread so taken from adjacent threads; means for reciprocating said separating blade and wing in a plane parallel with that of said series, and means for severing said thread.

82. A warp-uniting mechanism having, in combination, a uniter, thread-selecting devices at one side of the uniter, shearing means at the other side of the uniter, a slide reciprocable toward and away from the uniter, means on said slide for bringing together selected threads and moving them into the uniter, and shearing means on said slide to coact with the first-mentioned shearing means.

83. A warp-uniting machine having supports for two warps and a uniter-carriage, there being a relative movement between the uniter-carriage and one support, and a different relative movement between the uniter-carriage and the other warp-support; in combination with an automatic feed for producing the relative movement between the uniter-carriage and one of the warp-supports; an automatic differential feed for producing the differential relative movement between the uniter-carriage and the other warp-support; and two sensitive movable feelers, one of which by engagement with the foremost thread of one warp automatically suspends one feed, and the other of which by engagement with the foremost thread of the other warp automatically suspends the differential feed.

84. A warp-uniting machine having supports for two warps and a uniter-carriage. there being a relative automatic movement between the uniter-carriage and one warp-support, and a different relative automatic movement between the uniter-carriage and the other warp-support; in combination with two sensitive movable feelers mounted on the uniter-carriage, one of which by engagement with the foremost thread of one warp automatically suspends the relative movement between the uniter-carriage and one of the warp-supports, and the other of which by engagement with the foremost thread of the other warp automatically suspends the differential relative movement between the uniter-carriage and the other warp-support.

85. A warp-uniting machine having supports for two warps and a uniter-carriage. there being a relative automatic movement between the uniter-carriage and one warp-support, and a different relative automatic movement between the uniter-carriage and the other warp-support; in combination with two sensitive movable feelers, one of which by engagement with the foremost thread of one warp automatically suspends the relative movement between the uniter-carriage and one of the warp-supports, and the other of which by engagement with the foremost thread of the other warp automatically suspends the differential relative movement between the uniter-carriage and the other warp-support.

86. A warp-support; a selector carriage movable relatively to said warp-support; a thread selector on said carriage taking successively the foremost thread of the warp on said support; an automatic feed producing said relative movement; and a sensitive movable feeler mounted on said carriage which by engagement with the foremost thread on the warp-support automatically suspends said feed, in combination with a stop-motion for said feed; an actuator for the stop-motion which actuates the stop-motion to stop the feed after being advanced from its initial position a predetermined number of steps; a restorer for the actuator; and a controller for the stop-motion actuator carried by the selector-carriage, said controller acting in its normal position to advance said actuator step-by-step, but being moved by a thread selected by said selector into an inactive position where it does not govern the action of the stop-motion actuator which is thereupon restored to its initial position.

87. A warp-support; a selector-carriage movable relatively to said warp-support; a thread selector on said carriage which takes successively the foremost thread of the warp on said support; an automatic feed producing said relative movement, and a sensitive movable feeler mounted on said carriage which by engagement with the foremost thread on the warp-support automatically suspends the feed, in combination with a stop-motion for said feed; and a controller on said carriage the movement of which is governed by a thread selected by said selector, said stop-motion being brought into action after a predetermined number of successive failures of the selector to take a thread.

88. In a mechanism for operating upon warp threads, in combination, means for supporting a warp; means for taking a thread from said warp; means for severing said thread; and pneumatic means for holding the loose end of said thread after severing.

89. In a mechanism for operating upon warp threads, in combination, means for supporting a warp; means for taking a thread from said warp; means for severing said thread; means for clamping the thread; and pneumatic means for holding the loose end of said thread after severing.

90. In a mechanism for operating upon warp threads, in combination, means for supporting a warp; means for taking a thread from the warp; means for separating said thread from adjacent threads, means for severing said thread; an air tube for holding the loose end of said thread after severing; and an abutment to prevent said thread from being moved by said separating means out of proper position with relation to said tube.

91. In a textile machine, in combination, means for supporting a warp; means for taking a thread from said warp; means for feeding said warp with relation to said thread-taking means; and means for preventing momentum movement of said warp.

92. A warp-support; a selector carriage movable relatively to said warp-support; a thread selector on said carriage taking successively the foremost thread of the warp on said support; a thread-conveyor which takes the selected thread; an automatic feed producing said relative movement; and a sensitive movable feeler mounted on said carriage which by engagement with the foremost thread on the warp-support automatically suspends said feed, in combination with a controller for the thread-conveyor which acts in its normal position to prevent the action of the thread-conveyor but which is moved by a thread selected by said selector into an inactive position where it does not prevent the action of the thread-conveyor.

93. A warp-uniting mechanism having, in combination, a carriage, a uniter on the carriage, thread-selecting devices at one side of the uniter, shearing means at the other side of the uniter, a slide on the carriage reciprocable toward and away from the uniter, means on said slide for bringing together selected threads and moving them into the uniter, shearing means on said slide to coact with the first-mentioned shearing means, and a member on said slide to withdraw the united threads.

94. A warp-support; a selector-carriage movable relatively to said warp-support; a thread selector on said carriage which takes successively the foremost thread of the warp on said support; an automatic feed producing said relative movement; and a sensitive movable feeler mounted on said carriage which by engagement with the foremost thread on the warp-support automatically suspends the feed, in combination with means acting on the selected thread; and a controller on said carriage the movement of which is governed by a thread selected by said selector, said controller preventing the action of such means whenever the selector fails to select a thread.

95. A warp-uniting machine having, in combination, a bed, two warp supports above the bed for holding two warps in parallel relation, the support for one of the warps being a removable frame; a carriage arranged to travel on said bed, and warp-uniting mechanism on the carriage, the removable frame being upwardly bowed to accommodate said mechanism in its travel.

96. A warp-uniting machine having, in combination, a bed, two parallel clamps above the bed for supporting a warp in a horizontal position, a warp frame removably supported above said clamps for holding another warp, a carriage arranged to travel on said bed, and warp-uniting mechanism on the carriage, the warp frame being upwardly bowed to accommodate said mechanism in its travel.

97. A warp-uniting machine having, in combination, supports for two warps; a uniter-carriage movable crosswise of both warps; a uniter, two thread selectors, and a thread-conveyor on said carriage, each selector taking successively the foremost thread of one of the warps, and the thread-conveyor transferring each pair of selected threads to the uniter; an automatic feed for the uniter-carriage; a sensitive movable feeler mounted on the uniter-carriage, which by engagement with the foremost thread of one of the warps automatically suspends the feed of the uniter-carriage; a stop motion for the uniter-carriage; an actuator for the stop-motion which actuates the stop-motion to stop the machine after being advanced a predetermined number of steps; a restorer for the actuator; and two controllers carried by the uniter-carriage, each controller acting in its normal position to suspend the action of said thread-conveyor and to advance the stop-motion actuator step-by-step, but each controller being moved by a thread selected by the coacting selector into an inactive position where it does not affect the action of the thread-conveyor and in which the stop-motion actuator is restored to its initial position.

98. In a warp-uniting machine, in combination, means for supporting a warp; means for taking a thread from said warp; means for separating said thread from its warp; means for feeding said warp with relation to said thread-taking means; and means adapted to be acted upon by a warp thread for suspending the feeding action of said feeding means.

99. In a warp-uniting machine, in combination, means for supporting a warp; means for taking a thread from said warp; means for separating said thread from its warp; means for severing said thread; means for feeding said warp with relation to said thread-taking means; and means adapted to be acted upon by a warp thread for suspending the feeding action of said feeding means.

100. In a warp-uniting machine, in combination, means for supporting a warp; means for taking a thread from the warp; means for separating said thread from its warp; means for producing a relative feed movement between said warp and the thread-taking means; and means adapted to be acted upon by a warp thread for suspending the feeding action of said feeding means.

101. In a warp-uniting machine, in combination, means for supporting a warp, means for taking a thread from said warp; means for separating said thread from its warp; means for severing said thread; means for producing a relative feed movement between the warp and the thread-taking means; and means adapted to be acted upon by a warp thread for suspending the feeding action of said feeding means.

102. In a warp-uniting machine, in combination, means for supporting a warp; means for taking a thread from said warp; means for separating said thread from said warp; a pawl and ratchet feeding mechanism for producing a relative feed movement between the thread-taking means and the warp; and means adapted to be acted upon by a warp thread for limiting the effective engagement between said pawl and ratchet.

103. In a warp-uniting machine, in combination, means for supporting a warp; means for taking a thread from said warp; means for separating said thread from its warp; means for severing said thread; a pawl and ratchet feeding mechanism for producing a relative feed movement between the thread-taking means and the warp; and means adapted to be acted upon by a warp thread for limiting the effective engagement between said pawl and ratchet.

104. In a warp-uniting machine, in combination, means for supporting a warp; means for taking a thread from said warp; means for separating said thread from its warp; a pawl and ratchet feeding mechanism for producing a relative feed movement between the thread-taking means and the warp; and a lever adapted to be acted upon by a warp thread for limiting the effective engagement between said pawl and ratchet.

105. In a warp-uniting machine, in combination, means for supporting a warp; means for taking a thread from said warp; means for separating said thread from its warp; means for severing said thread; a pawl and ratchet feeding mechanism for producing a relative feed movement between the thread-taking means and the warp; and a lever adapted to be acted upon by a warp thread for limiting the effective engagement between said pawl and ratchet.

106. A warp-uniting machine having in combination, means for supporting a warp; a thread-engaging member; a spring tending to hold said member against the foremost thread of the warp; means for moving said member across the plane of said warp; and means for restraining the movement of said member under the influence of its spring.

107. In a textile machine, in combination, means for supporting a warp; a thread-engaging member; a spring tending to hold said member against the foremost thread of the warp; means for moving said member across the plane of said warp; a movable stop finger for restraining the movement of said member under the influence of its spring; and connections whereby said finger is moved during the movement of said member across the plane of said warp.

108. A warp-uniting machine having in combination, supports for two warps; a uniter-carriage movable crosswise of both warps; a uniter, two thread selectors, and a thread-conveyor on said carriage, each selector taking successively the foremost thread of one of the warps, and the thread-conveyor transferring each pair of selected threads to the uniter; an automatic feed for the uniter-carriage; a sensitive movable feeler mounted on the uniter-carriage which by engagement with the foremost thread of one of the warps automatically suspends the feed of the uniter-carriage; and two controllers carried by the uniter-carriage, each controller acting in its normal position to suspend the action of said thread-conveyor, but each controller being moved by a thread selected by the coacting selector into an inactive position where it does not affect the action of the thread-conveyor.

109. In a warp-uniting machine, in combination, means for supporting two warps in substantially parallel planes; a thread-engaging device for each of said warps; means for synchronously moving said devices toward and away from each other across the planes of said warps; a thread-separating blade for each of said warps, said blades being arranged to move together; and means for reciprocating said blades between said warps.

110. A warp-tying machine having, in combination, a stationary support for one warp; a carriage for a second warp movable crosswise of the warp threads on the stationary support; a tying carriage movable crosswise of both warps; a knotter, two thread selectors, and a thread-conveyor on said tying-carriage, each selector taking successively the foremost thread of one of the warps, and the thread-conveyor transferring each pair of selected threads to the knotter; an automatic feed for the tying-carriage; an automatic differential feed mounted on the tying-carriage for moving the movable warp-carriage; two sensitive movable feelers mounted on the tying-carriage, one of which by engagement with the foremost thread on the stationary warp-support automatically suspends the feed of the tying-carriage, and the other of which by engagement with the foremost thread on the movable warp-carriage automatically suspends the differential feed of the movable warp-carriage; a stop-motion on the tying-carriage; and two stop-motion controllers carried by the tying-carriage acting in their normal positions to suspend the action of said thread-conveyor and by a plurality of predetermined successive periods of rest serving to bring the stop-motion into action, each controller being moved by a thread selected by the coacting selector into an inactive position where it does not affect the action of the thread conveyor.

111. A machine for operating upon an unleased warp having, in combination, a warp support which maintains a sheet of warp threads in a single plane and has a clamp for the free ends of the warp threads; a selector moving across the plane of the warp which acts to displace the foremost warp thread from that plane; a thread separator which moves between the plane of the warp and that of the displaced selected thread and between said selector and warp clamp; a thread severer which severs the thread adjacent said warp clamp; and a thread-clamp which grasps the severed thread.

112. A warp-tying machine having, in combination, supports for a pair of warps; a selector for each warp, the two selectors acting to move their respectively selected threads toward each other; a knotter; a conveyor acting to transfer the selected threads from the selectors to the knotter; and converging thread guides on the conveyor and also adjacent the knotter acting to bring the selected threads toward each other.

113. A warp-uniting machine having, in combination, a bed, two parallel clamps above the bed for supporting a warp in a horizontal position, tracks supported above the bed, a warp carriage adapted to be removably placed upon said tracks and movable along said tracks, said carriage being arranged to hold a warp above the other warp, a carriage arranged to travel on the bed, and warp-uniting mechanism on the last mentioned carriage, the frame of the warp carriage being upwardly bowed to accommodate said mechanism in its travel.

114. In a warp-uniting machine, in combination, means for supporting two warps; a thread-taking means for each of said warps; and means for replacing a thread taken by one of said thread-taking means when no thread is taken by the other.

115. A warp tying machine having, in combination, two warp supports; selecting mechanism acting to select a thread from each warp; a knotter; a thread clamping jaw adjacent said knotter; a conveyor which transfers the selected threads to the knotter; a clamping jaw movable with the conveyor which clamps the selected threads against the other jaw; a thread severer which severs the clamped threads; and a thread holder which yieldingly retains the loose ends of the threads after they are cut and released by the clamping jaws and during the formation of the knot.

116. A machine for operating upon two series of warp threads having, in combination, means to hold the threads at one place, means to hold the threads at another place, two selectors operatively related to the threads at an intermediate place, means acting adjacent to the selectors to take selected threads, and independent means to cause relative adjustment between each selector and the corresponding series of threads.

117. A warp-uniting machine having, in combination, two warp supports, a thread-uniting mechanism, and thread-controlled means for moving one of these elements with relation to another.

118. In a warp-uniting machine, in combination, means for supporting two warps in substantially parallel planes, the threads of each warp lying in the same plane; means for taking a thread from each of said warps; means for severing said threads; means for bringing said threads together, side by side, at a uniting means; and means for uniting said threads.

119. A warp-uniting machine having, in combination, supports for two warps, means for imparting a movement to one warp support across the threads on the other support without affecting such other warp; means for selecting threads from said warps; and a uniter for joining together the selected threads.

120. A warp-uniting machine having, in combination, a movable warp carriage; a selector which successively takes the warp threads on said carriage; automatic means for feeding said warp-carriage step-by-step; thread-controlled means governing said feeding means; and a brake which prevents momentum movement of the warp carriage.

121. In a warp-uniting machine, in combination, means for supporting two warps; means for taking a thread from one of said warps; means for uniting said thread with a thread of the other warp; means for severing said threads; and means for holding the loose ends of said threads after severing and during the uniting operation.

122. In a warp-uniting machine, in combination, means for supporting two warps; means for taking a thread from each of said warps; means for severing said threads; means for uniting the severed threads, and means for holding the loose ends of said threads after severing and during the uniting operation.

123. In a warp-uniting machine, in combination, means for supporting two warps in substantially parallel planes, the threads of each warp lying in the same plane; means for taking a thread from each of said warps; means for severing said threads; means for bringing said threads together, side by side, at a uniting means; means for uniting said threads; and means for holding the loose ends of said threads after severing and during the uniting operation.

124. In a warp-uniting machine, in combination, means for supporting two warps; means for taking a thread from each of said warps; a separator blade for separating each of said threads from its warp; means for severing said threads; means for uniting said threads; and means for bringing said threads together, side by side, comprising a fork fixed between said blades, said fork having inclined inner sides.

125. In a textile machine, in combination, means for supporting two warps; an operating mechanism; and means for producing a movement of one of said warps with relation to said operating mechanism, said movement being in a direction transverse to the length of the threads.

126. In a textile machine, in combination, means for supporting a warp; means for moving said warp; and means for preventing momentum movement of said warp.

127. In a textile machine, in combination, means for supporting two warps; means for moving one of said warps with relation to the other warp; and means for preventing momentum movement of the movable warp.

128. An organized machine for tying warp threads having, in combination, devices for supporting two warp sections, thread tying mechanism, two sets of warp thread engaging devices adapted to act progressively to engage with the threads of the respective warps and present successive pairs of threads one from each warp to the tying mechanism, and instrumentalities to compensatingly adjust the relation of the thread engaging devices to the foremost unjoined threads.

129. In a textile machine, in combination, means for supporting two warps; means for operating upon threads; and a pawl and ratchet feed for imparting a movement to one of said warps with relation to the operating means.

130. In a textile machine, in combination, means for operating upon threads; means for supporting two warps; and a thread-controlled step-by-step feed for imparting a movement to one of said warps with relation to the operating means.

131. A warp-tying machine having means for holding distended two sets of warp threads, knotting means and means for positioning a pair of threads for engagement with the knotting means, said positioning means being movable during the tying of the knot with reference to the knotting means.

132. A warp-tying machine having, in combination, means to support two distinct and separate threads each at a plurality of separated points in parallel relation, a rotatable tying bill, means for opening and closing said tying bill, and means for effecting the moving of two separate and distinct threads into the path of the open tying bill.

133. An organized warp-uniting machine having, in combination, thread uniting mechanism, the latter including a rotary tying member, devices for holding two unleased warp sections, independent thread separating means for engaging and separating the threads of the two warp sections, and a common thread engaging device for engaging and taking two separated threads, one from each warp, and moving them to the tying member.

134. A warp-uniting machine having means for holding distended a series of warp threads, knotting means, means for positioning a pair of threads with reference to the knotting means, and additional means for tensioning said threads during the knot-tying operation.

135. In a warp-uniting machine, in combination, means for supporting two warps; means for taking a thread from each of said warps; a carriage for supporting said thread-taking means; and a thread-controlled feeding mechanism for moving said carriage with relation to one of said warps.

136. A warp-tying machine having, in combination, a rotatable tying bill having means to open and close, guide means to position the thread ends to be engaged by the tying bill in the initial formation of the loop, means to turn the tying bill, means to open the same, means to move said guide means to place the thread ends between the parts of the open tying bill, means to sever the thread ends close to the end of the tying bill and means to tension the thread ends.

137. In a warp-tying mechanism, the combination with knot-tying means, of pneumatic stripping means for displacing the thread ends.

138. In a warp-uniting machine, in combination, means for supporting two warps; means for taking a thread from each of said warps; means for moving one of said warps with relation to the thread-taking means; and means adapted to be engaged by a warp thread for suspending the action of said moving means.

139. In a warp-uniting machine, in combination, means for supporting two warps; means for taking a thread from each of said warps; means for producing a movement between one of said warps and its thread taking means; means for producing a movement between the other thread-taking means and its warp; and means for engagement by a warp thread for suspending one of the said movements without affecting the other.

140. In a warp-uniting machine, in combination, means for supporting two warps; means for taking a thread from each of said warps; means for moving the thread-taking means with relation to one of said warps; and means adapted to be engaged by a warp thread for suspending the action of said moving means.

141. In a warp-uniting machine, in combination, means for supporting two warps; means for taking a thread from each of said warps; means for producing a movement between one of said warps and the thread-taking means; and means adapted to be engaged by a warp thread for suspending the action of said moving means.

142. In a warp-uniting machine, in combination, means for supporting two warps; means for operating upon the threads of said warps; a pawl and ratchet feeding mechanism for imparting a movement to one of said warps with relation to the operating means; and means adapted to be acted upon by a warp thread for limiting the effective engagement between said pawl and ratchet.

143. In a warp-uniting machine, in combination, means for supporting two warps; means for taking a thread from each of said warps; a pawl and ratchet feeding mechanism for said thread taking means; and means adapted to be acted upon by a warp thread for limiting the effective engagement between said pawl and ratchet.

144. In a warp-uniting machine, in combination, means for supporting two warps; means for taking a thread from each of said warps; a pawl and ratchet feeding mechanism for producing a relative movement between the thread-taking means and one of the warps; and means adapted to be acted upon by a warp thread for limiting the effective engagement between said pawl and ratchet.

145. In a warp-uniting machine, in combination, means for supporting two warps; means for operating upon threads; a pawl and ratchet feeding mechanism for imparting a movement to one of said warps with relation to the operating means; and a lever adapted to be acted upon by a warp thread for limiting the effective engagement between said pawl and ratchet.

146. In a warp-uniting machine, in combination, means for supporting two warps; means for taking a thread from each of said warps; a pawl and ratchet feeding mechanism for said thread-taking means; and a lever adapted to be acted upon by a warp thread for limiting the effective engagement between said pawl and ratchet.

147. In a warp-uniting machine, in combination, means for supporting two warps; means for taking a thread from each of said warps; a pawl and ratchet feeding mechanism for producing a relative feed movement between the thread-taking means and one of the warps; and a lever adapted to be acted upon by a warp thread for limiting the effective engagement between said pawl and ratchet.

148. In a warp-uniting machine, in combination, means for supporting two warps; means for operating upon threads; a pawl and ratchet feeding mechanism for imparting a movement to one of said warps with relation to the operating means; and a pivoted two-arm lever, one arm of which is adapted to be engaged by a warp thread to place the other arm of the lever in position to limit the effective movement of the pawl with relation to its ratchet.

149. In a warp-uniting machine, in combination, means for supporting two warps; means for taking a thread from each of said warps; a pawl and ratchet feeding mechanism for said thread-taking means; and a pivoted two-arm lever, one arm of which is adapted to be engaged by a warp thread to place the other arm of the lever in position to limit the effective movement of the pawl with relation to its ratchet.

150. In a warp-uniting machine, in combination, means for supporting two warps; means for taking a thread from each of said warps; a pawl and ratchet feeding mechanism for producing a feed movement between the thread-taking means and one of said warps; and a pivoted two-arm lever, one arm of which is adapted to be engaged by a warp thread to place the other arm of the lever in position to limit the effective movement of the pawl with relation to its ratchet.

151. In a warp-uniting machine, in combination, means for supporting two warps; means for taking a thread from each of said warps; means for moving one of said warps with relation to the thread-taking means; and a lever adapted to extend within the path of movement of said warp for holding said moving means from action.

152. In a warp-uniting machine, in combination, means for supporting two warps; means for operating upon the threads of said warps; means for producing a movement of one of said warps; and a lever adapted to extend within the path of movement of said movable warp for holding said moving means from action.

153. In a warp-uniting machine, in combination, means for supporting two warps; means for taking a thread from each of said warps; means for moving the thread-taking means with relation to one of said warps; and a lever travelling with said thread-taking means and adapted to be engaged by a warp thread for holding said moving means from action.

154. In a warp-uniting machine, in combination, means for supporting two warps; independent means for taking a thread from each of said warps; means for moving one of said thread-taking means with relation to one of said warps; and means for moving the other warp with relation to the other thread-taking means.

155. In a warp-uniting machine, in combination, means for supporting two warps; independent means for taking a thread from each of said warps; thread-controlled means for moving said thread-taking means with relation to one of said warps; and thread-controlled means for moving one of said warps with relation to one of the thread-taking means.

156. In a warp-uniting machine, in combination, means for supporting two warps; independent means for taking a thread from each of said warps; a pawl and ratchet feed mechanism for moving one of said thread-taking means with relation to one of said warps; and a pawl and ratchet feed mechanism for moving the other of said warps with relation to its thread-taking means.

157. A warp-uniting machine having, in combination, two warp supports, mechanism for selecting threads from both warps, and thread-controlled means for causing relative movement between the selecting mechanism and both warp supports.

158. The combination with warp-tying means, of thread-placing means, means for supporting a pair of warps, means for separating the threads thereof prior to the action thereon of said thread-placing means, and means for giving compensating adjustment to the position of the warp-tying means relatively to the warp.

159. In a warp-tying machine, in combination, means for supporting two warps; a warp-tying mechanism; means for causing a movement between said warp-tying mechanism and one of said warps; and means for producing a movement between one of said warps and said warp-tying mechanism.

160. In a warp-uniting machine, in combination, means for supporting two warps; a warp-uniting mechanism; means for causing relative travel between said warp-uniting mechanism and said warps; and means for preventing momentum movement of said parts.

161. In a warp-uniting machine, in combination, means for supporting two warps; a warp-uniting mechanism; means for causing a movement between said warp-uniting mechanism and one of said warps; means for producing a movement between one of said warps and the uniting mechanism; and means for preventing momentum movement of said parts.

162. In a warping-uniting machine, in combination, means for supporting a warp; a warp-uniting mechanism: means for feeding said warp-uniting mechanism with relation to said warp; and means for preventing momentum movement of said warp-uniting mechanism.

163. In a warp-uniting machine, in combination, means for supporting a warp; a warp-uniting mechanism; means for moving one of said parts with relation to the other; and means for preventing momentum movement of the movable part.

164. A machine for uniting two warps having, in combination, two selectors, one for each warp, uniting means, means for moving selected threads to the uniting means, and means for automatically suspending the operation of said moving means upon failure of either selector to select a thread.

165. In a warp-tying machine, in combination, means for supporting a warp; means for taking a thread from said warp; means for tying together said thread and a thread from another warp; and means for moving said warp-supporting means with relation to said tying means.

166. A warp-uniting machine having, in combination, thread-selecting means, uniting means, means for moving selected threads to the uniting means, and means for automatically suspending the operation of one of said means upon failure of another of said means.

167. In a warp-tying machine, in combination, means for supporting two warps; means for tying together two threads, one from each of said warps; and means for moving one of said warps with relation to said tying means.

168. In a mechanism for operating upon warp threads, in combination, means for supporting a series of warp threads in substantially a plane; means for taking a thread from said series; and a thread separating device adapted to be reciprocated in a plane parallel with that of the series of threads.

169. An organized warp-tying mechanism comprising, in combination, means to support two distinct and separate threads each at a plurality of separated points, the threads being in a generally parallel but spaced relation with respect to each other, a knot tying device having a rotatable tying-bill with mechanism to open and close the same, means to take said threads from their defined position of spaced parallel relationship and to position them together in operative relation to the rotatable bill to be taken by the open bill during the rotation thereof, and means to operate said tying-device to tie said threads into a knot.

170. In a mechanism for operating upon warp threads, in combination, means for supporting a series of threads in substantially a plane; means for taking a thread from said series; and a separating blade adapted to be reciprocated in a plane parallel with that of said series of threads for further separating the taken thread from the series.

171. In a mechanism for operating upon warp threads, in combination, means for supporting a series of threads in substantially a plane; means for taking a warp thread from said series; a thread-separator blade having a separating wing at its point; and means for reciprocating said blade and wing in a plane parallel with that of said series to interpose said wing and blade between a taken thread and said series.

172. An organized machine to separate threads singly from each of two warps each of which has its component threads normally irregularly spaced in an unleased sheet and to tie together selected threads from each warp, said machine embodying, in combination, warp holding means to hold crosswise sections of two such warps, a knotter, a support therefor, feeding mechanism to cause a relative traverse between said support and said warp holding means lengthwise of the latter and crosswise the two warps, devices associated with said knotter and adapted during said traverse successively and progressively to select threads singly from each of the warps and then to present the selected threads to the knotter, and instrumentalities adapted to adjust to the spacing of the warp threads the action of the associated thread-selecting and presenting devices and knotter in their said relative traverse; thereby to insure the progressive and successive selection of pairs of threads, one from each warp, and the progressive presentation of such selected threads to the knotter and to compensate for the varying spacing of the threads of each warp and for the variance of the two warps in total widths thereof.

173. In a warp-uniting machine for operating upon unleased warp threads, in combination, means for supporting such a warp; a member having a hook adapted to engage a thread; means for moving said member across the plane of said warp; and means for separating a thread taken by said member from an adhering thread.

174. In a machine for uniting warp threads, in combination, means for supporting a warp; means for deflecting the warp threads sidewise at a point between their points of support; a yieldingly mounted device adapted to disengage a thread from said deflecting means; means for moving said device across the plane of said warp; and a blade having a to-and-fro movement and arranged for insertion between the disengaged thread and the adjacent threads.

175. In a machine for uniting warp threads, in combination, means for supporting a warp; means for deflecting the warp threads sidewise at a point between their points of support; a pivotally mounted device adapted to disengage a thread from said deflecting means; a spring tending to pivotally move said device toward the warp; means for reciprocating said device across the plane of the warp; and means for separating the disengaged thread from adjacent threads.

176. In a machine for uniting warp threads, in combination, means for supporting a warp; means for stretching said warp; means for deflecting the warp threads at a point between their points of support; a yieldingly mounted device adapted to disengage a thread from said deflecting means; means for actuating said device transversely the plane of said warp; and means for separating the disengaged thread from adjacent threads.

177. An organized machine for tying the ends of warp threads comprising, in combination, a plurality of warp supports for holding unleased commercial warp sections, warp tying mechanism, feeding means for causing relative change of position between said supports and said tying mechanism to permit the latter to tie threads from a plurality of warps, means to present threads that are to be tied operatively to said tying mechanism and compensating means to compensate for or adapt the action of said presenting means to the varying relation of said warp threads on the several supports.

178. An organized machine for tying together the threads of unleased warps comprising, in combination, supporting devices to hold the crosswise sections of two such warps, operating mechanism including warp tying mechanism adapted to act progressively upon the threads of the two warps, feeding means to cause relative traverse between the warp supports and the operating mechanism, devices to present successive pairs of threads one from each warp to the tying mechanism, and compensating means to compensate for the difference in position of successive threads of the two sections with relation to the operating mechanism in the course of its progressive action.

179. An organized machine for joining together the threads of unleased warps comprising, in combination, supporting devices for holding the crosswise sections of two such warps, knotting mechanism adapted to act progressively upon the threads of the two warps, feeding means to cause relative traverse between the warp supports and the knotting mechanism and compensating means to compensate for the difference in position of the successive threads with relation to the knotting mechanism.

180. In a warp-uniting machine, in combination, means for supporting a warp; means for taking a thread from said warp; a separating blade adapted to be interposed between said thread and its warp; and a thread-uniting mechanism, said blade having a sliding portion adapted to permit said blade to pass said uniting mechanism.

181. In a mechanism for operating upon warp threads, in combination, means for supporting a warp; means for taking a thread from said warp; means for separating said thread from its warp; a yielding driving means for said separating means; and means for arresting the movement of said separating means.

182. In a mechanism for operating upon warp threads, in combination, means for supporting a warp; means for taking a thread from said warp; a blade for separating said thread from its warp; a crank for reciprocating said blade; a yielding connection between said blade and said crank; and means for arresting the movement of said blade.

183. In a mechanism for operating upon warp threads, in combination, means for supporting a warp; means for taking a thread from said warp; a blade for separating said thread from its warp; a crank for reciprocating said blade; a rod, extensible in length, for connecting said crank and said blade; yielding means for preventing the extension of said rod; and means for arresting the movement of said blade.

184. In a mechanism for operating upon warp threads, in combination, means for supporting a warp; means for taking a thread from said warp; a blade for separating said thread from its warp; a crank for reciprocating said blade; a two-part rod for connecting said crank with said blade; a spring latch for holding the parts of said rod together; and means for arresting the movement of said blade.

185. In a mechanism for operating upon warp threads, in combination, means for supporting a warp; means for taking a thread from said warp; a blade for separating said thread from its warp; a crank for reciprocating said blade; a rod, extensible in length, for connecting said crank and said blade; means for arresting the movement of said blade; a stop arranged to yield in one direction; and a projection on said rod adapted to engage said stop when the movement of said blade is arrested.

186. In a mechanism for operating upon warp threads, in combination, means for supporting two warps; means for taking a thread from each of said warps; means for separating said threads from their warps; means for arresting the action of said separating means; and means for replacing a thread taken from one warp when no thread is taken from the other.

187. In a mechanism for operating upon warp threads, in combination, means for supporting two warps; means for taking a thread from each of said warps; means for separating said threads from their warps; a yielding driving means for said separating means; means for arresting the movement of said separating means; and means for replacing a thread taken from one warp when no thread is taken from the other.

188. An organized machine for tying together the threads of unleased warps comprising, in combination, supporting devices to hold the sections of two such warps, warp tying mechanism adapted to act progressively upon the threads of the two warps, feeding means to cause relative traverse between the warp supports and the tying mechanism, devices to present a pair of threads one from each warp to the tying mechanism and provision to variably and compensatingly adjust the action of said devices to the varying relation of the successive threads on the two supports to the tying mechanism in the course of such progressive action.

189. An organized machine for tying together the threads of unleased warps comprising, in combination, supporting devices to hold the crosswise sections of two such warps, warp tying mechanism adapted to act progressively upon the threads of the two warps, feeding means to cause relative traverse between the warp supports and the tying mechanism, and compensating means to compensate for, or adapt the action of said mechanism to, the irregular spacing of the individual threads on said warp supports.

190. In a warp-uniting machine, in combination, means for supporting two warps; a carriage; a warp-uniting mechanism mounted on said carriage, said mechanism comprising a slidable thread-separating member; a shear blade fixed with relation to said carriage; and a cooperating shear blade fixed to said slidable thread-separating member.

191. In a means for uniting threads, in combination, a uniting mechanism; and an exhaust air tube for receiving the ends of the threads to be united, said tube having a throatway with converging walls.

192. In a means for uniting threads, in combination, a uniting mechanism; an exhaust air tube for receiving the ends of the threads to be united, said tube having a throatway with converging walls; and a reciprocatory fork having converging inner sides for placing said threads in said throatway.

193. In a means for uniting threads, in combination, a uniting mechanism; an exhaust air tube for receiving the ends of the threads to be united; and a reciprocatory member carrying a clamping spring, said spring being arranged to enter said air tube and clamp the threads against the inner side wall of said tube.

194. In a knot-tying mechanism, in combination, means for looping the threads, and means for tightening the knot comprising a pivoted thread hook and a pivoted clamping arm, which clamping arm has clamping fingers adapted to cover the point of said thread hook, said clamping arm being arranged to keep the point of said thread hook covered during the pivotal movements of said thread hook.

195. A warp-uniting machine having, in combination, thread-selecting means, uniting means, means for moving selected threads to the uniting means, and thread-controlled means for suspending the operation of said moving means.

196. In a warp-tying machine, in combination, a bed; a pair of warp clamps upon said bed; a warp carriage supported adjacent to said bed; and provided with a pair of warp clamps; and a warp-tying mechanism arranged to travel upon said bed between said clamps.

197. An organized machine for tying warps having, in combination, supporting means for supporting two warp sections, the threads of each warp section lying normally in substantially the same plane, thread taking mechanism for taking a thread from each of said warps, means for bringing said threads together at a tying device, a tying device for tying said threads, and means to adjust the relation of the said devices to the foremost untied threads in a direction transverse the warps to adapt their action to any irregularity or difference of spacing of the individual threads in the two warp sections.

198. In a warp-uniting machine, in combination, a bed provided with warp clamps and a feed bar; a carriage supported above said bed and provided with warp clamps and a feed bar; and an operating mechanism arranged to travel upon said bed, said operating mechanism comprising feeding elements adapted to engage said bars.

199. In a warp-uniting machine in combination, a bed; a warp carriage movably supported with relation to said bed; an operating mechanism arranged to travel upon said bed; and a thread-controlled feed mechanism arranged to feed the warp carriage in a direction opposite to the direction of travel of said operating mechanism.

200. In a warp-uniting machine, in combination, stationary means for supporting a warp; a carriage for supporting another warp; an operating mechanism arranged to travel with relation to said stationary warp-supporting means; a thread-controlled feed mechanism adapted to feed said carriage in the direction opposite to the direction of travel of said operating mechanism; and means for locking said carriage against movement with relation to said operating mechanism during the intervals between the feed movements of said feed mechanism.

201. In a warp-uniting machine, in combination, means for supporting a warp; an operating mechanism comprising a reciprocating selector; and an intermittently-actuated feed mechanism for said operating mechanism adapted to be actuated upon the outward movements of said selector.

202. In a machine for tying together the ends of two warps, in combination, means for selecting a thread from each of said warps, means for tying said selected threads, means for advancing the tying means with relation to one of said warps and means for moving the other warp with relation to said tying means.

203. An organized machine for joining the ends of warp threads, having, in combination, holding means to hold the crosswise unleased section of two warps, warp joining mechanism adapted to act progressively upon the threads of the two warps, feeding means to cause relative traverse between the warp holding means and the joining mechanism, warp thread selecting means to pick off successive threads from each warp thread placing means common to both warps to take a pair of selected threads one from each warp and place them together in operative relation to said thread joining mechanism and compensating means to compensate for differences or irregularities in the spacing of the threads of the two warps.

204. The combination, with a knot-tying mechanism, of means for supporting the threads to be united, said means comprising a member having a notch therein for one of the threads, said knot-tying mechanism comprising a stripper member arranged to move the threads laterally, and a guard for preventing said thread from being moved out of its notch during the lateral movement of the threads.

205. The combination, with a knot-tying mechanism, of means for supporting the threads to be united, said means comprising a member having a notch therein for one of the threads, said knot-tying mechanism comprising a stripper member arranged to move the threads laterally, and a guard located between said notched member and said stripper means, the threads to be united extending over said guard, and said guard preventing one of said threads from being moved out of said notch during the lateral movement of the threads.

206. A warp-uniting machine, having, in combination, uniting means, means for moving threads to the uniting means, and thread-controlled means for controlling the operation of said moving means.

207. A warp-uniting machine having, in combination, thread-selecting means, uniting means, means for moving selected threads to the uniting means, and means for automatically suspending the operation of said moving means upon failure of the selecting means.

208. A machine for uniting two warps having, in combination, two selectors, one for each warp, uniting means, and means for automatically suspending the operation of the selectors and the uniting means after a predetermined plurality of failures of the selectors.

209. A warp-uniting machine having, in combination, thread-selecting means, uniting means, and thread-controlled means to govern the operation of the selecting means and the uniting means.

210. A warp-uniting machine having, in combination, thread-selecting means, uniting means, and means for automatically suspending the operation of the selecting means and the uniting means upon failure of one of the first-mentioned two means.

211. A warp-uniting machine having, in combination, thread-selecting means, uniting means, and means for automatically suspending the operation of the selecting means and the uniting means upon failure of the selecting means.

212. A warp-uniting machine having warp-uniting means, means for causing relative movement between the same and the warp threads to permit progressively advancing action of the former upon the latter, the said movement being proportioned with reference to the spacing of the threads in one warp, and means for causing relative compensating adjustment between the uniting means and the threads of the remaining warp.

213. A warp-uniting machine having warp-uniting means, means for supporting a pair of warps, means for causing progressive action of the uniting mechanism with reference to threads of one warp, and means for causing relative adjustment between the threads of the remaining warp and the position of action of the uniting means.

214. A warp-uniting machine having, in combination, uniting means, and thread-controlled mechanism for suspending the operation of the uniting means.

215. A warp-uniting machine having, in combination, uniting means, and mechanism for automatically stopping the operation of the uniting means.

216. A machine for operating upon warp threads having, in combination, a bed, warp supporting means, a carriage arranged to travel longitudinally of said bed and transversely of the warp threads, operating mechanism on the carriage, and means for automatically suspending the travel of the carriage.

217. A warp-uniting machine having, in combination, means for supporting two warps, a carriage arranged to travel transversely of the warps, uniting mechanism on the carriage, and means for automatically suspending the travel of the carriage.

218. A machine for operating upon warp threads having, in combination, a bed, warp supporting means, a carriage arranged to travel longitudinally of said bed and transversely of the warp threads, operating mechanism on the carriage, and thread-controlled means for suspending the travel of the carriage.

219. A warp-uniting machine having, in combination, means for supporting two warps, a carriage arranged to travel transversely of the warps, uniting mechanism on the carriage, and thread-controlled means for suspending the travel of the carriage.

220. In a warp-uniting machine, the combination with means for supporting a pair of warps, warp uniting mechanism, means for causing a progressive relative movement between said warps and said uniting mechanism to permit the action of the latter upon the warp threads, and means for adjusting the position of one of said warp supports.

221. In a warp-uniting machine, the combination with means for supporting a pair of warps, warp uniting mechanism, means for feeding said warp uniting mechanism across said warps to unite the threads thereof, and means for differentially adjusting the position of one of said warp supports to bring the threads thereof into the desired alignment relative to the uniting mechanism.

222. In a warp-uniting machine, the combination with uniting-mechanism, means to advance the same relatively across the warps to be united to permit the action thereof upon the warp threads, and compensating means to compensate for an insufficient or excess advance of said uniting mechanism relatively to the individual threads of the warp.

223. In a warp-uniting machine, the combination with two warp supports, of warp uniting mechanism and thread separating mechanism for each of the said warps combined therewith, means to advance the same relatively across the warps, and compensating means to compensate for an excessive or insufficient advance relatively to the thread ends to be united.

224. In a warp-uniting machine, the combination with a traversing uniting carriage carrying thread separating means, of two warp frames, at least one of which is provided with differential feeding means.

225. A truck having, in combination, a wheeled framework, arms pivoted in said frame-work, latches on said arms for engaging the trunnions of a loom beam, means for swinging said arms into position to place the beam in a loom, and means actuated in said swinging movement for withdrawing said latches from the trunnions.

226. In a warp uniting machine, means to sustain two warps in series, means for adjusting the position of said warps relatively to each other, means to separate the leading threads of said warps from the body of their respective warps, means to sever the selected threads, and means to unite the selected threads.

227. In a warp uniting machine, two warp supports relatively movable, thread selecting means, thread separating means, thread severing means, and thread uniting means.

228. A machine for acting upon warp threads having a plurality of warp supports, thread-selecting mechanism, means for advancing said mechanism along the machine across said warp supports, and means for adjusting one of said warp supports relatively to the line of action of said thread-selecting mechanism.

229. In a warp uniting machine, the combination with two warp supports, warp uniting mechanism, means to move the uniting mechanism relatively to one support to traverse the warp supported thereon, and means automatically to move the other support relatively to the first support.

230. In a warp uniting machine, the combination with two warp supports, warp uniting mechanism, means to move the uniting mechanism relatively to one support to traverse the warp supported thereon, and means to adjust the other support relatively to the first support to maintain the required alignment between the warp threads and the uniting mechanism.

231. In a warp tying machine, the combination with means for supporting a pair of warps, of tying mechanism, severing means and pneumatic means for displacing the severed strands clipped from the knot.

232. In a warp tying machine, the combination with means for supporting a pair of warps, of tying mechanism, severing mechanism, driving means for the machine, and pneumatic means for displacing the strands severed from the knotted ends, said pneumatic means being also driven by said machine driving means.

233. The combination of a framework, arms pivoted in said framework, latches on said arms for engaging the trunnions of a loom beam, means for swinging said arms, and means actuated in said swinging movement for withdrawing said latches from the trunnions.

234. A warp-uniting machine having, in combination, a warp-support, a second warp support adapted to be removably positioned above the first warp support, mechanism to unite the two warps, and means for raising and lowering the second warp support.

235. A warp-uniting machine having, in combination, a warp-support, a second warp support adapted to be removably positioned above the first warp support, mechanism to unite the two warps, and means for removing and replacing the second warp support.

236. The combination, with a warp-supporting frame comprising two parallel clamps for holding a transverse section of a warp, of means for supporting the frame for pivotal movement.

237. A warp-uniting machine, having in combination, means for supporting two warps in parallel planes, a support, two levers pivoted to said support and lying outside the planes of the warps, a selector on each lever, said selectors extending toward each other, means for swinging said levers to reciprocate the selectors across the planes of their respective warps, and means for causing a relative feed movement between the warp-supporting means and said support.

238. A warp-uniting mechanism having, in combination, means for supporting two warps, a knotter, thread-selectors at one side of the knotter, a shear at the opposite side of the knotter, means for moving selected threads into the knotter, and means for causing relative feed movement between the warp-supporting means and said mechanism.

239. A warp-uniting machine having, in combination, means for supporting two warps in parallel planes, means for selecting threads from the warps and two separating blades reciprocable between the warps and having points adapted to enter between selected threads and their respective warps.

240. A warp-tying machine having, in combination, means for supporting two warps, one above the other, two selectors reciprocable across the planes of the warps, a knotter having a tying bill located between the planes of the warps, two separators reciprocable between the warps and toward and away from the tying bill, and devices moving with said separators for moving separated threads to the tying bill.

241. A warp-uniting machine having, in combination, means for supporting two warps in parallel planes, means for selecting threads from the warps, two separator blades reciprocable between the warps for setting off selected threads from their respective warps, a uniter to unite the selected and separated threads, and a device reciprocating with said blades to engage united threads and withdraw them from the vicinity of the uniter.

242. A machine for operating upon warps having, in combination, means for supporting a warp, said means including a bar across which the threads extend, a support, means for causing relative feed movement between the warp and said support transversely of the warp, a selector on the support arranged to engage the threads at one side of said bar, and a feed-controlling lever on the support and having a portion extending over said bar into engagement with the threads at the side of the bar opposite to that at which the selector operates.

243. A warp-uniting machine having means for supporting two warps, thread-uniting means, a support for the thread-uniting means, and means for deflecting the body of each warp in the plane thereof and away from the support for the uniting means.

244. A machine for operating upon warps having, in combination, frame members, two warp clamps connected in parallel relation to said frame members, a thread-deflecting bar located adjacent to one of the clamps, a carriage arranged to travel between said bar and the other clamp, a selector on the carriage arranged to engage the threads adjacent to said bar, means for causing a relative feed movement between the carriage and the warp, and a feed-controlling lever on the carriage arranged to engage the threads.

245. A warp carriage consisting of a plurality of yokes, a warp clamp rigidly connected to one arm of each of said yokes, a bar rigidly secured to said arms adjacent to said clamp, a bar slidably mounted in the first-mentioned bar, a warp clamp connected to the other arms of the yokes for movement toward and away from the first clamp, the second-mentioned bar having a roughened edge to support a sheet of threads extending between the clamps, and carriage-supporting members adjacent to the ends of said clamps.

246. A warp carriage consisting of a plurality of yokes, a warp clamp connected to one arm of each of said yokes, a warp clamp connected to the other arms of said yokes, a thread-deflecting bar adjacent to one of said clamps, and a feed-bar secured to the inner sides of said yokes.

247. A warp-uniting machine having, in combination, a bed, supports on said bed for a warp, a carriage mounted for adjusting movement lengthwise of the bed, supports on said carriage for a warp, a bar attached to and extending lengthwise of the bed, a bar attached to and extending lengthwise of the warp carriage, a carriage movable on and lengthwise of the bed, two feed devices on the last-named carriage to engage said bars, thread-selecting and uniting mechanism on the last-named carriage, and an electric motor mounted on the last-named carriage and connected to actuate said mechanism and feed devices.

248. A warp-uniting machine having, in combination, a bed, supports on the bed for a warp, a warp-supporting frame mounted for adjustment longitudinally of the bed, a bar attached to and extending longitudinally of the bed, a carriage movable on and longitudinally of the bed, a feed device on said carriage engaging said bar, thread-selecting and tying mechanism on the carriage and a drive shaft on the carriage connected to actuate said mechanism and feed device.

249. An organized machine for joining the ends of warp threads having, in combination, holding means to hold the crosswise sections of two warps with the threads of each section in unleased series, thread joining mechanism adapted to act progressively upon the threads of the two warps, feeding means to cause relative traverse between the warp holding means and the tying mechanism, a thread selecting device for each warp adapted to engage and pick off successive threads, separating means for each warp adapted to engage and further separate the selected threads each from the unselected threads of its section, and a thread placing device movable transversely the separated warp threads and adapted to engage the two separated threads and place them side by side in operative relation to said thread joining mechanism.

250. A machine for operating upon warps having, in combination, means for holding a sheet of threads under tension, said means including a clamp; a bar for deflecting the sheet of threads out of a plane; a thread selector operating relatively close to said bar; a shear operating relatively close to said clamp; and a thread separator operating between the selector and the shear.

251. A machine for uniting two warps which have irregularly-spaced threads, having, in combination, supports for holding the warps under tension, the supports for each warp including two clamps and an intermediate bar over which the sheet of threads is bowed to deflect the sheet out of the plane of the clamped thread-ends, two yieldingly mounted selectors for taking threads from said warps, said selectors operating adjacent to said bars and being pressed toward their respective warps into engagement with the variably - spaced threads, mechanism to unite selected threads, and means to cause a relative feed movement between the selectors and uniting mechanism and the warp supports.

252. A machine for operating upon warp threads having, in combination, supports for a series of warp threads, a thread-taker for taking a thread from the series, a thread-severer located at a distance from the thread-taker, and a device for continuing up to the severer the separation initiated by the thread-taker.

253. A machine for operating upon warp threads having, in combination, supports for a series of warp threads, a thread-taker for taking a thread from the series, a thread-severer, and means for separating a taken thread from an adhering thread throughout the region between the thread-taker and the thread-severer.

254. A machine for operating upon warp threads, having, in combination, supports for a series of warp threads, a thread-taker for taking a thread from the series, a thread-severer, and a device for progressively separating a taken thread from an adhering thread, said device beginning the separation adjacent to the thread-taker and continuing it to the severer.

255. A machine for operating upon warp threads having, in combination, supports for a series of warp threads, means for disengaging a thread from one of its supports, a thread-severer, and means for spacing the disengaged thread from the next adjacent thread, said means comprising a blade extending substantially from the disengaging means to the severer and arranged to be inserted between the disengaged and next adjacent threads.

256. A warp-uniting machine having, in combination, supports for two warps, said supports including a tight clamp for each warp, selectors for taking threads from the warps, a severer for severing selected threads to release them from the tight clamps, and a uniter for thereafter uniting the released threads, said uniter being located between the selector and the severer.

257. A machine for operating upon warp threads, having, in combination, clamps for holding a series of warp threads, a selector for taking threads from the series, another thread handling mechanism operatively related to the selector, and means for suspending the operation of one of said devices (namely, the selector and said other mechanism) during the continuing operation of the other device.

258. An organized machine for joining together the threads of two warps having, in combination, supporting means to support side by side two unleased warp sections, mechanism for operating progressively upon the warp threads, a support therefor, feeding means for causing relative traversing movement between the warp supporting means and the support for said operating mechanism, said operating mechanism comprising thread-joining mechanism, a thread-selecting device for each warp adapted to bear against the edge of the unseparated warp sheet and to pick off the threads one by one therefrom, separating means for each warp for engaging and further separating each selected thread from the unseparated threads of its warp section, and thread placing means common to both warps to bring said further separated threads together at said thread joining mechanism.

259. An organized machine for joining together the ends of warp threads, having, in combination, warp holding means to hold stretched two unleased warp sections, warp joining mechanism adapted to act progressively upon the threads of the two warps, said joining mechanism including a rotary tying member, feeding means to cause relative traverse between the warp holding means and the joining mechanism, warp selecting devices to pick off the threads one by one from each warp, and thread placing means common to both warps to engage the two selected threads and bring them together in operative relation to said rotary tying member.

260. An organized machine for operating upon the unseparated threads of an unleased warp having, in combination, supporting means for supporting the sections of two such warps, operating mechanism, a support therefor, and feeding means, said operating mechanism including two warp thread separating devices, each adapted to engage with threads of one of said warp sections and to select corresponding successive threads from the two warp sections, a warp uniting device and a common thread placing device adapted to engage selected threads and place them side by side in operative relation to said uniting device.

261. An organized machine for joining the threads of two warps having, in combination, compactly arranged warp-thread-selecting and warp thread joining mechanism and pneumatic means to displace threads from the vicinity of the joining mechanism.

262. An organized machine for uniting warp ends having, in combination, operating mechanism including warp thread tying devices, a support therefor, supports for two warps on which the warps are held in operative relation to the operating mechanism, feeding mechanism for causing relative traverse between the operating mechanism and the warps to permit the progressive action of the former upon the latter, said tying devices including a rotary tying bill formed in two parts one adapted to separate during tying of the knot to grasp the threads when the knot is stripped, devices to select the threads and convey them across the tying bill, and mechanism to strip the knot from the tying bill, said threads being held with a yielding tension beyond the tying bill during the formation of the knot.

263. A warp-tying mechanism comprising a rotatable tying-bill, mechanism to open and close the same, a thread guide acting to guide the threads in the initial forming of the loop and to subsequently move the threads at a predetermined point in the rotation of the bill to lay the threads into the opened bill, and mechanism for moving said guide.

264. A warp-tying machine having, in combination, means to support two distinct and separate threads each at a plurality of separated points and in parallel relation, a tying-bill mounted to turn and to open and close, guide means to position the said threads to be engaged by the tying-bill in the turning movement thereof in the initial formation of the loop, means further to turn the tying bill and to open the same, and means to effect the placing of said threads in the open tying-bill, as thus further turned.

265. A warp-tying mechanism comprising a tying-bill mounted to turn on an axis, mechanism to open the bill, a thread guide for guiding the threads during the initial forming of the loop, mechanism subsequently to move said guide to lay the threads into the opened bill at a predetermined point in the movement thereof, and means for holding clamped the thread portions extending beyond said bill on the opposite side thereof from said guide.

266. A warp-tying mechanism comprising a rotatable tying-bill arranged to be opened and closed, a thread guide having movement longitudinally of the axis of the tying-bill to place the threads in position for action thereon by the open tying-bill, and a thread clamp arm having movement transversely of the tying-bill.

267. A warp-tying mechanism comprising a tying-bill mounted to turn on an axis, mechanism to open the bill, a thread guide for guiding the thread during the initial forming of the loop, mechanism to move said guide to subsequently lay the threads into the open bill at a predetermined point in the movement thereof, means for clamping the threads on the opposite side of the bill from the said guide, and a movable stripper for stripping the knot from the bill, said stripper being located between the bill and said clamping means.

268. An organized machine for tying the ends of warp threads taken from different warps, comprising, in combination, a plurality of warp supports for holding unleased commercial warp sections;—thread tying mechanism;—feeding means for causing relative change of position between said supports and said tying mechanism thus to permit the latter, progressively and crosswise the warps, to tie threads from a plurality of warps;—means to take separately from the different warps and jointly to present threads that are to be tied operatively to said tying mechanism;—and traverse governing devices to co-act with the said feeding means and the said means to take and present threads, and cooperatively to adapt the successive actions of the said thread-taking and presenting means, both to a varying successive relation of said warp threads on each support and to a varying position of the related threads on the different supports.

269. An organized machine for tying separate warps having, in combination, means for supporting two warp sections, the threads of each warp lying normally in substantially the same plane; a tying device for successively tying pairs of threads presented thereto; thread separating, assembling and feeding mechanisms for said tying device adapted, by relative traverse between said mechanisms and said warp supporting means cross-wise the warps, to bring together at said tying device pairs of threads successively, one from each warp, and progressively cross-wise the warps, and including traverse-governing devices arranged to adjust the operative relations of said last mentioned mechanisms, cooperatively, to any irregularity or difference of spacing of the individual threads in either warp.

270. An organized machine for tying separate warps having, in combination, means for supporting two warp sections, the threads of each warp lying normally in substantially the same plane; a tying device for successively tying pairs of threads presented thereto; and single-thread separating and assembling mechanisms for said tying device adapted, by relative traverse between said mechanisms and said supporting means crosswise the warps, to bring together at said tying device pairs of threads successively, one from each warp, and progressively crosswise the warps, and including traverse-governing devices arranged to adjust the operative relation of said last mentioned mechanisms, cooperatively, to any irregularity or difference of spacing of the individual threads in either warp.

271. An organized machine for tying warps having, in combination, supporting instrumentalities for supporting two unleased commercial warp sections, tying means for tying said threads and thread presenting means for presenting threads from said warp sections to said tying means, one of said means contributing to compensate the relation of said two means and the threads to be tied, in a direction transverse the warps to adapt their action to any irregularity or difference of spacing of the individual threads in the two warp sections.

272. In a warp-uniting mechanism, the combination, with uniting mechanism, of means for holding two warps and means for adjusting the position of said warps relatively to each other.

273. In a machine for operating upon warp threads, means for holding two warps, and means for shifting the position of said holding means relative to each other.

274. In a warp-uniting machine, the combination with a uniting mechanism of a pair of warp supports and means for effecting an adjusting warp movement including power driven means to move a warp support.

275. An organized machine for joining warp threads having, in combination, supports for two warp sections, warp thread joining mechanism, feeding mechanism for causing relative traversing movement between the warp sections and the joining mechanism, selecting and placing devices for taking a pair of threads one from each warp and placing them in operative relation to the joining mechanism, and a reciprocatory forked member movable transversely the threads and adapted to receive the threads within its fork and remove the joined threads from the joining mechanism.

276. An organized machine for joining together the threads of unleased warps comprising, in combination, supporting devices to hold the crosswise sections of two such warps, warp joining mechanism adapted to act progressively upon the threads of the two warps, feeding means to cause relative traverse between the warp supports and the joining mechanism and compensating means to compensate for the difference in position of the successive threads of the two sections with relation to the joining mechanism in the course of said progressive action.

277. An organized machine for joining warp ends having, in combination, warp supporting means to support side by side two unleased warp sections, mechanism for operating progressively upon the warp threads, a support therefor, feeding means for causing relative traversing movement between the warp sections and said support, said operating mechanism comprising thread joining mechanism, together with a thread selecting device for each warp adapted to bear against and move across the edge of the unseparated warp sheet and to pick off the threads one by one therefrom, and comprising also thread placing means to place said threads in operative relation to said thread joining mechanism, and compensating means to permit the action of said operating mechanism irrespective of any irregularity or difference in the spacing of the warp threads.

278. An organized machine for joining warp ends having, in combination, warp supporting means to support two unleased warp sections, mechanism for operating progressively upon the warp threads, a support therefor, feeding means for causing relative traversing movement between the warp sections and said support, said operating mechanism comprising thread joining mechanism, a selecting device for each warp adapted to bear against and move across the edge of the unseparated warp sheet and to pick off the threads one by one therefrom, separating means for each warp for further separating each selected thread from the unseparated threads of its warp section, thread placing means to place said threads together side by side in operative relation to said thread joining mechanism, thread severing means, and compensating means to permit the progressive action of said operating mechanism on the threads across the warp sections, irrespective of irregularities or difference in spacing of the individual threads.

279. An organized machine for joining warp threads having, in combination, supporting means for holding two unleased warp sections spaced apart, operating mechanism for operating progressively upon the threads of the two warps, feeding mechanism for causing relative traversing movement between the warp sections and the operating mechanism, the latter including thread joining mechanism, a thread selecting device for each warp adapted to bear against the edge of the unseparated warp sheet and pick off the foremost thread therefrom, devices to engage and further separate the selected threads, and thread conveying means to bring the threads together side by side at said thread joining mechanism.

280. An organized machine for joining warp threads having, in combination, supports for holding two unleased warp sections, operating mechanism for operating progressively upon the threads of the two warps, feeding mechanism for causing relative traversing movement between the warp sections and the operating mechanism, said operating mechanism including a thread-joiner, a thread selecting device for each warp adapted to bear against the edge of the unseparated warp sheet and pick off the threads therefrom, and conveying devices to engage and convey selected threads toward said thread joiner.

281. An organized machine for joining warp threads having, in combination, supporting means to support two unleased warp sections, operating mechanism for operating progressively upon the warp threads, feeding means for causing relative traversing movement between the warp sections and the operating mechanism, the operating mechanism including thread joining mechanism, a thread selecting device adapted to pick off pairs of threads one from each warp, separating devices to engage and further separate each selected thread from the unseparated warp threads of the warp section, placing mechanism to place the threads together side by side at said thread joining mechanism and severing means to sever the threads.

282. A warp-uniting machine having, in combination, independent supports for two warps to be united, and means for bodily moving one of said warp supports toward and away from the other.

283. A warp-uniting machine having, in combination, a stationary warp support, a warp carriage supported above said stationary warp-support, and means for raising and lowering said warp carriage.

284. A warp-uniting machine having, in combination, a stationary warp support, a warp carriage supported above said stationary warp-support, means for raising and lowering said warp-carriage, and means for laterally moving said carriage.

285. In a mechanism for operating upon warp threads, in combination, a warp support; a selector which selects a thread from the warp; a thread-clamp which clamps the selected thread; a thread severer which severs the clamped thread; and a thread holder which yieldingly retains the loose end of the thread after it is released by the clamp.

286. A machine for operating upon warp threads having, in combination, a support for a warp, a selector to take single threads successively from the warp, a severer to sever a selected thread, and means automatically to intermit the operation of the severer upon failure of the selector to take a thread, while the selector continues to operate.

287. A warp-uniting machine having, in combination, supports for two groups of warp threads, selectors to take threads from said groups, a severer to sever selected threads, and means automatically to intermit the operation of the severer upon failure of one of the selectors to take a thread, while the selectors continue to operate.

288. A machine for operating upon warp threads having, in combination, a support for a warp, a selector to take single threads successively from the warp, a reciprocatory member to engage and advance a selected thread, and means automatically to intermit the operation of said member upon failure of the selector to take a thread, while the selector continues to operate.

289. In a machine for operating upon warp threads, in combination, a support for a warp, a thread selector, a reciprocatory device to separate the selected thread from the remaining threads, and a shear for the separated thread comprising a relatively stationary shear blade and a coacting shear blade reciprocating with the thread-separating device.

290. In a machine for operating upon an unleased warp, the combination of a reciprocatory selector for displacing the foremost thread out of the plane of the warp, and a reciprocatory separating element arranged to enter between the selected thread and the next adjacent thread at a point close to the selector as soon as the selector has pushed the selected thread far enough out of the plane of the warp to permit the insertion of said element, for positively separating the selected thread from an adhering thread.

291. In a machine for operating upon warp threads, in combination, means to support a series of warp threads a member to move a thread away from the series, and a stop motion comprising a pivoted latch arranged to be engaged by a thread which is being moved by said thread-moving member so as to be swung out of operative position by the pressure of such thread, and a spring tending to move said latch into operative position.

292. In a machine for operating upon warp threads, in combination, means to support a series of wrap threads, a member to move a thread away from the series, a reciprocatory part, and a pivoted stop member having a shoulder arranged to be engaged by said part, the shouldered end of said stop member being located in the path of movement of a thread which is being moved by said thread-moving member so as to be withdrawn from the path of said reciprocatory part by the pressure of such thread.

293. In a machine for operating upon warp threads, in combination, means to support a series of warp threads, a member to move a thread away from the series, a reciprocatory part, and a pivoted spring-pressed stop member having a shoulder arranged to be engaged by said part, said stop member being located in the path of movement of a thread which is being moved by said thread-moving member so as to be withdrawn from the path of said reciprocatory part by the pressure of such thread.

HOWARD D. COLMAN.

Witnesses:
L. L. MILLER,
J. P. KENNY.

DISCLAIMER.

1,442,776.—*Howard D. Colman*, Rockford, Ill. MACHINES FOR OPERATING UPON WARPS. Patent dated January 16, 1923. Disclaimer filed September 2, 1927, by the assignee, *Barber-Colman Company*.

Hereby enters its disclaimer to the aforesaid claim numbered 218 which is in the following words, to wit:

"A machine for operating upon warp threads having, in combination, a bed, warp supporting means, a carriage arranged to travel longitudinally of said bed and transversely of the warp threads, operating mechanism on the carriage, and thread-controlled means for suspending the travel of the carriage."

[*Official Gazette September 20, 1927.*]